US012442874B2

(12) United States Patent
Lassalle-Balier et al.

(10) Patent No.: US 12,442,874 B2
(45) Date of Patent: Oct. 14, 2025

(54) ANGLE SENSOR WITH A SINGLE DIE USING A SINGLE TARGET

(71) Applicant: Allegro MicroSystems, LLC, Manchester, NH (US)

(72) Inventors: Rémy Lassalle-Balier, Bures sur Yvette (FR); Solène Bastien, Naves-Parmelan (FR); Paul A. David, Bow, NH (US); Maxime Rioult, Massy (FR); Alexander Latham, Harvard, MA (US); Shaun Veilleux, Manchester, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 248 days.

(21) Appl. No.: 18/337,829

(22) Filed: Jun. 20, 2023

(65) Prior Publication Data

US 2023/0332878 A1    Oct. 19, 2023

Related U.S. Application Data

(63) Continuation-in-part of application No. 17/453,577, filed on Nov. 4, 2021, now Pat. No. 11,719,527.

(51) Int. Cl.
*G01R 33/09* (2006.01)
*G01B 7/30* (2006.01)
*G01R 33/00* (2006.01)

(52) U.S. Cl.
CPC ....... *G01R 33/098* (2013.01); *G01R 33/0005* (2013.01); *G01R 33/0094* (2013.01);
(Continued)

(58) Field of Classification Search
CPC .......... G01B 7/30; G01D 5/142; G01D 5/145; G01R 33/0094; G01R 33/02;
(Continued)

(56) References Cited

U.S. PATENT DOCUMENTS

| 4,757,244 A | 7/1988 | Iwamoto et al. |
| 5,621,377 A * | 4/1997 | Dettmann ............ G01R 15/205 324/252 |

(Continued)

OTHER PUBLICATIONS

U.S. Appl. No. 17/806,336, filed Jun. 10, 2022, Lassalle-Balier et al.
(Continued)

*Primary Examiner* — Steven L Yeninas
(74) *Attorney, Agent, or Firm* — DALY, CROWLEY, MOFFORD & DURKEE, LLP

(57) ABSTRACT

In one aspect, an angle sensor includes a first plurality of magnetoresistance elements located at a first location on an axis and a second plurality of magnetoresistance elements located at a second location on the axis. The first plurality of magnetoresistance elements includes a first one or more magnetoresistance elements each having a reference direction in a first direction; and a second one or more magnetoresistance elements each having a reference direction in a second direction. The second plurality of magnetoresistance elements includes a third one or more magnetoresistance elements each having a reference direction in the first direction, and a fourth one or more magnetoresistance elements each having a reference direction in the second direction. The angle sensor senses movement of a magnetic target, and the magnetic target is a ring magnet or a single pole magnet.

29 Claims, 50 Drawing Sheets

(52) U.S. Cl.
CPC ........... *G01R 33/09* (2013.01); *G01R 33/091* (2013.01); *G01B 7/30* (2013.01)

(58) Field of Classification Search
CPC .. G01R 33/025; G01R 33/072; G01R 33/077; G01R 33/09; G01R 33/091; G01R 33/093; G01R 33/096; G01R 33/098
See application file for complete search history.

(56) References Cited

U.S. PATENT DOCUMENTS

| | | | |
|---|---|---|---|
| 5,781,005 | A | 7/1998 | Vig et al. |
| 9,664,748 | B2 | 5/2017 | Friedrich et al. |
| 10,605,874 | B2 | 3/2020 | Lassalle-Balier et al. |
| 10,746,820 | B2 | 8/2020 | Lassalle-Balier et al. |
| 10,753,989 | B2 | 8/2020 | Campiglio et al. |
| 10,777,345 | B2 | 9/2020 | Lassalle-Balier et al. |
| 10,816,366 | B2 | 10/2020 | Weiland et al. |
| 10,837,753 | B2 | 11/2020 | Lassalle-Balier et al. |
| 10,866,122 | B2 | 12/2020 | Weiland et al. |
| 10,866,287 | B1 | 12/2020 | Lassalle-Balier et al. |
| 10,921,391 | B2 | 2/2021 | Cadugan et al. |
| 11,175,359 | B2 | 11/2021 | Lassalle-Balier et al. |
| 11,187,764 | B2 | 11/2021 | Lassalle-Balier et al. |
| 11,199,424 | B2 | 12/2021 | Lassalle-Balier et al. |
| 11,215,681 | B2 | 1/2022 | David et al. |
| 11,448,713 | B1 | 9/2022 | Ostermann et al. |
| 11,480,630 | B2 | 10/2022 | Deligiannis et al. |
| 11,525,875 | B2 | 12/2022 | Lassalle-Balier et al. |
| 11,630,168 | B2 | 4/2023 | Lassalle-Balier et al. |
| 11,686,599 | B2 | 6/2023 | Lassalle-Balier et al. |
| 2003/0173955 | A1* | 9/2003 | Uenoyama ......... G01D 5/24476 324/252 |
| 2005/0007102 | A1* | 1/2005 | Butzmann ............... G01D 5/147 324/207.21 |
| 2009/0001965 | A1* | 1/2009 | Ausserlechner ..... G01R 33/095 324/202 |
| 2009/0284252 | A1 | 11/2009 | Burgdorf et al. |
| 2010/0141244 | A1 | 6/2010 | Bartos et al. |
| 2013/0021027 | A1 | 1/2013 | Ausserlechner |
| 2013/0304422 | A1* | 11/2013 | Ausserlechner ....... G01R 33/07 324/251 |
| 2015/0145504 | A1* | 5/2015 | Bai ..................... G01R 33/093 324/207.13 |
| 2015/0192432 | A1 | 7/2015 | Noguchi et al. |
| 2016/0076914 | A1 | 3/2016 | Gotz |
| 2016/0153809 | A1* | 6/2016 | Pantazi ................ G11B 5/3903 324/207.21 |
| 2016/0265939 | A1* | 9/2016 | Haeberle .................. G01D 5/16 |
| 2017/0268864 | A1 | 9/2017 | Deak et al. |
| 2017/0356764 | A1 | 12/2017 | Deak et al. |
| 2018/0052208 | A1 | 2/2018 | Onaka et al. |
| 2019/0018082 | A1 | 1/2019 | Lee |
| 2019/0368858 | A1 | 12/2019 | Deak et al. |
| 2020/0041310 | A1 | 2/2020 | Lassalle-Balier et al. |
| 2020/0041583 | A1* | 2/2020 | Cadugan ............ G01R 33/0094 |
| 2020/0064157 | A1* | 2/2020 | Marauska .............. G01D 5/145 |
| 2020/0116800 | A1* | 4/2020 | Lassalle-Balier ........................... G01R 33/0017 |
| 2020/0333407 | A1* | 10/2020 | Reimann .............. G01R 33/022 |
| 2021/0011096 | A1 | 1/2021 | Lassalle-Balier et al. |
| 2021/0011097 | A1 | 1/2021 | David et al. |
| 2021/0148734 | A1 | 5/2021 | Foletto |
| 2021/0293903 | A1* | 9/2021 | Bartos ..................... G01R 33/09 |
| 2021/0293907 | A1 | 9/2021 | Lassalle-Balier et al. |
| 2021/0293910 | A1 | 9/2021 | Lassalle-Balier et al. |
| 2021/0389393 | A1 | 12/2021 | Lassalle-Balier et al. |
| 2022/0003572 | A1 | 1/2022 | Stewart |
| 2023/0134025 | A1 | 5/2023 | Lassalle-Balier |

OTHER PUBLICATIONS

U.S. Appl. No. 18/354,903, filed Jul. 19, 2023, Lassalle-Balier, et al.
Dwyer, "Ring Magnet Speed Sensing for Electronic Power Steering;" Allegro MicroSystems, LLC Product Information Data Sheet 296061-AN; Jan. 2009; 4 Pages.
Wood, "Motor Drive Discrete MOSFET Bridge Circuit Design and Layout;" Allegro MicroSystems, LLC Application Information Data Sheet AN296215; Initial Release Nov. 19, 2020; 6 Pages.
Office Action dated Feb. 1, 2023 for U.S. Appl. No. 17/453,577; 13 pages.
Response to Office Action dated Feb. 1, 2023 filed on Mar. 7, 2023 for U.S. Appl. No. 17/453,577; 23 pages.
Notice of Allowance dated Mar. 22, 2023 for U.S. Appl. No. 17/453,577; 13 pages.

* cited by examiner

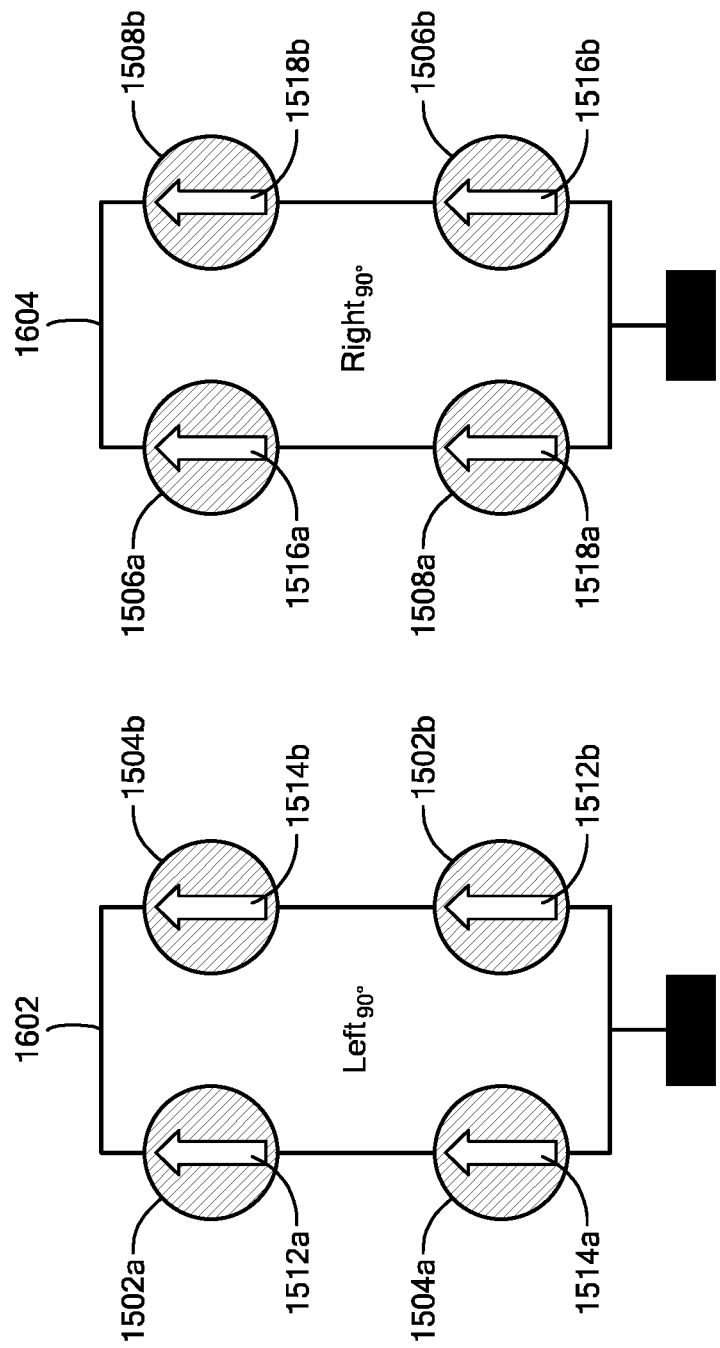

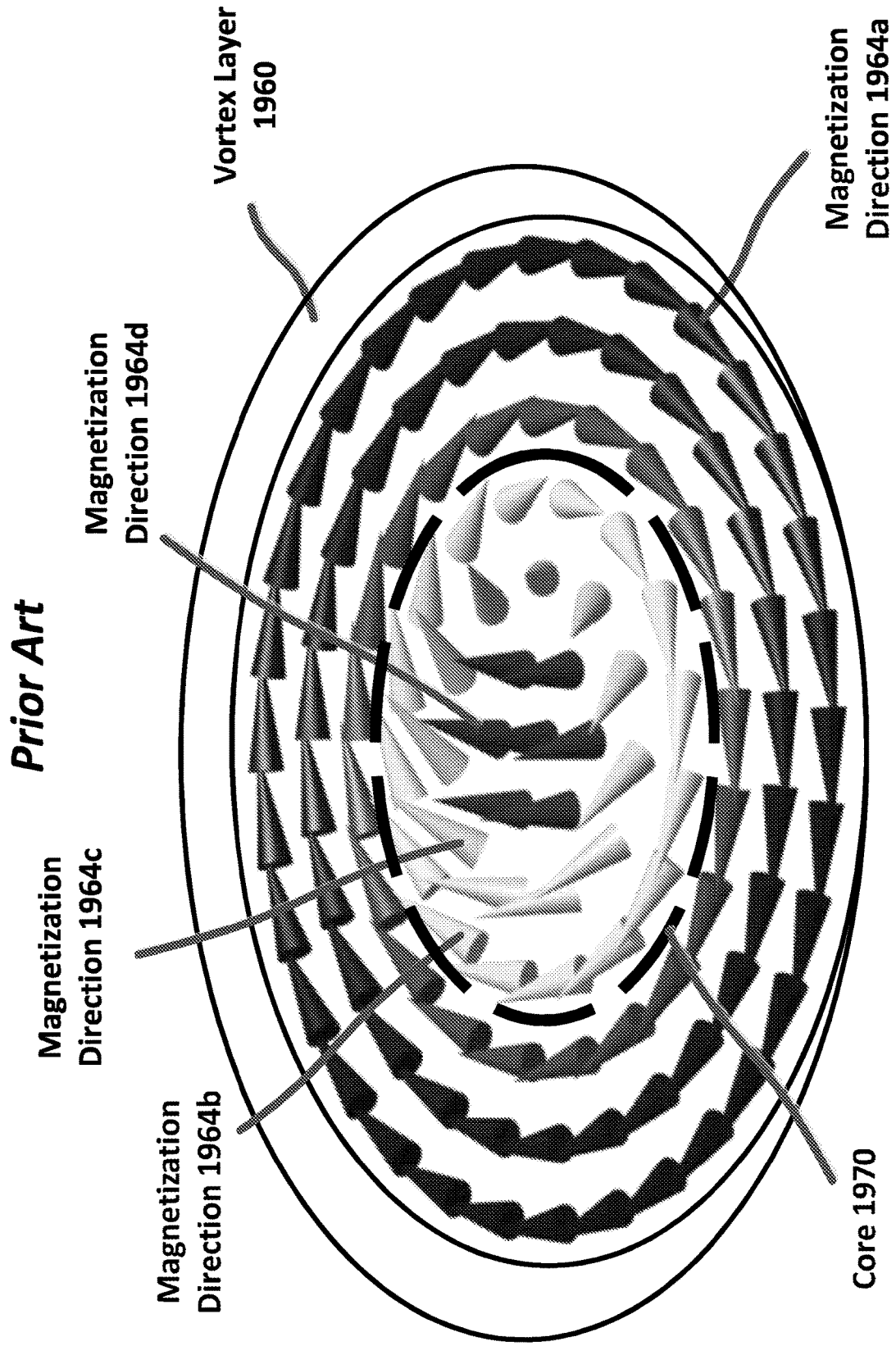
FIG. 19A  *Prior Art*

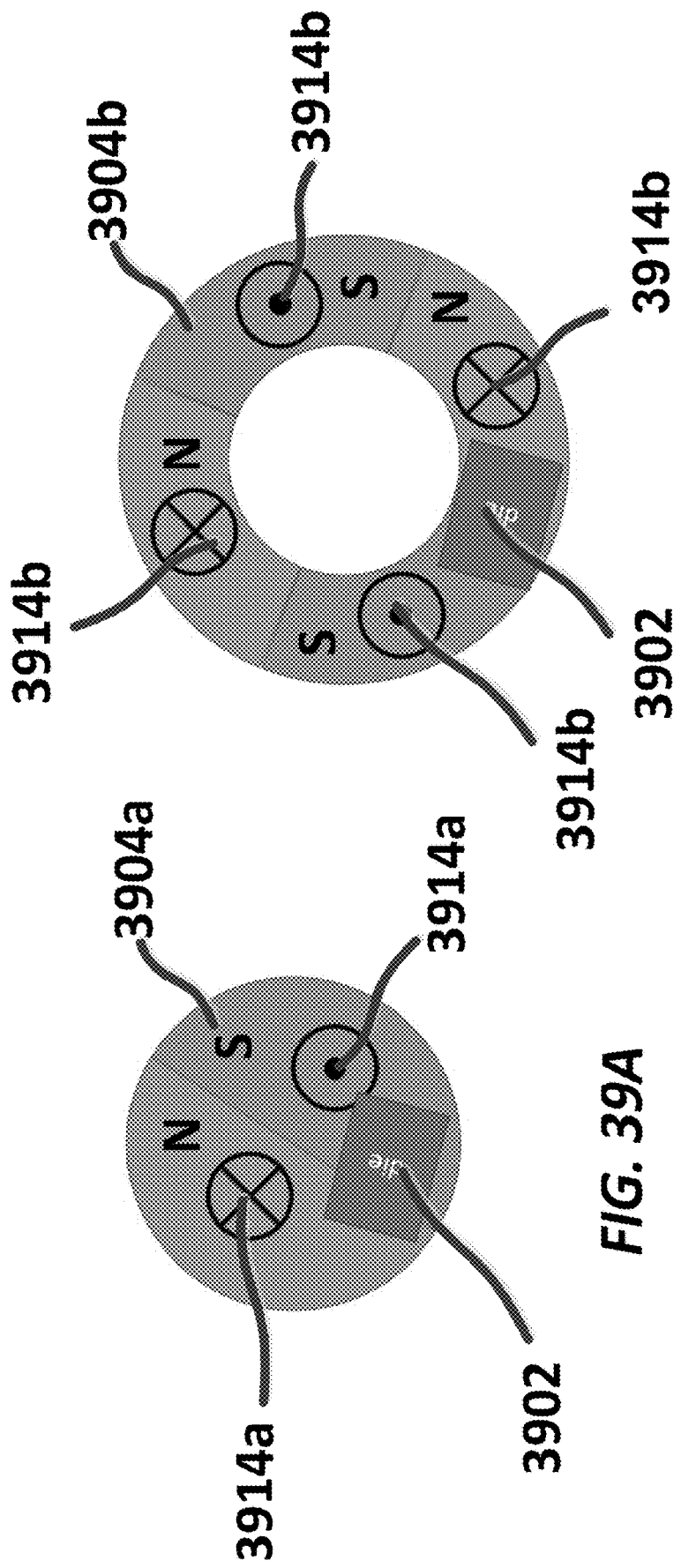

ANGLE SENSOR WITH A SINGLE DIE USING A SINGLE TARGET

CROSS REFERENCE TO RELATED APPLICATIONS

This is a Continuation-in-Part application and claims the benefit of and priority to U.S. patent application Ser. No. 17/453,577, filed Nov. 4, 2021, entitled "ANGLE SENSOR WITH A SINGLE DIE USING A SINGLE TARGET," which is incorporated herein by reference in its entirety.

BACKGROUND

Magnetic field sensors are used in a variety of applications, including, but not limited to, an angle sensor that senses an angle of a direction of a magnetic field; a current sensor that senses a magnetic field generated by a current carried by a current-carrying conductor; a magnetic switch that senses the proximity of a ferromagnetic object; a rotation detector that senses passing ferromagnetic articles, for example, magnetic domains of a ring magnet or a ferromagnetic target (e.g., gear teeth) where the magnetic field sensor is used in combination with a back-biased or other magnet; a magnetic field sensor that senses a magnetic field density of a magnetic field, a linear sensor that senses a position of a ferromagnetic target; and so forth.

SUMMARY

In one aspect, an angle sensor includes a first plurality of magnetoresistance elements located at a first location on an axis and a second plurality of magnetoresistance elements located at a second location on the axis. The first plurality of magnetoresistance elements includes a first one or more magnetoresistance elements each having a reference direction in a first direction; and a second one or more magnetoresistance elements each having a reference direction in a second direction. The second plurality of magnetoresistance elements includes a third one or more magnetoresistance elements each having a reference direction in the first direction, and a fourth one or more magnetoresistance elements each having a reference direction in the second direction. The angle sensor senses movement of a magnetic target, and the magnetic target is a ring magnet or a single pole magnet.

In another aspect, an angle sensor includes a first plurality of magnetoresistance elements located at a first location on an axis, a second plurality of magnetoresistance elements located at a second location on the axis, and a third plurality of magnetoresistance elements located at a third location on the axis. The first plurality of magnetoresistance elements includes a first magnetoresistance element having a reference direction in a first direction, a second magnetoresistance element having a reference direction in the first direction, and a third magnetoresistance element having a reference direction in the first direction. The second plurality of magnetoresistance elements includes a fourth magnetoresistance element having a reference direction in the first direction, and a fifth magnetoresistance element having a reference direction in the first direction. The third plurality of magnetoresistance elements includes a sixth magnetoresistance element having a reference direction in the first direction, a seventh magnetoresistance element having a reference direction in the first direction, and an eighth magnetoresistance element having a reference direction in the first direction. The angle sensor senses movement of a magnetic target, and the magnetic target is a ring magnet or a single pole magnet.

In a further aspect, an angle sensor includes a first plurality of magnetoresistance elements located at a first location on an axis and a second plurality of magnetoresistance elements located at a second location on the axis. The first plurality of magnetoresistance elements includes a first pair of magnetoresistance elements each having a reference direction in a first direction and a second pair of magnetoresistance elements each having a reference direction in a second direction. The second plurality of magnetoresistance elements includes a third pair of magnetoresistance elements each having a reference direction in the first direction and a fourth pair of magnetoresistance elements each having a reference direction in the second direction. The angle sensor senses movement of a magnetic target, and the magnetic target is a ring magnet or a single pole magnet.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

FIGS. 16A and 16B are diagrams of examples of two additional bridges using the four additional pairs of magnetic-field sensing elements of FIG. 15;

FIG. 19A is a diagram of an example of a vortex layer of a free layer in a tunneling magnetoresistance element having a magnetic-field vortex;

FIGS. 39A to 39D are examples of targets.

DETAIL DESCRIPTION

Described herein are techniques to fabricate an angle sensor with a single die that can determine an angle using a single target. In one example, the single target is a ring magnet having North-South pole pairs each having a unique period length. In one example, the angle sensor is an off-axis angle sensor. In another example, the angle sensor is a side-shaft angle sensor.

Figure 1:
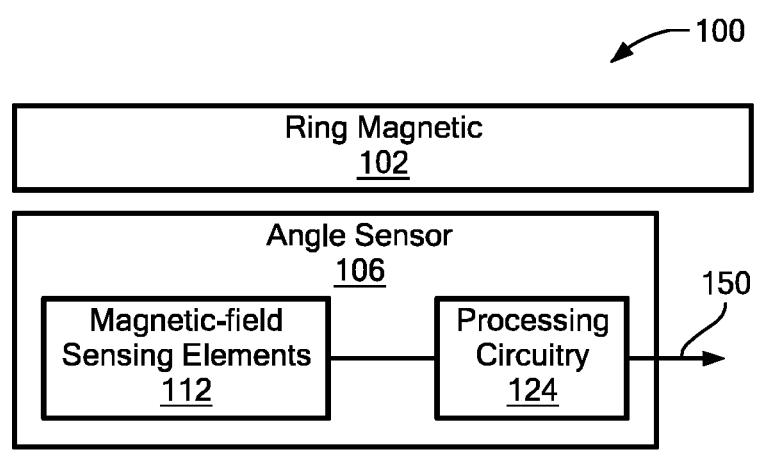
FIG. 1 is a diagram of an angle sensor system.

Referring to FIG. 1, an example of an angle sensor is an angle system 100. The angle system 100 includes a ring magnetic 102 and an angle sensor 106. In one example, the ring magnet 102 is a ring magnet with a plurality North-South pole pairs. In one example, the angle sensor 106 is an off-axis angle sensor. In another example, the angle sensor 106 is a side-shaft angle sensor.

The angle sensor 106 includes magnetic-field sensing elements 112 and processing circuitry 124. The magnetic-field sensing elements 112 detects changes in a magnetic field caused by the rotating ring magnet 102 and provides signals indicative of the changes in the magnetic-field to the processing circuitry 124. Based on the signals from the magnetic-field sensing elements 112, the processing circuitry 124 determines an angle of the ring magnet 102 and provides the angle of the ring magnet 102 in an output signal 150.

In one example, the magnetic-field sensing elements 112 may include vertical Hall elements, horizontal Hall elements and/or magnetoresistance elements. Magnetoresistance elements may include a giant magnetoresistance element (GMR) and/or a tunneling magnetoresistance element (TMR).

Figure 2A:
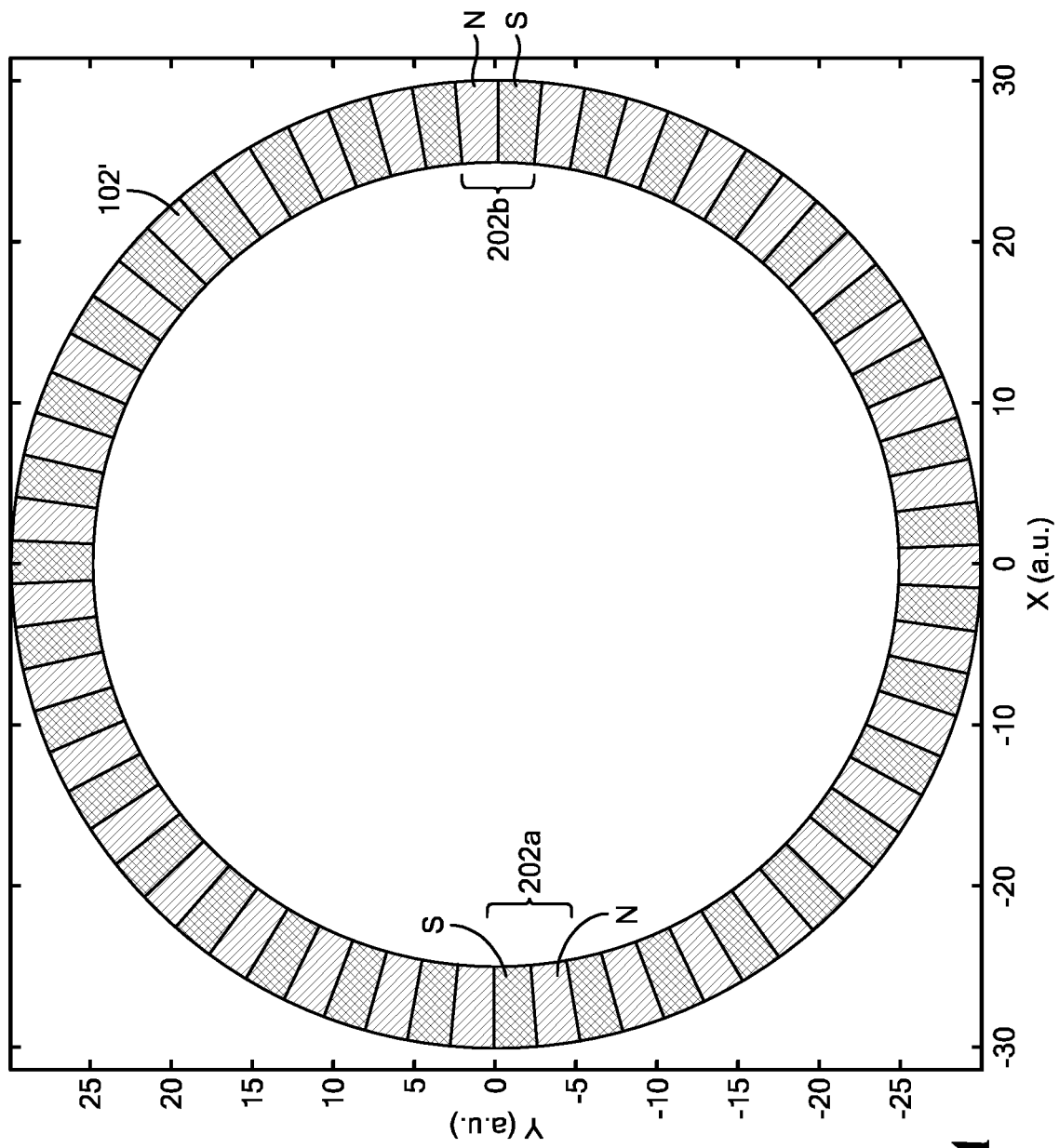
FIG. 2A is a diagram of an example of a ring magnet of the angle sensor system of FIG. 1.
Figure 2B:
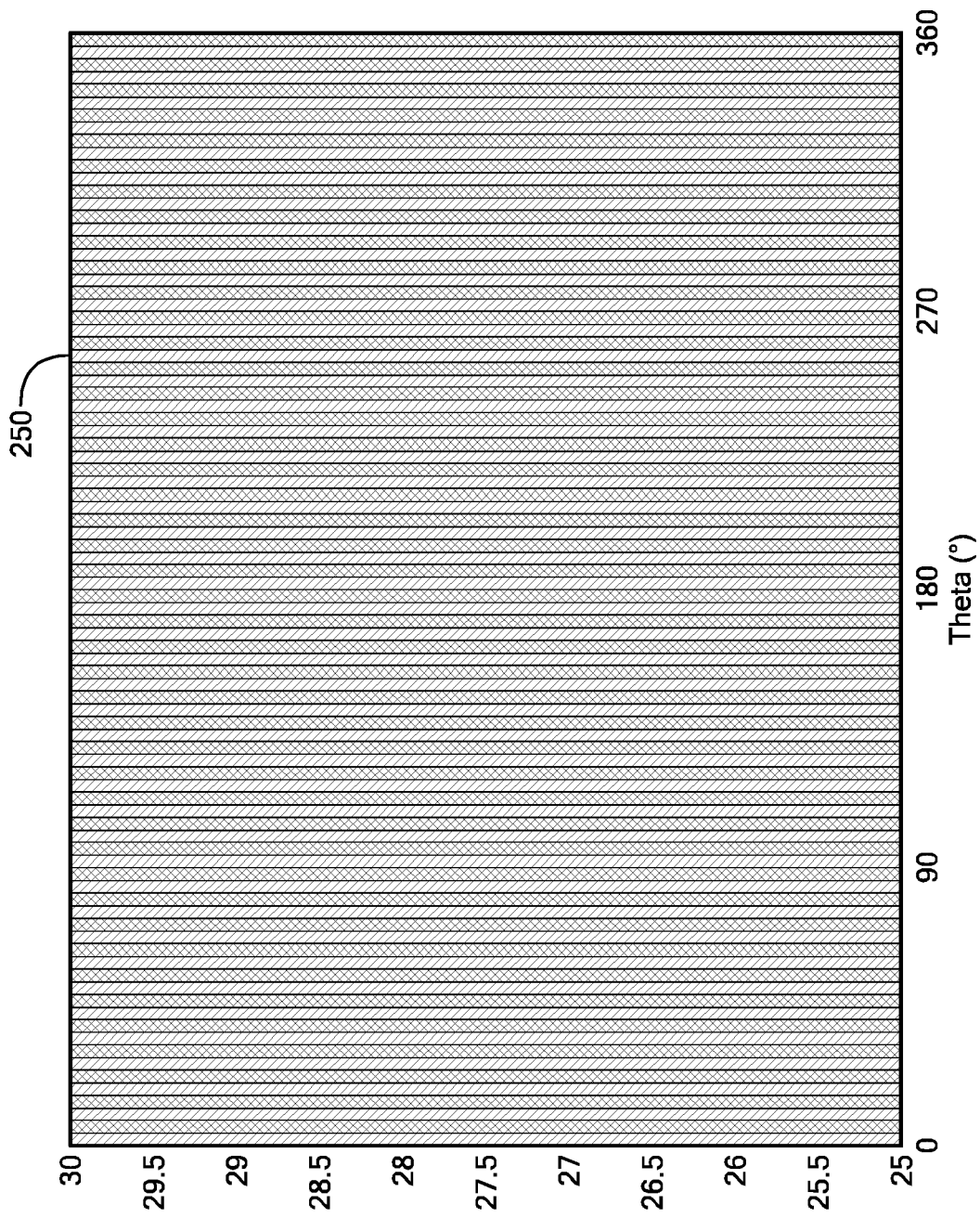
FIG. 2B is graph of an example of a distribution of poles versus polar angle of the ring magnet of FIG. 2A.

Referring to FIGS. 2A and 2B, an example of the ring magnet 102 is a ring magnet 102'. The ring magnet 102' includes thirty-nine North-South pole pairs (e.g., North-South pole pair 202a, North-South pole pair 202b). Each North-South pole pair has a unique period length. That is, no two North-South pole pairs have the same period length. For example, the North-South pole pair 202b has a smaller period length than the North-South pole pair 202a. A graph 250 depicts a distribution of poles versus the polar angle of the ring magnet 102.

In other examples, the period length may increase linearly with absolute angle. In other examples, the period length may alternate in the upper and lower part of the target so that successive periods do not present large local gradients in period length. In further examples, the period length may be randomly distributed (with or without period length gradient capping). In still further examples, the period length may be distributed so that the smallest periods are placed at target phase requiring the highest resolution and the largest periods are placed where the lowest resolution is required.

Figure 3:
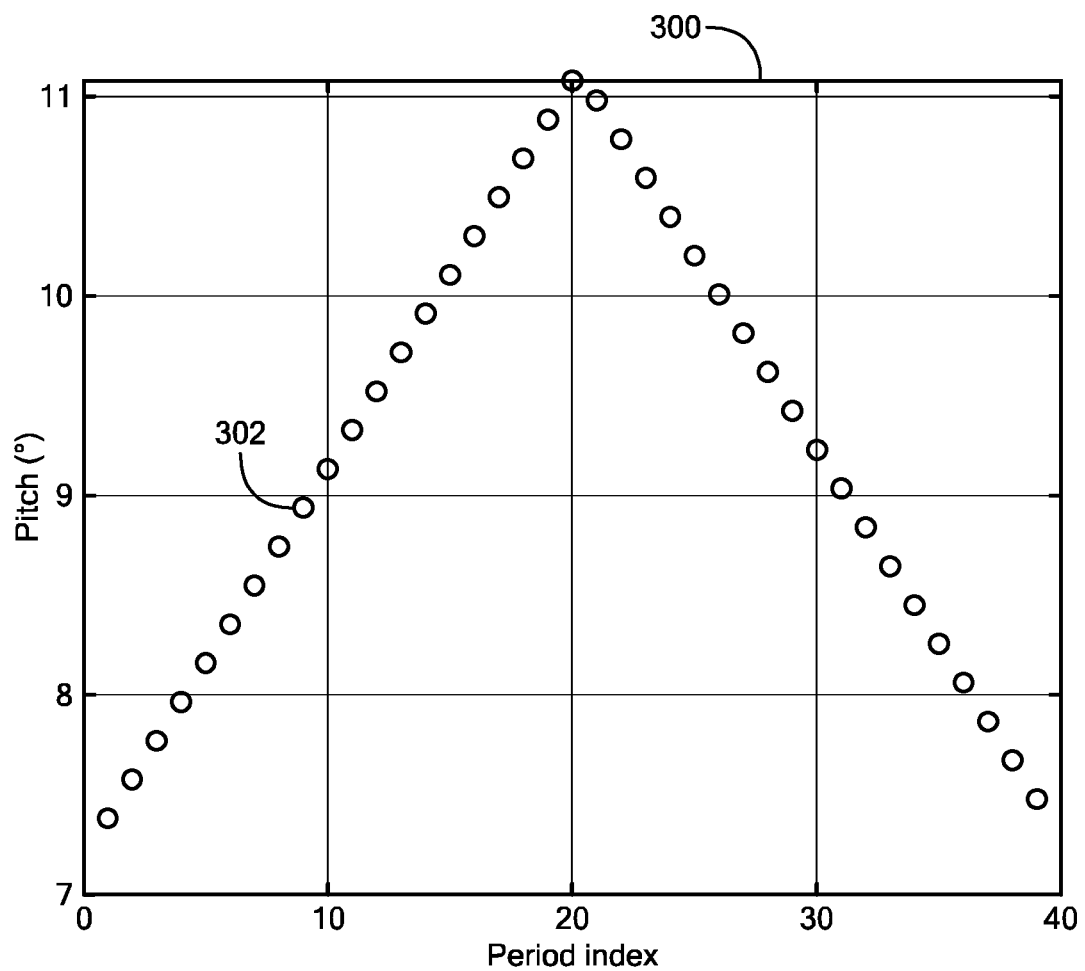
FIG. 3 is a graph of an example of pitch angle versus pitch index for the ring magnet of FIG. 2A.

Referring to FIG. 3, a graph 300 depicts a pitch (period length) versus pitch index of the ring magnet 102' (FIG. 2A). A pitch index corresponds to a unique North-South pole pair. Thus, each of the thirty-nine points in the graph 300 has unique period length. That is, no pitch index has the same pitch (period length). Thus, by knowing the pitch, the pitch index may be identified and therefore a location on the ring magnet (e.g., the ring magnet 102 (FIG. 1)) may be identified.

Figure 4:
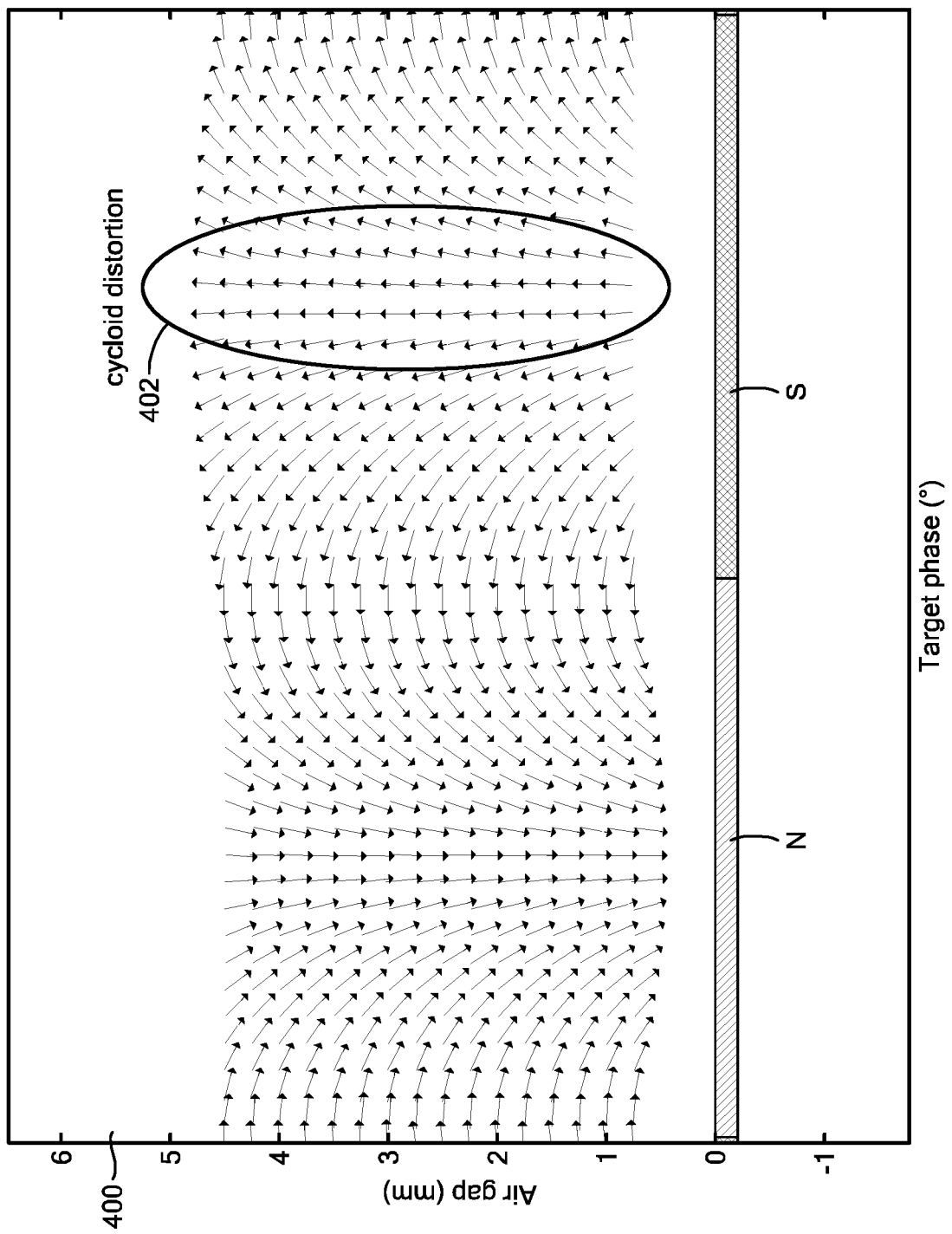
FIG. 4 is a graph of a magnetic-field map depicting an example of cycloid distortion.
Figure 5:
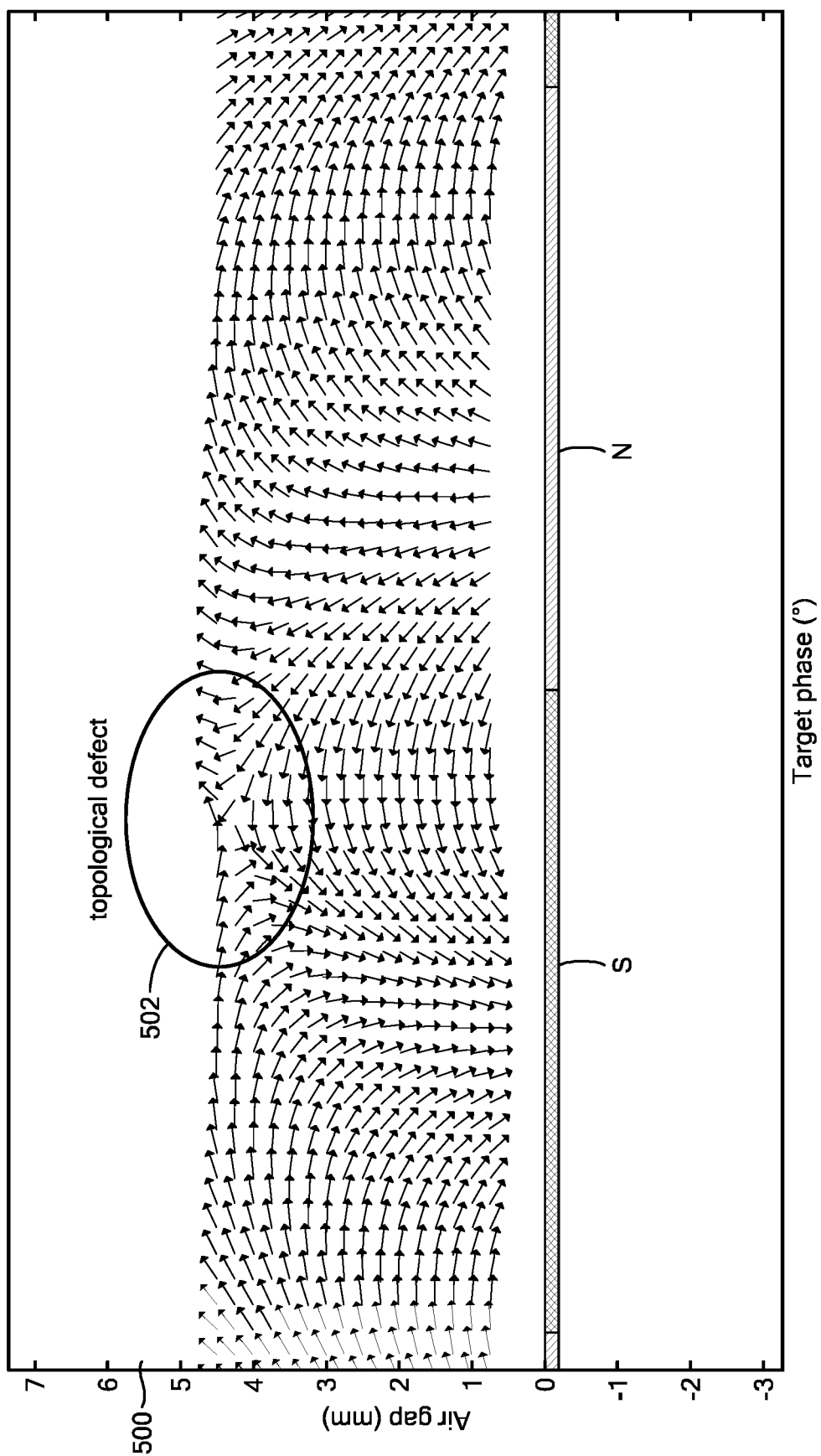
FIG. 5 is a graph of a magnetic-field map depicting an example of a topological defect.

Referring to FIGS. 4 and 5, a size of a ring magnet, the number of North-South pole pairs, and the period length of each North-South pole pairs may each be selected to avoid cycloid distortion and topological defects. For example, a graph 400 depicts cycloid distortion 402 and a graph 500 depicts topological defect 502, where an air gap in each graph is the distance of ring magnet (e.g., the ring magnet 102 (FIG. 1)) from a sensor (e.g., the off-axis sensor 106 (FIG. 1)).

In one example, a pitch distribution may be selected to control topological effects. For example, a pitch distribution may be selected by alternating in the upper and lower half of the ring magnet to provide lower topological defects. For example, in FIG. 3, the maximum pitch is in the center and then decreasing pitches are distributed alternatively left and right. In another example, the change in pitch length decreases from the maximum pitch at a constant rate.

A maximum pitch (PitchMax) is the largest pitch length in a ring magnet. A minimum pitch (PitchMin) is the smallest pitch in a ring magnet. A value corresponding to (PitchMax−PitchMin)/(PitchMax+PitchMin) may be selected to be less than 50%. Otherwise, strong cycloid distortions are created (e.g., 10° over the air gap (i.e., the gradient of the field angle versus the air gap)).

In one example, the average pitch (i.e., average pitch length) is selected so that half a period corresponds to a bridge spacing (e.g., distance between magnetic-field sensing element 802a and magnetic-field sensing element 804a) within +/−10%.

Figure 6A:
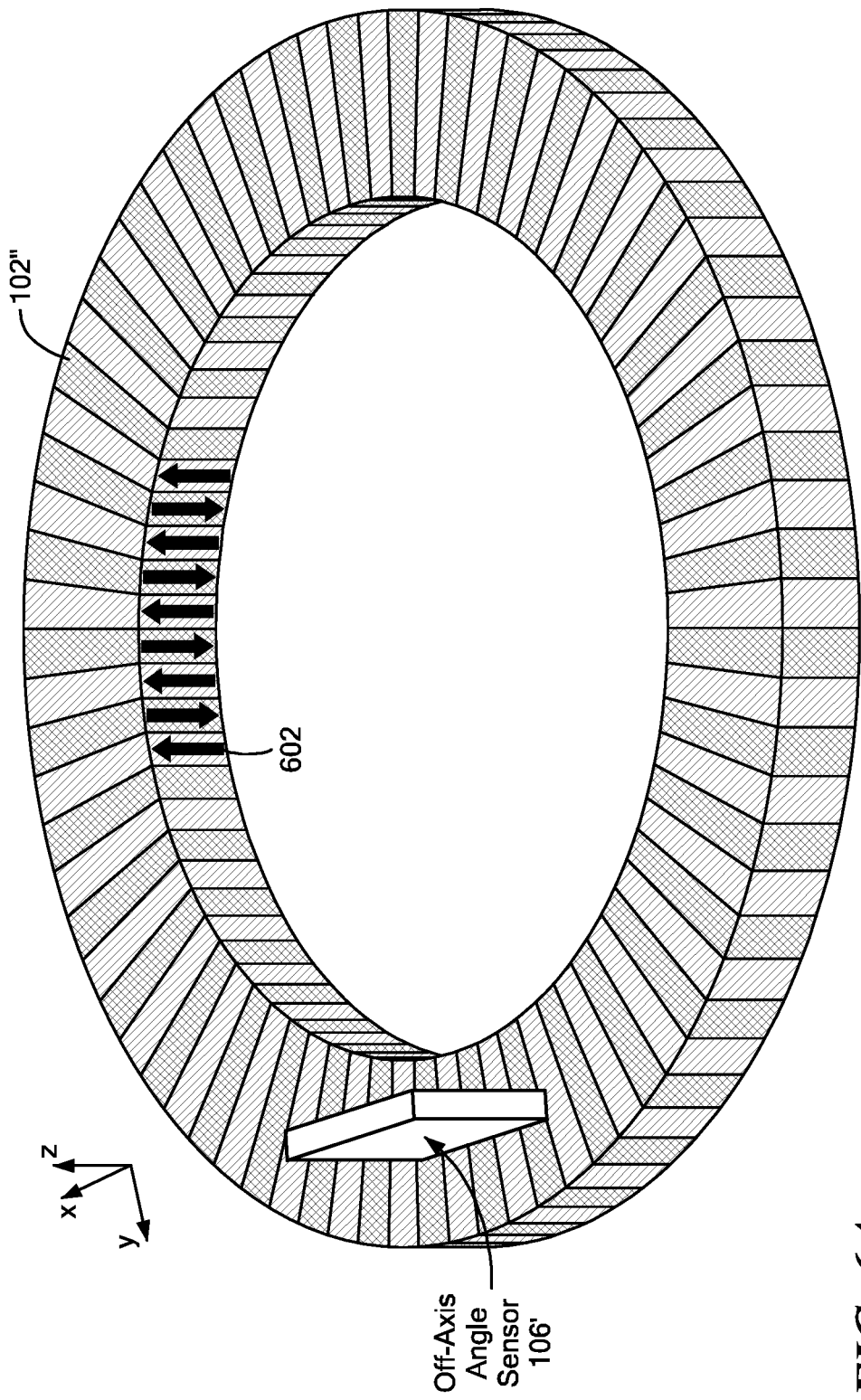
FIGS. 6A and 6B are examples of off-axis angle sensor placements with respect to a ring magnet where pole magnetizations are along an axis of rotation of the ring magnet.
Figure 6B:
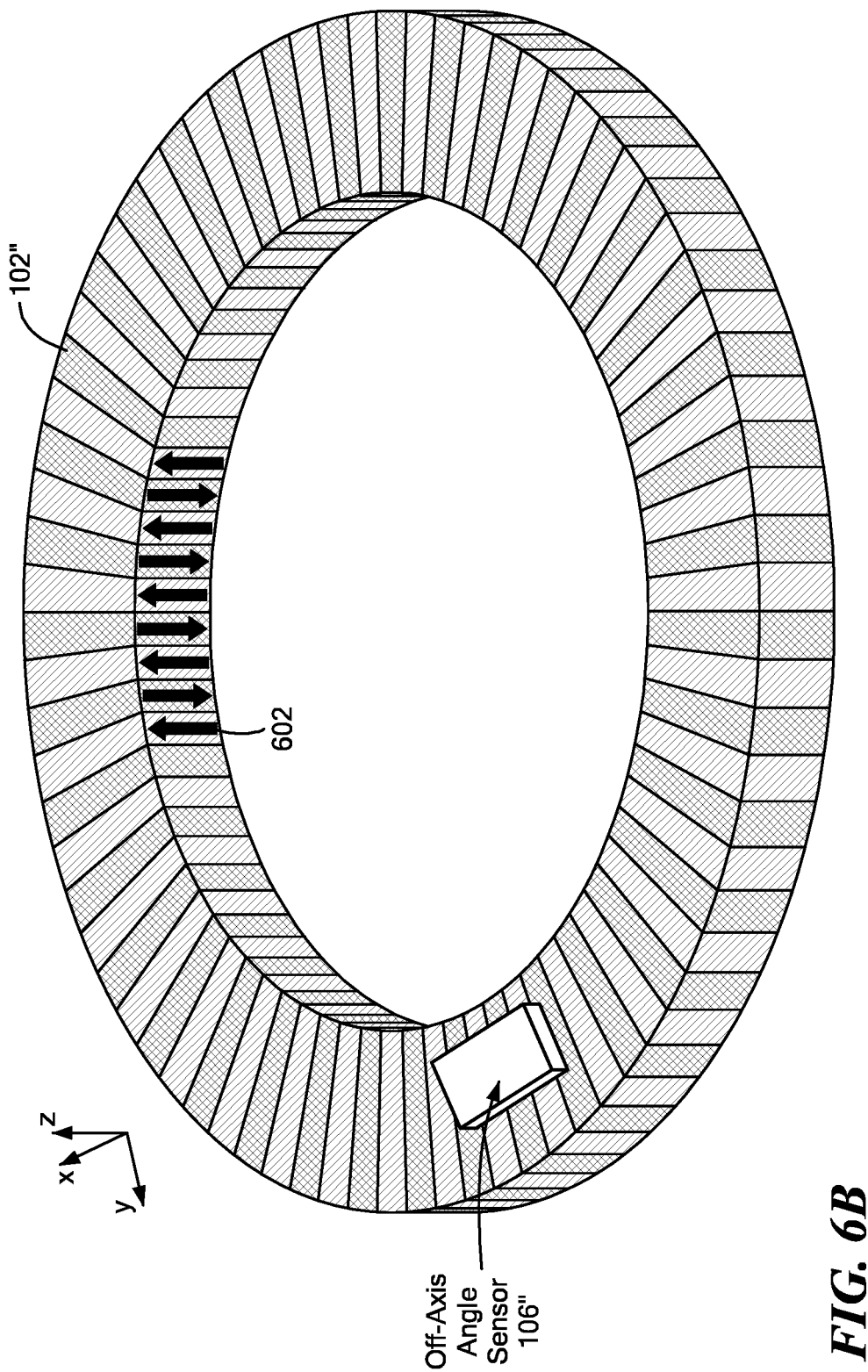

Referring to FIGS. 6A and 6B, an example of the ring magnet 102 is a ring magnet 102″. Magnetization of North and South poles are along the z-axis of rotation of the ring magnet 102″. For example, an arrow 602 shows a magnetization direction.

An example of the angle sensor 106 is the off-axis angle sensor 106'. In FIG. 6A, the off-axis angle sensor 106' is placed on top of the ring magnet 102″. If the off-axis angle sensor 106' is parallel to the tangent plane to the target (i.e., the plane xz), then either vertical Hall plates or in-plane magnetoresistance elements may be used for the magnetic-field sensing elements (e.g., magnetic-field sensing elements 112 (FIG. 1)). In one particular example, tunneling magnetoresistance element (TMR) with vortex topology are used for the magnetic-field sensing elements (e.g., magnetic-field sensing elements 112 (FIG. 1)).

Another example of the angle sensor 106 is the off-axis angle sensor 106″. In FIG. 6B, the off-axis angle sensor 106' is placed on top of the ring magnet 102″. If the off-axis angle sensor 106″ is placed in the plane parallel to the face of the target (i.e., plane xy), then a planar Hall plate and vertical Hall may be used to respectively sense the magnetic field in the x-direction (Hx) and the magnetic field in the z-direction (Hz). In another example, an in-plane magnetoresistance element and a perpendicular magnetic anisotropy (PMA) magnetoresistance element may be used respectively for the magnetic-field sensing elements (e.g., magnetic-field sensing elements 112 (FIG. 1)) to sense the magnetic field in the x-direction (Hx) and the magnetic field in the z-direction (Hz).

Figure 7A:
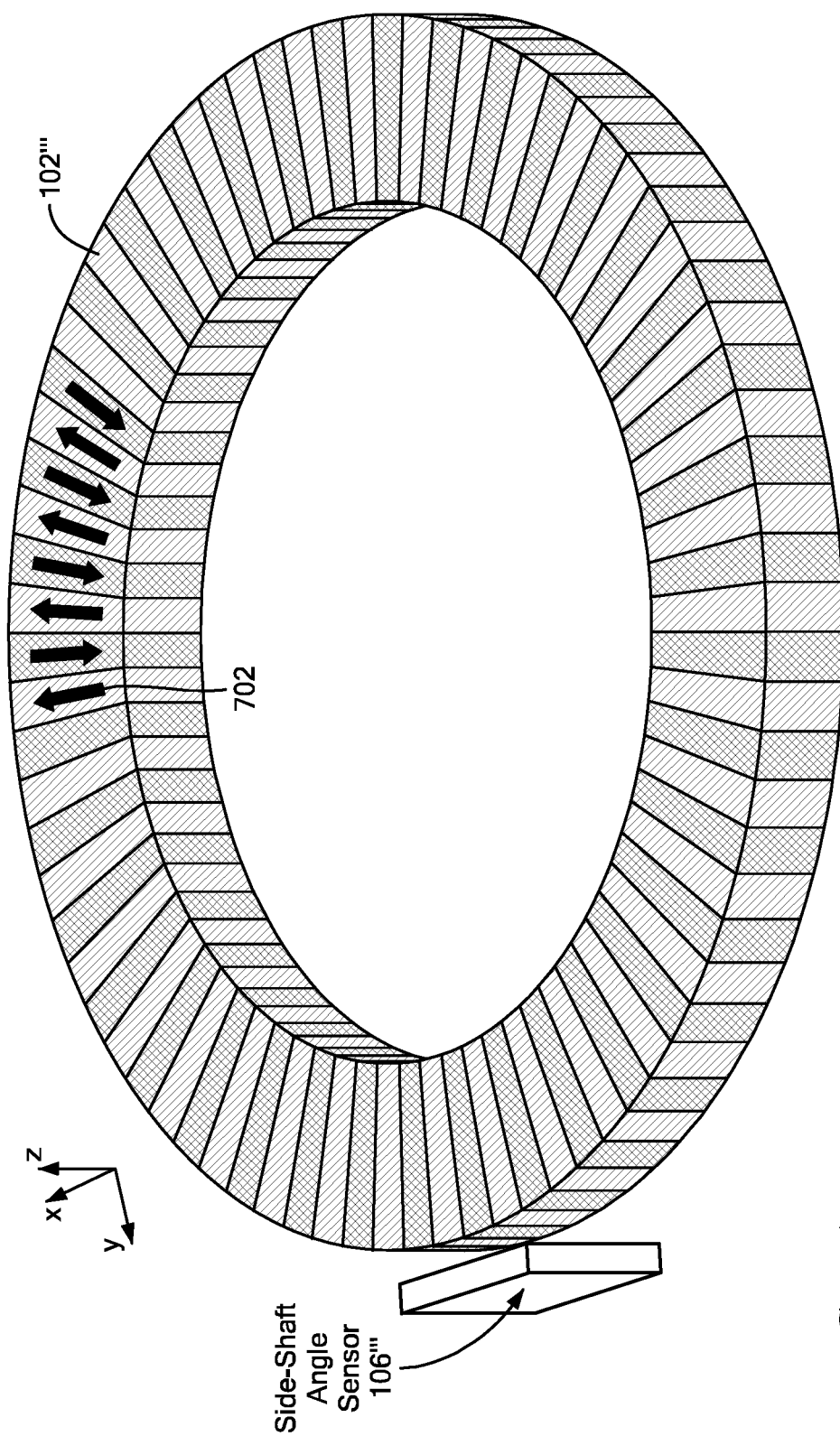
FIGS. 7A and 7B are examples of side-shaft angle sensor placements with respect to a ring magnet where pole magnetizations are radial.
Figure 7B:
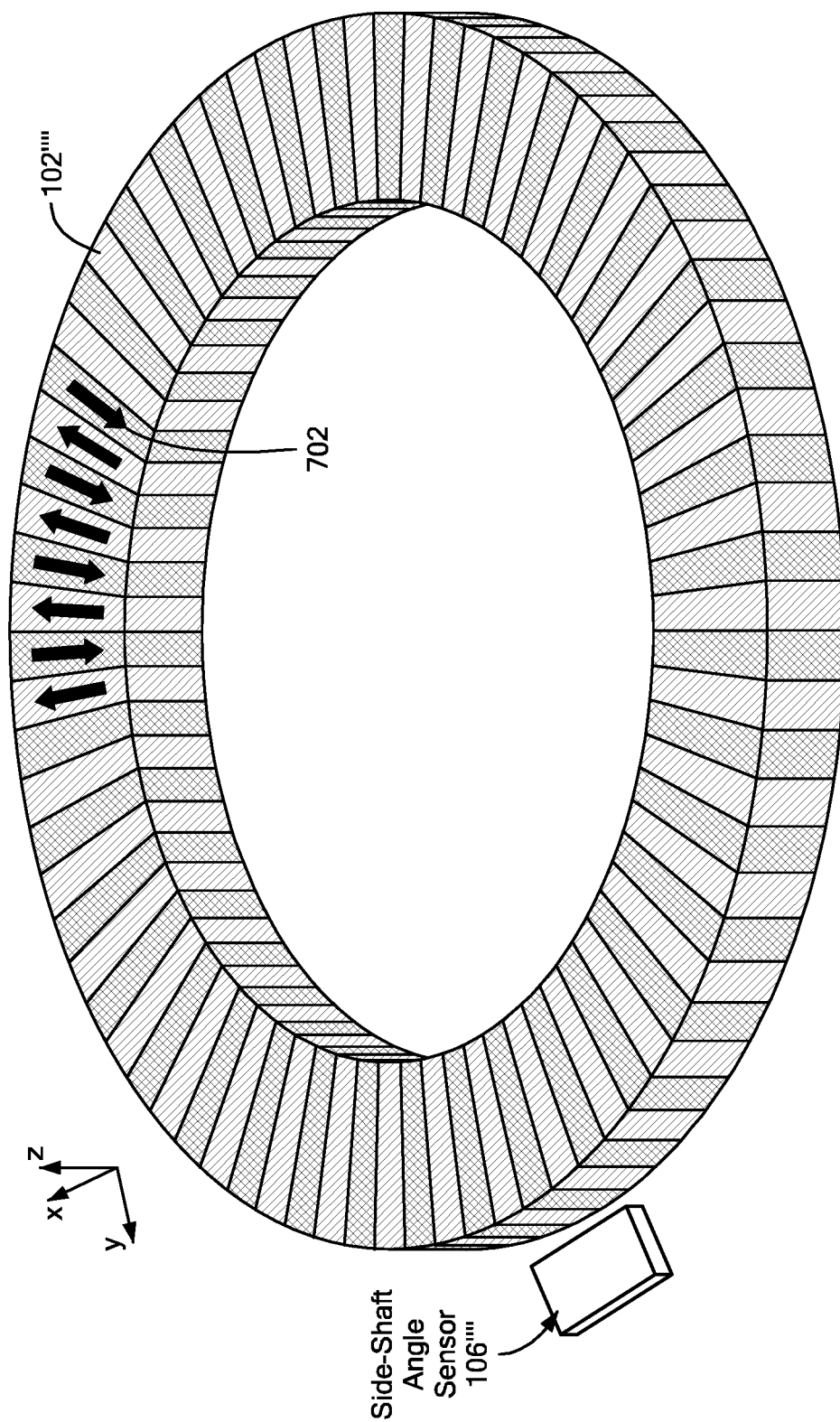

Referring to FIGS. 7A and 7B, an example of the ring magnet 102 is a ring magnet 102‴. Magnetization of North and South poles are radial. For example, an arrow 702 shows a magnetization direction.

An example of the angle sensor 106 is the side-shaft angle sensor 106‴. In FIG. 7A, the side-shaft angle sensor 106‴ is placed beside the ring magnet 102‴. If the side-shaft angle sensor 106‴ is parallel to the tangent plane to the ring magnet 102‴ (i.e., plane xz), then a planar Hall plate and a vertical Hall plate may be used for the magnetic-field sensing elements (e.g., magnetic-field sensing elements 112 (FIG. 1)) to respectively sense the magnetic field in the x-direction (Hx) and the magnetic field in the y-direction (Hy). In another example, an in-plane magnetoresistance element and a PMA device may be used for the magnetic-field sensing elements (e.g., magnetic-field sensing elements 112 (FIG. 1)) to respectively sense the magnetic field in the x-direction (Hx) and the magnetic field in the y-direction (Hy).

An example of the sensor 106 is the side-shaft angle sensor 106'. In FIG. 7B, the side-shaft angle sensor 106″″ is placed beside the ring magnet 102‴. If the sensor plane is in the plane parallel to the face of the ring magnet 102‴ (i.e., plane xy), then either vertical Hall plates or in-plane magnetoresistance element may be used. In one particular example, tunneling magnetoresistance elements (TMR) are used for the magnetic-field sensing elements (e.g., magnetic-field sensing elements 112 (FIG. 1)).

Figure 8:
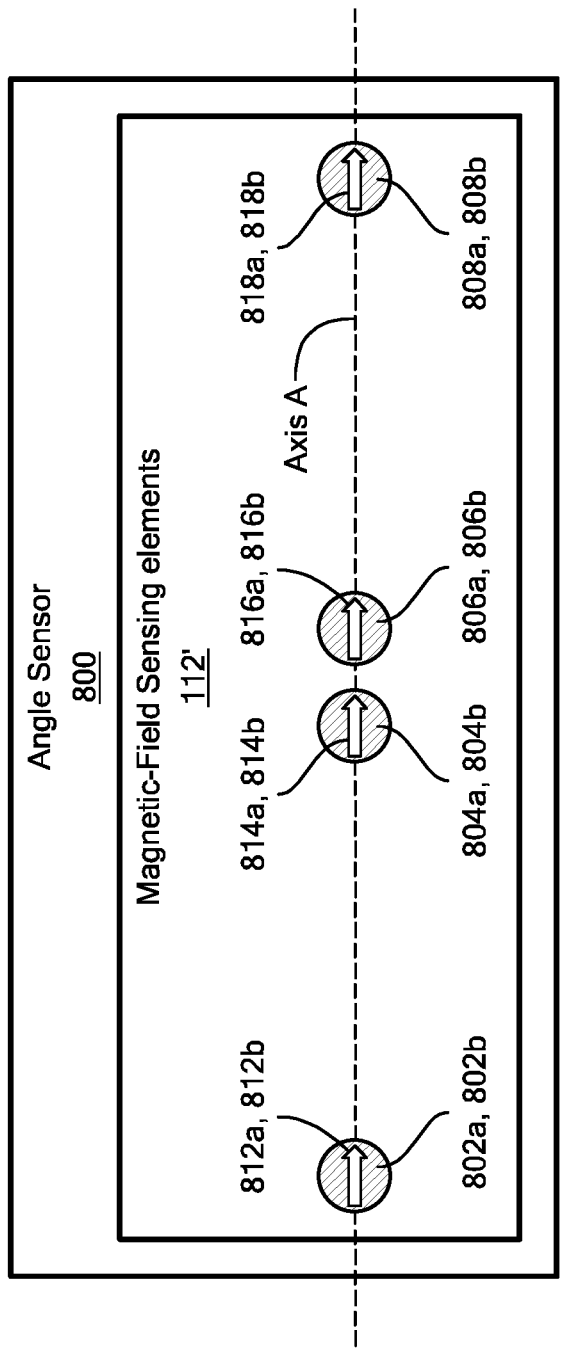
FIG. 8 is a diagram of an example of an angle sensor with four pairs of magnetic-field sensing elements.

Referring to FIG. 8, an example of the angle sensor 106 (FIG. 1) is an angle sensor 800. The angle sensor 800 includes a magnetic-field sensing elements 112', which is an example of the magnetic-field sensing elements 112 (FIG. 1). The magnetic-field sensing elements 112' include a first set of magnetic-field sensing elements 802a, 802b in a first location; a second pair of magnetic-field sensing elements 804a, 804b in a second location; a third pair of magnetic-field sensing elements 806a, 806b in a third location; and a fourth pair of magnetic-field sensing elements 808a, 808b located in a fourth location. The first, second, third and fourth pairs of magnetic-field sensing elements 802a, 802b, 804a, 804b, 806a, 806b, 808a, 808b are placed on an axis A.

The magnetic-field sensing element 802a has a reference direction 812a and magnetic-field sensing element 802b has a reference direction 812b. The magnetic-field sensing element 804a has a reference direction 814a and the magnetic-field sensing element 804b has a reference direction 814b. The magnetic-field sensing element 806a has a reference direction 816a and magnetic-field sensing element 806b has a reference direction 816b. The magnetic-field sensing element 808a has a reference direction 818a and the magnetic-field sensing element 808b has a reference direction 818b.

The reference directions 812a, 812b, 814a, 814b, 816a, 816b, 818a, 818b are the same and zero degrees with respect to the axis A. The reference direction is the direction that the magnetic-field sensing element is the most sensitive to changes in a magnetic field. For example, a reference direction in a magnetoresistance element is the direction the magnetoresistance element has the greatest change in resistance in response to changes to a detected magnetic field.

Figures 9A, 9B:
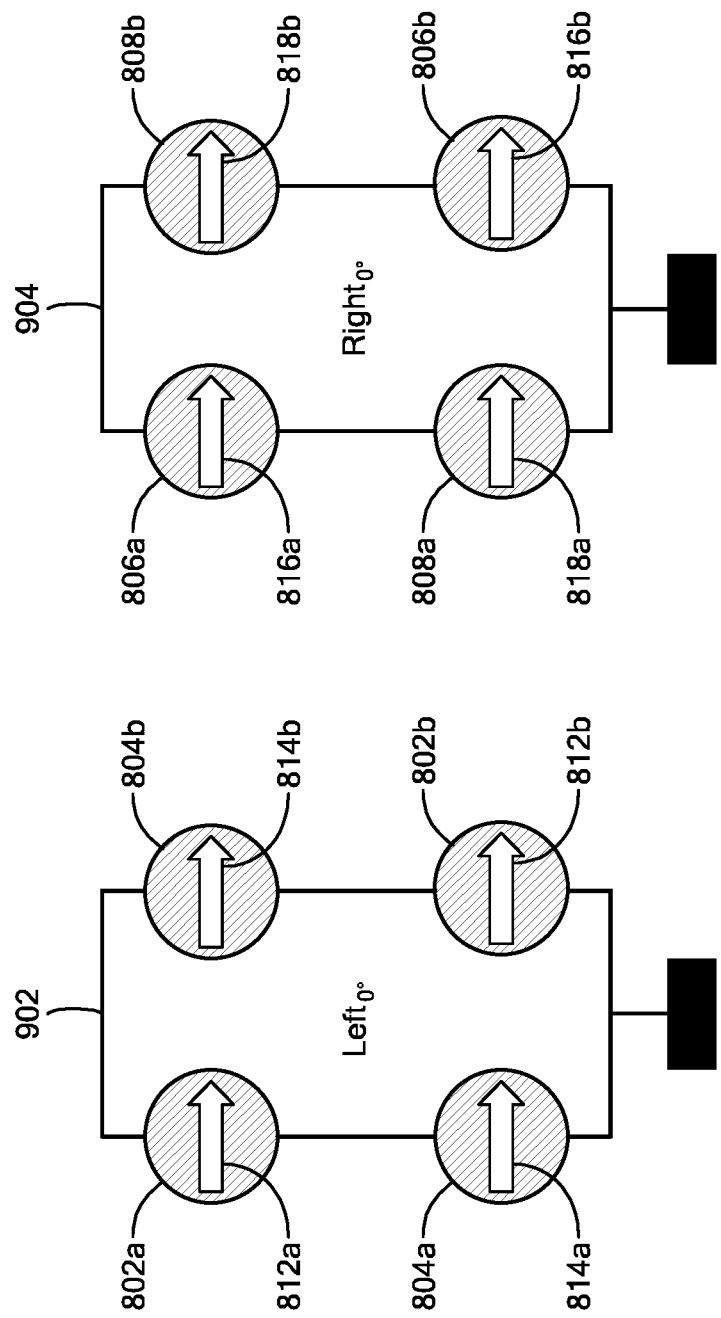
FIGS. 9A and 9B are diagrams of examples of a left bridge and a right bridge respectively using the four pairs of magnetic-field sensing elements of FIG. 8.

Referring to FIGS. 9A and 9B, a left bridge 902 (e.g., a differential bridge) is formed by having the magnetic-field sensing elements 802a, 804a on one leg of the left bridge and the magnetic-field sensing elements 802b, 804b on the other leg of the left bridge. A right bridge 904 (e.g., a differential bridge) is formed by having the magnetic-field sensing elements 806a, 808a on one leg of the right bridge and the magnetic-field sensing elements 806b, 808b on the other leg of the right bridge.

In one example, the bridges 902, 904 are gradiometers that reject a stray magnetic field along the reference axis (axis A). In this example, the magnetic field sensing elements 812a, 812b, 814a, 814b, 816a, 816b, 818a, 818b may be a TMR (e.g., a vortex TMR or a PMA TMR).

In other examples, where a stray magnetic field is not significant, then the magnetic field sensing elements 812a, 812b, 814a, 814b, 816a, 816b, 818a, 818b may be any GMR/TMR implemented without PMA or vortex topology.

Figure 10A:
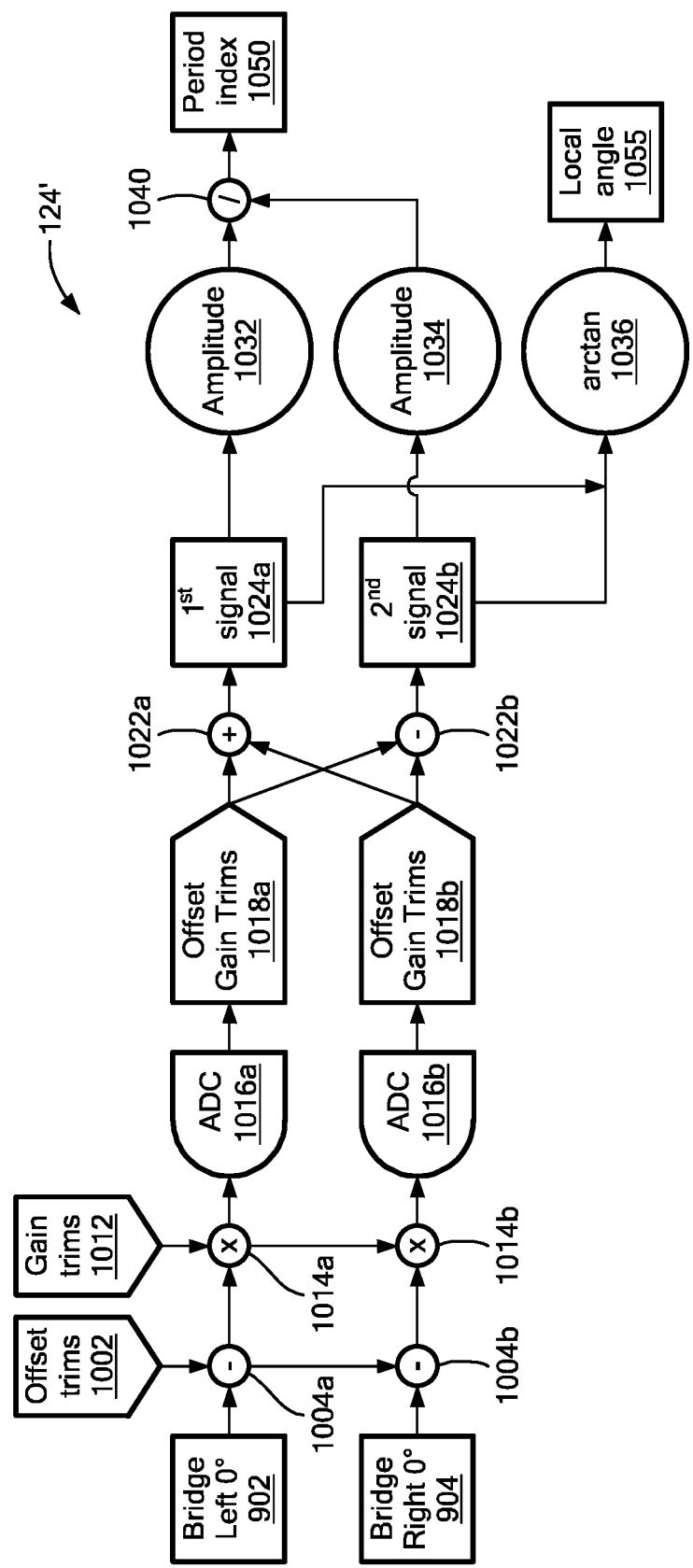
FIGS. 10A and 10B are a block diagram of an example of processing circuitry.
Figure 10B:
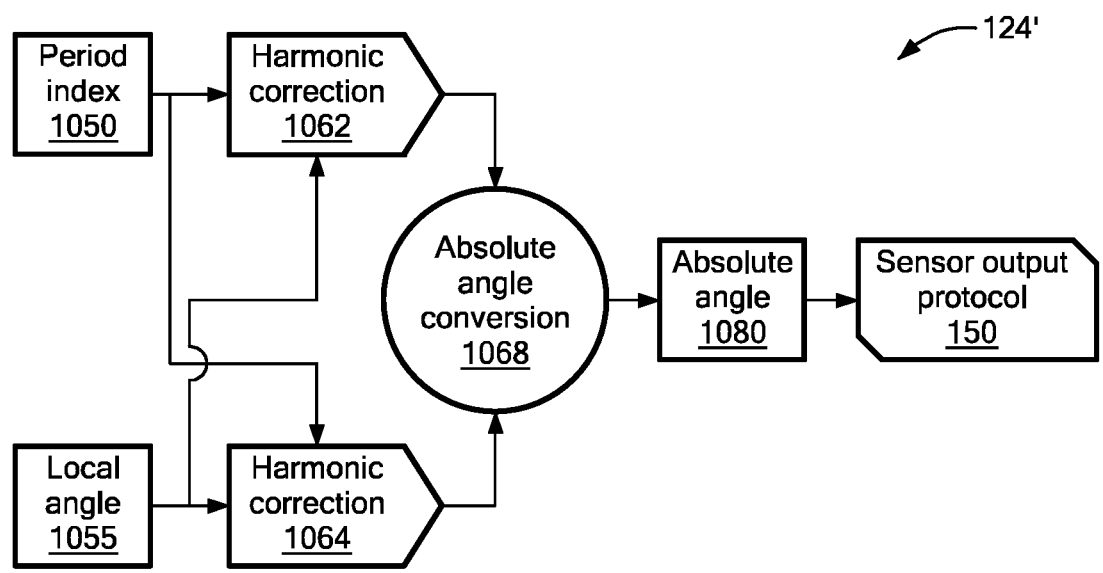

Referring to FIGS. 10A and 10B, an example of the processing circuitry 124 (FIG. 1) is processing circuitry 124'. The output of the bridge 902 is received by a subtractor 1004a where the output of the bridge 902 is reduced by offset trims 1002. An output of the subtractor 1004a is received by multiplicator 1014a and multiplied by gain trims 1012. An output of the multiplicator 1014a is converted to a digital signal by an analog-to-digital converter (ADC) 1016a to produce an offset gains trims digital signal 1018a.

The output of the bridge 904 is received by a subtractor 1004b where the output of the bridge 904 is reduced by the offset trims 1002. An output of the subtractor 1004b is received by multiplicator 1014b and multiplied by the gain trims 1012. An output of the multiplicator 1014b is converted to a digital signal by an analog-to-digital converter (ADC) 1016b to produce an offset gains trims digital signal 1018b.

The offset gain trims digital signal 1018a is added to the offset gain trims digital signal 1018b by the adder 1022a to form a first signal 1024a. The offset gain trims digital signal 1018b is subtracted from the offset gain trims digital signal 1018a by the subtractor 1022b to form a second signal 1024a.

An amplitude circuit 1032 outputs amplitudes of the first signal 1024a to a divider 1040 and an amplitude circuit 1034 outputs amplitudes of the second signal 1024b to the divider 1040. The divider 1040 divides the amplitudes from the first signal 1024a by the amplitudes of the second signal 1024b to form a period index 1050. In other examples, the divider 1040 may be replaced by a subtractor.

An arctangent circuit 1036 divides the second signal 1024a from the first signal 1024a and performs an arctangent function to determine a local angle signal 1055. The local angle is defined to be the angle within the North-South pole period corresponding to the period index. In one example, the local angle θ is:

$$\theta = \arctan\left(\frac{L-R}{L+R} \times \frac{\text{Amplitude}(L+R)}{\text{Amplitude}(L-R)}\right),$$

where L is the output of the left bridge 904, and R is the output of the right bridge 902.

The period index 1050 is corrected by the harmonic correction circuit 1062 based on the local angle 1055 and the local angle 1055 is corrected by the harmonic correction circuit 1064 based on the period index 1050. The absolute angle conversion circuit 1068 receives the harmonic corrected signals from the harmonic correction circuits 1062, 1064 to form an absolute angle 1080 which is converted to a sensor output protocol signal 150.

In one example, the absolute angle conversion circuit 1068 includes a register (not shown) that stores a position of each North-South pole pair and their length represented by the terms PolePos and PolLength, respectively, which are vectors. A term PeriodIndex corresponds to the period index 1050. The output of the absolute angle conversion circuit 1068 is:

output=PolPos[PeriodIndex]+LocalAnge*PoleLength
[PeriodIndex]/360.

Figure 11:
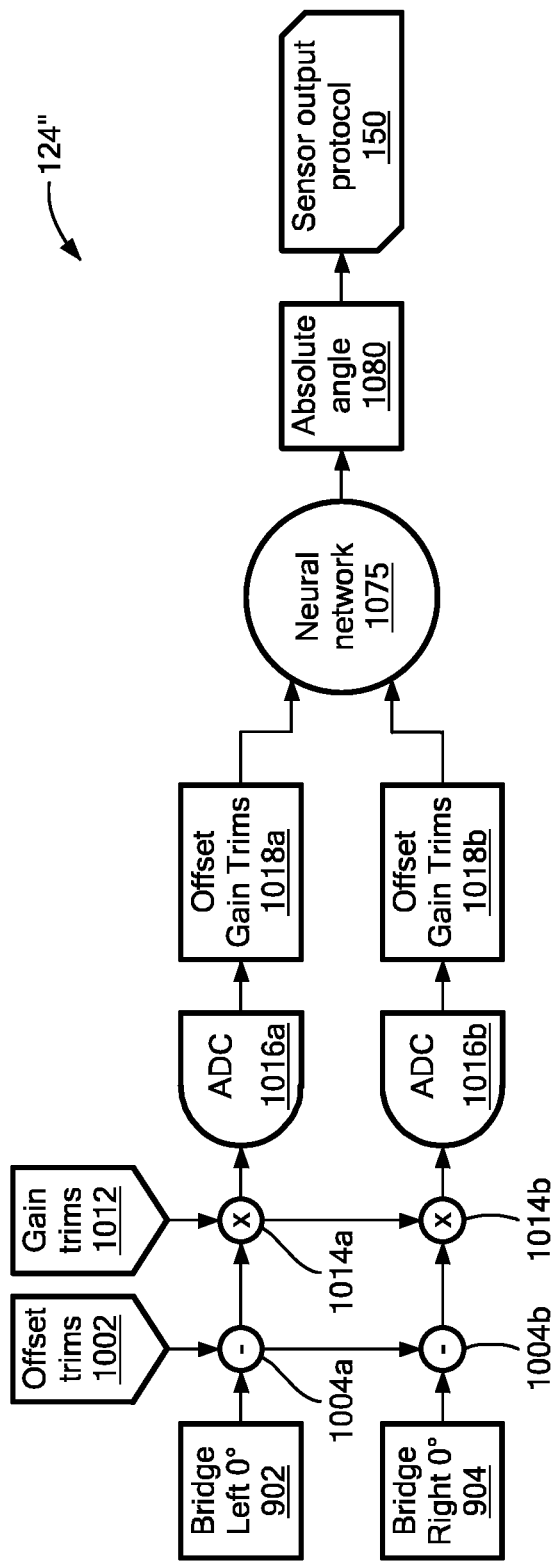
FIG. 11 is a block diagram of another example of the processing circuitry.

Referring to FIG. 11, another example of the processing circuitry 124 (FIG. 1) is the processing circuitry 124". The processing circuitry 124" is the same as the processing circuitry 124' except the adder 1022a; the subtractor 1022b; the amplitude circuits 1032, 1034; the divider 1040; the arctangent circuit 1036, the harmonic correction circuits 1062, 1064 and the absolute angle conversion circuit 1068 are replaced by a neural network circuit 1075.

In one example, the neural network circuit 1075 is a network of elementary units. Each unit determines a linear combination of all its inputs and a bias term, and then processes the result through an activation function that is a nonlinear function (except on the output units where it may be linear). The units are organized in layers and each layer takes as inputs the outputs of the previous layers. The first layer takes as an input an input layer, which includes parameters fed to the neural network circuit 1075. The number of units in each layer may be different. In one example, the neural network circuit 1075 is a multilayer perceptron (MLP).

Figure 12:
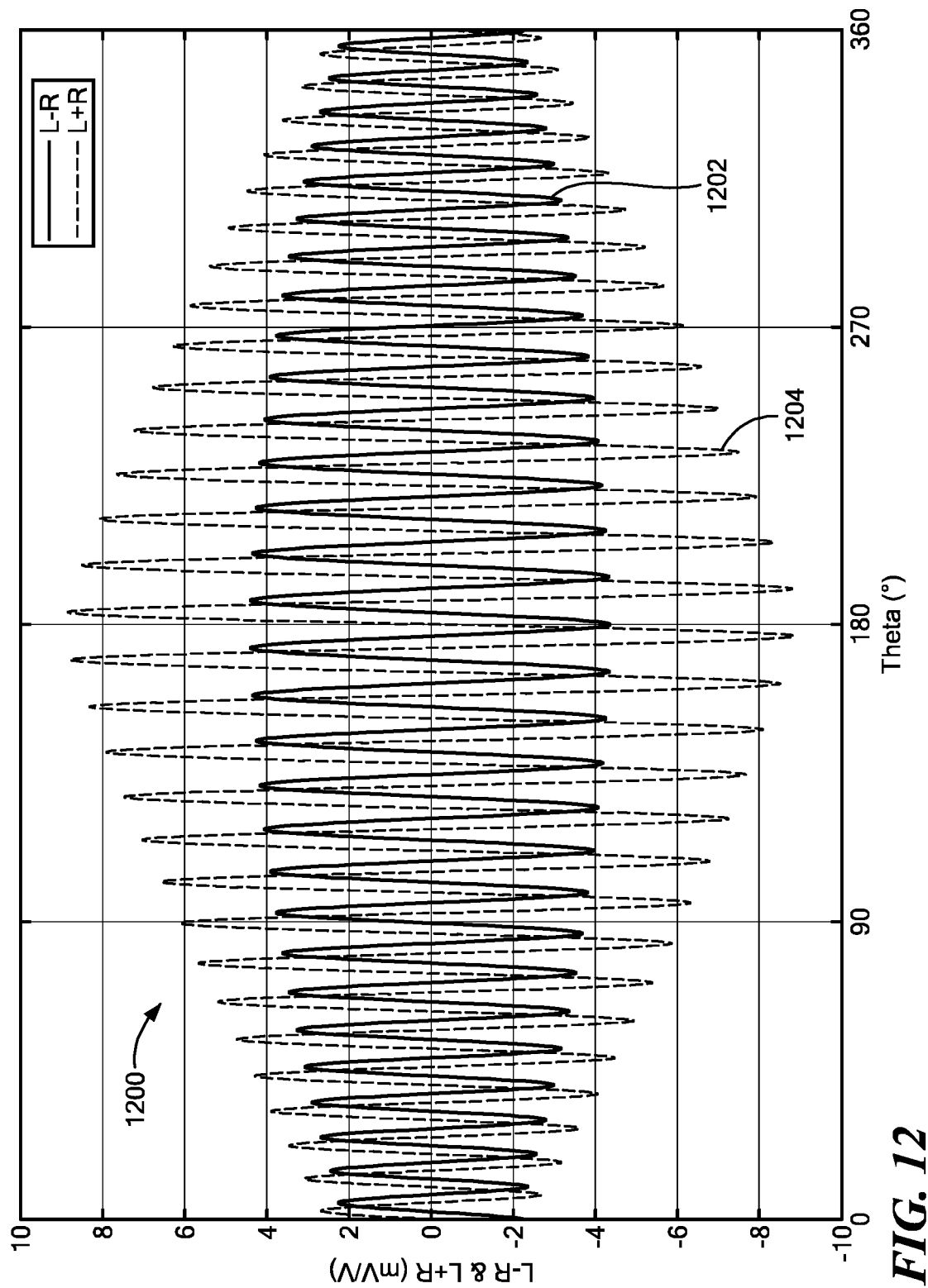
FIG. 12 is a graph of an example of a first signal resulting from adding output signals from the left and right bridges of FIGS. 9A and 9B and an example of a second signal resulting from subtracting the output of the right bridge from the left bridge of FIGS. 9A and 9B.

Referring to FIG. 12, a graph 1200 includes a plot 1202, which is the second signal 1024b (FIG. 10A) or the difference of an output from the offset gain trims 1018a (FIG. 10A) less an output signal from the output gain trims 1018b (FIG. 10A). The graph 1200 also includes a plot 1204, which is the first signal 1024a (FIG. 10A) or the summation of the output from the offset gain trims 1018a (FIG. 10A) and the output signal from the offset gain trims 1018b (FIG. 10A).

Figure 13:
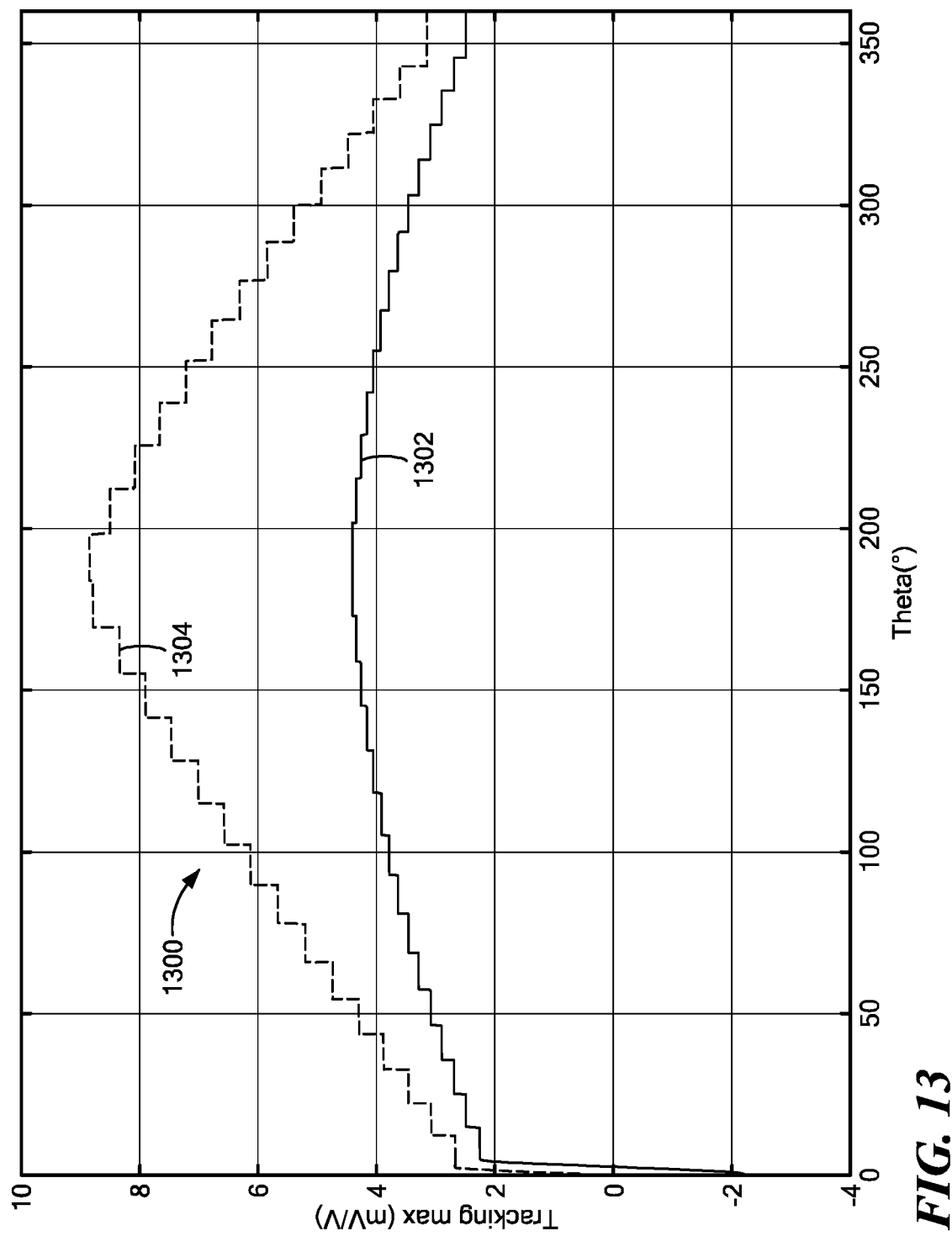
FIG. 13 is a graph representing amplitudes of the first signal of FIG. 12 and representing amplitudes of the second signal of FIG. 12.

Referring to FIG. 13, a graph 1300 includes a plot 1302, which includes amplitudes of the plot 1202 (FIG. 12). The graph 1300 also includes a plot 1304, which includes amplitudes of the plot 1204.

Figure 14:
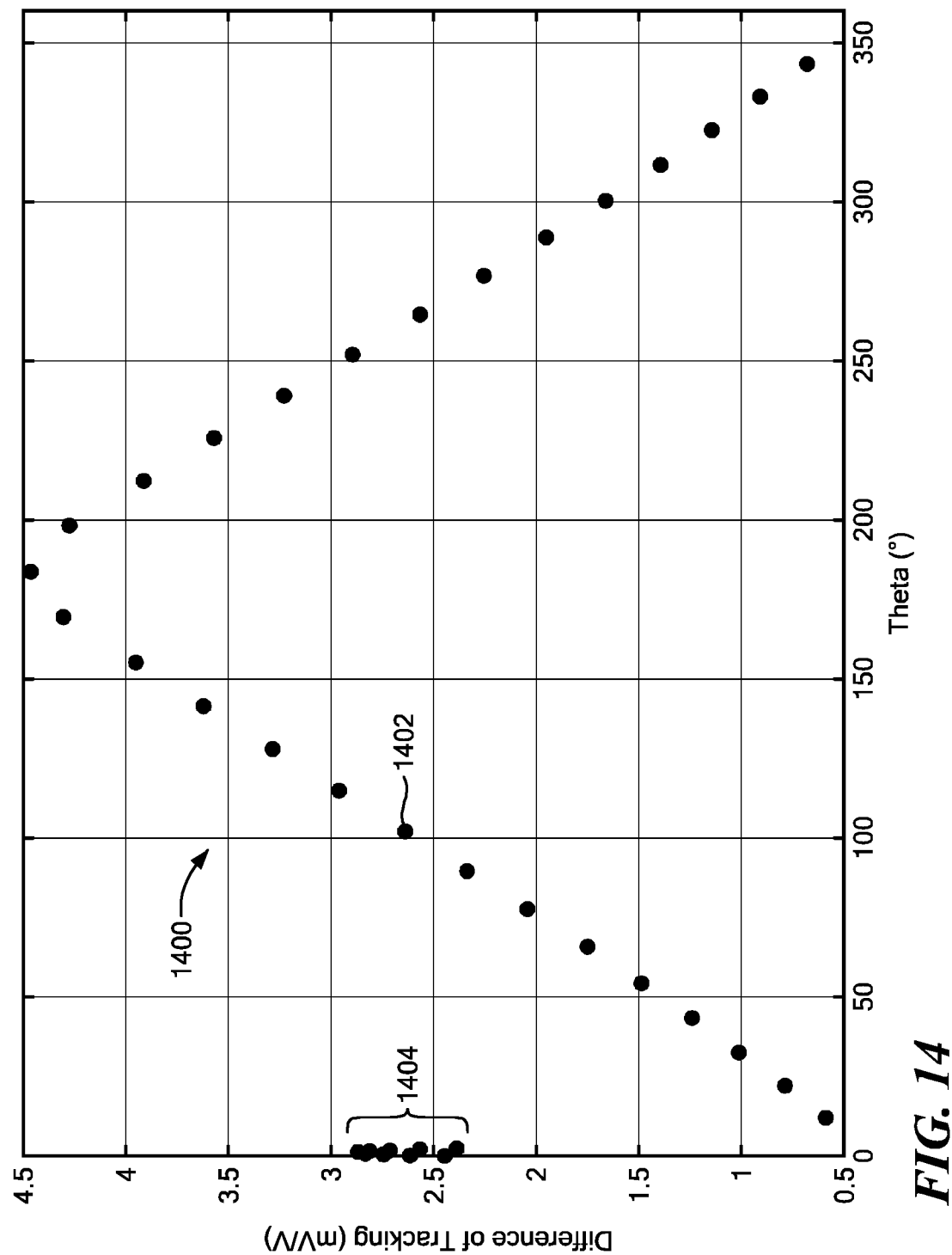
FIG. 14 is a graph of representing the difference of the third and fourth signals of FIG. 13.

Referring to FIG. 14, a graph 1400 includes a set of points (e.g., a point 1402), which is the difference of amplitudes between the plot 1304 (FIG. 13) and the plot 1302 (FIG. 13). A set of points 1404 to the left of the graph 1402 are not used since these points represent the beginning of the first period when tracking has not yet been initialized. Therefore, not using the set of points 1404, the remaining points are similar to the points in the graph 300 (FIG. 3). Thus, using the outputs of the right and left bridges 902, 904, the points in FIG. 14 may be used to identify the North-South pole pair on the ring magnet. In other examples, the graph 1400 may be replaced with a graph that takes the ratios of the amplitudes of the plots 1302, 1304 (FIG. 13).

Figure 15:
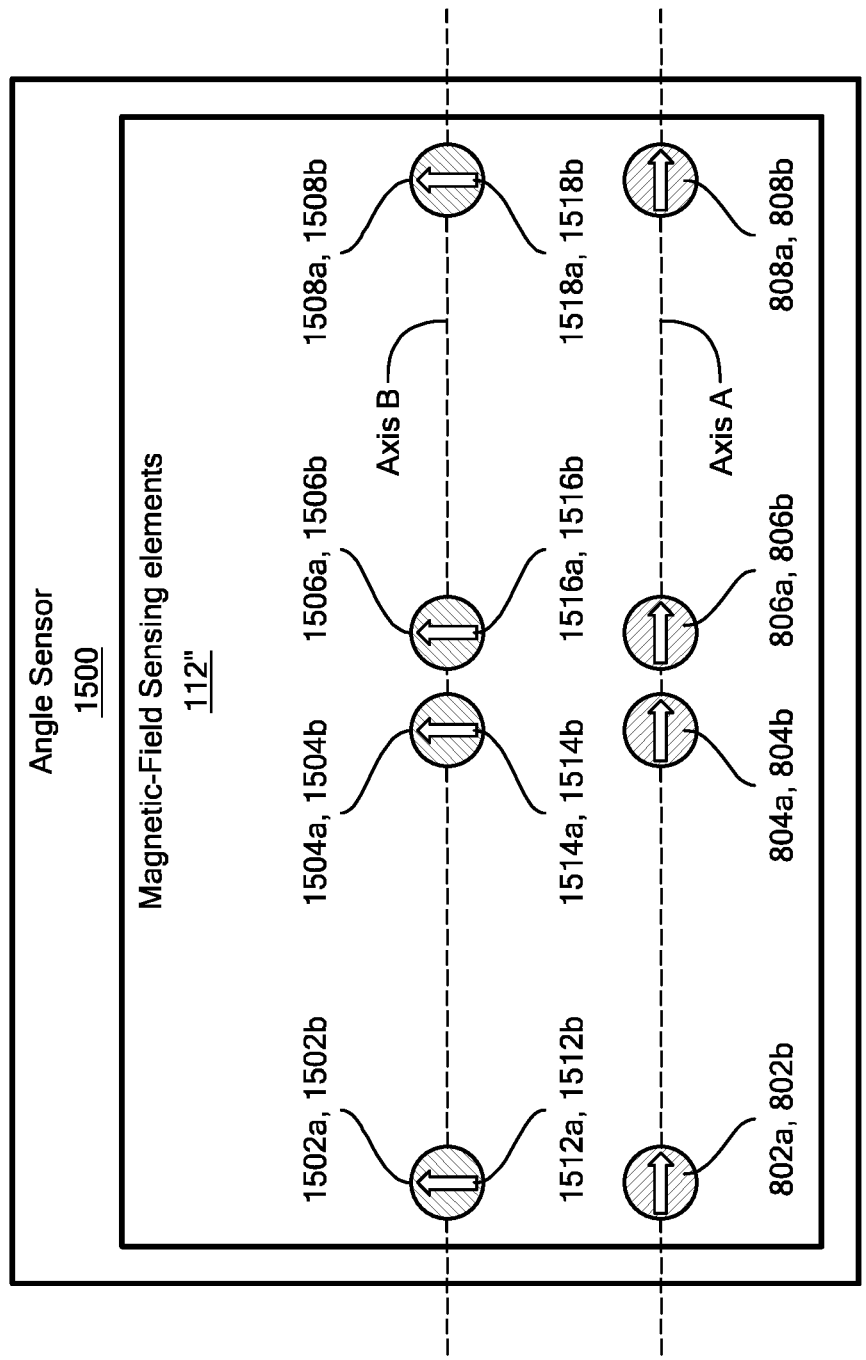
FIG. 15 is a diagram of another example of an angle sensor with four additional pairs of magnetic sensing elements from the off-axis sensor in FIG. 8.

Referring to FIG. 15, an example of the angle sensor 102 (FIG. 1) is an angle sensor 1500. The angle sensor 1500 includes magnetic-field sensing elements 112". The magnetic-field sensing elements 112" is the same as magnetic-field sensing elements 112' except the magnetic-field sensing elements 112" includes additional magnetic-field sensing elements. In particular, the magnetic-field sensing elements 112" further includes include a fifth pair of magnetic-field sensing elements 1502a, 1502b in a fifth location; a sixth pair of magnetic-field sensing elements 1504a, 1504b in a sixth location; a seventh pair of magnetic-field sensing elements 1506a, 1506b in a seventh location; and an eighth pair of magnetic-field sensing elements 1508a, 1508b located in an eighth location. The fifth, sixth, seventh and eighth pairs of magnetic-field sensing elements 1502a, 1502b, 1504a, 1504b, 1506a, 1506b, 1508a, 1508b are placed on an axis B parallel to the axis A.

The magnetic-field sensing element 1502a has a reference direction 1512a and magnetic-field sensing element 1502b has a reference direction 1512b. The magnetic-field sensing element 1504a has a reference direction 1514a and the magnetic-field sensing element 1504b has a reference direction 1514b. The magnetic-field sensing element 1506a has a reference direction 1516a and magnetic-field sensing element 1506b has a reference direction 1516b. The magnetic-field sensing element 1508a has a reference direction 1518a and the magnetic-field sensing element 1508b has a reference direction 1518b. The reference directions 1512a, 1512b, 1514a, 1514b, 1516a, 1516b, 1518a, 1518b are the same and orthogonal to the axis A and to the axis B.

Referring to FIGS. 16A and 16B, with the additional magnetic-field sensing elements 1512a, 1512b, 1514a, 1514b, 1516a, 1516b, 1518a, 1518b, additional bridges are formed. For example, a left bridge 1602 (e.g., a differential bridge) is formed by having the magnetic-field sensing elements 1502a, 1504a on one leg of the left bridge 1602 and the magnetic-field sensing elements 1502b, 1504b on the other leg of the left bridge 1602. A right bridge 1604 (e.g., a differential bridge) is formed by having the magnetic-field sensing elements 1506a, 1508a on one leg of the right bridge 1604 and the magnetic-field sensing elements 1506b, 1508b on the other leg of the right bridge 1604.

In one example, the bridges 1602, 1604 are gradiometers that reject a stray magnetic field along the reference direction. In this example, the magnetic field sensing elements 1502a-1502d may be a TMR (e.g., a vortex TMR or a PMA TMR).

In other examples, where a stray magnetic field is not significant, then the magnetic field sensing elements 1502a-1502d may be any GMR/TMR implemented without PMA or vortex topology.

Figure 17A:
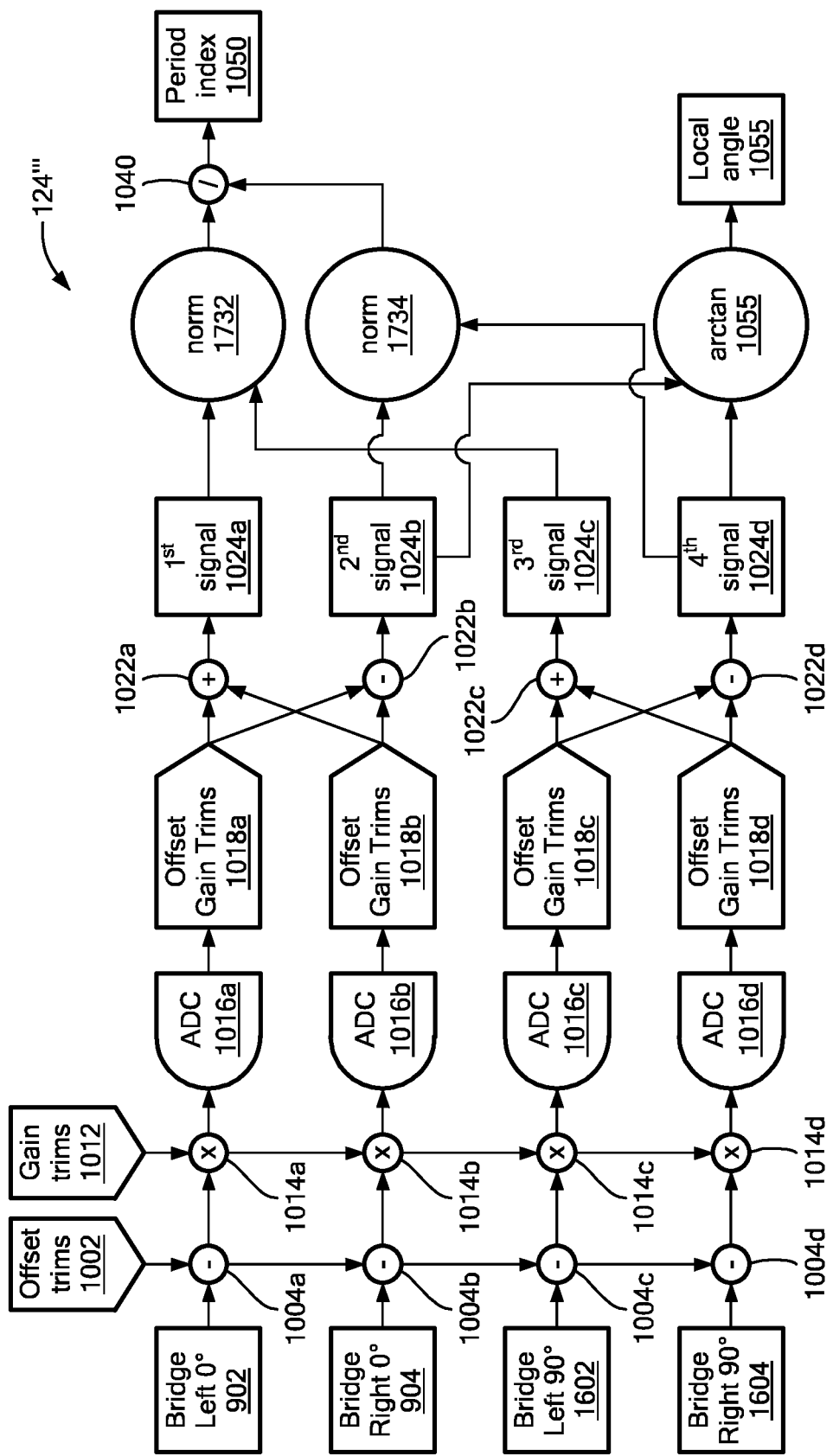
FIGS. 17A and 17B are a block diagram of a further example of the processing circuitry.
Figure 17B:
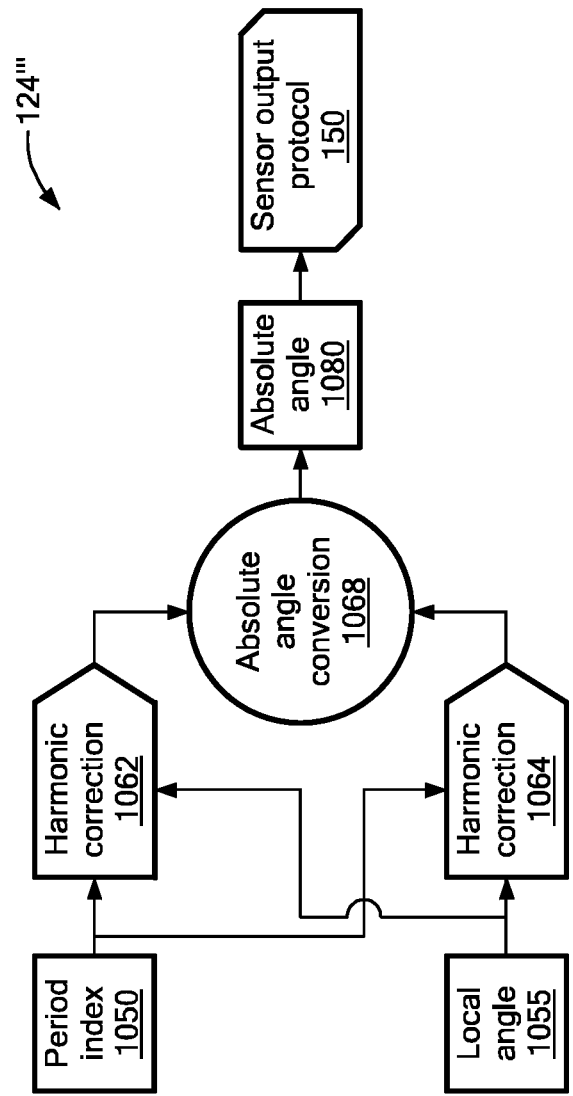

Referring to FIGS. 17A and 17B, another example of the processing circuitry 124 is processing circuitry 124'''. Processing circuitry 124''' is the same as processing circuitry 124' except the processing circuitry 124''' includes, for example, additional components such as a subtractor 1004c, a subtractor 1004d, a multiplicator 1014c, a multiplicator 1014d, an ADC 1016c, an ADC 1016d, an adder 1022c, and an adder 1022d to process outputs of the bridges 1602, 1604.

The output of the bridge 1602 is received by the subtractor 1004c where the output of the bridge 1602 is reduced by the offset trims 1002. An output of the subtractor 1004c is received by the multiplicator 1014c and multiplied by gain trims 1012. An output of the multiplicator 1014c is converted to a digital signal by the ADC 1016c to produce an offset gains trims digital signal 1018c.

The output of the bridge 1604 is received by the subtractor 1004d where the output of the bridge 1604 is reduced by the offset trims 1002. An output of the subtractor 1004d is received by multiplicator 1014d and multiplied by the gain trims 1012. An output of the multiplicator 1014d is converted to a digital signal by the ADC 1016d to produce an offset gains trims digital signal 1018d.

The offset gain trims digital signal 1018c is added to the offset gain trims digital signal 1018d by the adder 1022c to form a third signal 1024c. The offset gain trims digital signal 1018d is subtracted from the offset gain trims digital signal 1018c by the subtractor 1022d to form a fourth signal 1024d.

A normalization circuit 1732 normalizes the first signal 1024a and the third signal 1024c to produce an output signal that squares each signal 1024a, 1024c, determines a sum of the two square terms and determines the absolute value of the square root of the sum.

A normalization circuit 1734 normalizes the second signal 1024b and the fourth signal 1024d to produce an output signal that squares each signal 1024b, 1024d, determines the sum of the two square terms and determines an absolute value of the square root of the sum.

The divider 1040 divides the output of the normalization circuit 1732 by the output of the normalization circuit 1734 to produce the period index 1050.

In some examples, the first signal 1024a is equal to the sum of the output of the left bridge 902 and the right bridge 904 times an ellipticity correction error ECF. The second signal 1024b is the difference of the outputs of the left and right bridges 902, 904 times ECF. In one example, the ellipticity correction error ECF is added by the offset gain trims 1018a, 1018b.

Figure 18:
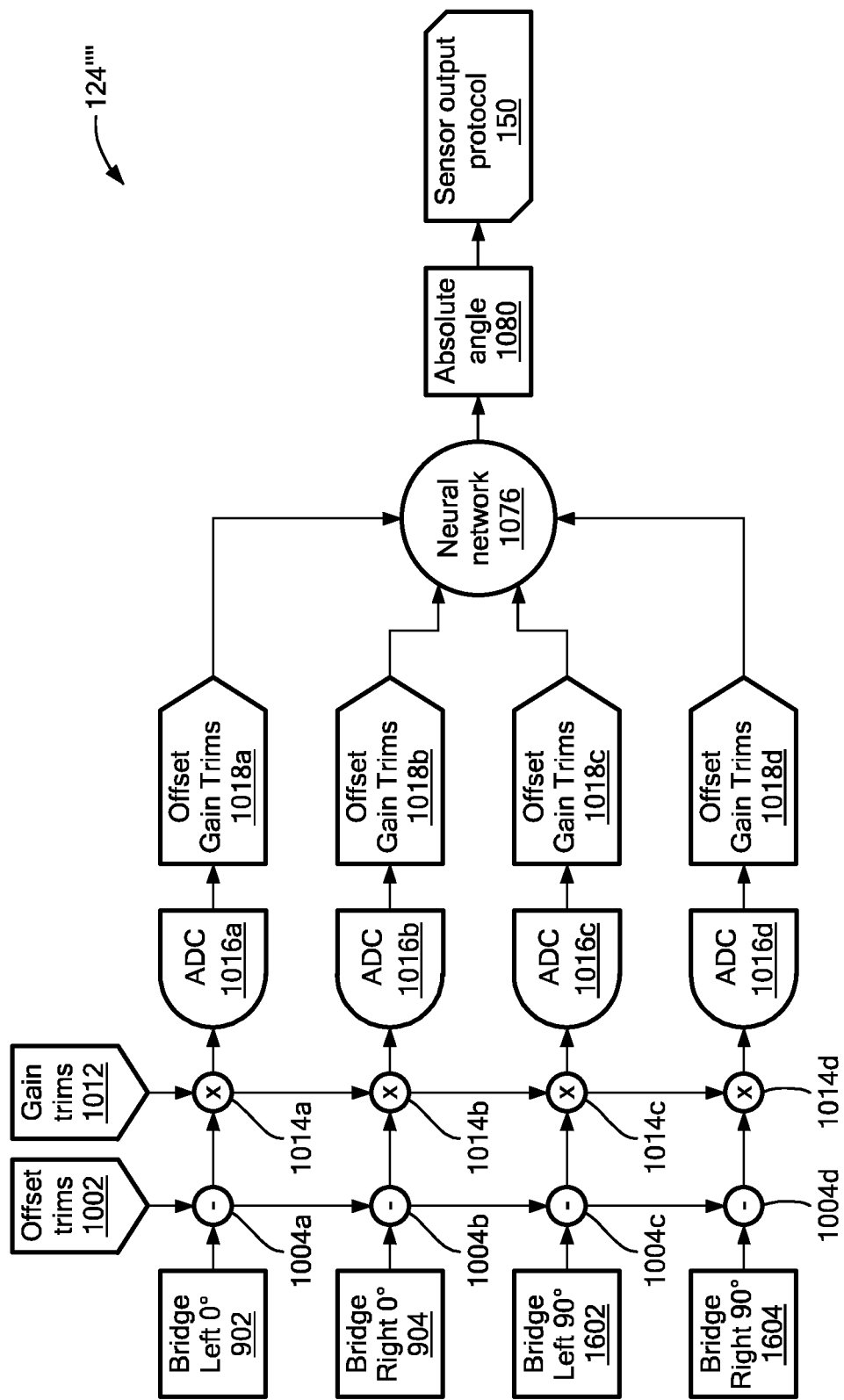
FIG. 18 is a block diagram of a still further example of processing circuitry.

Referring to FIG. 18, another example of the processing circuitry 124 (FIG. 1) is the processing circuitry 124''''. The processing circuitry 124'''' is the same as the processing circuitry 124' except the adders 1022a, 1022c; the subtractors 1022b, 1022d; the normalization circuits 1732, 1734; the divider 1040; the arctangent circuit 1036; the harmonic correction circuit 1062, 1064; and the absolute angle conversion circuit 1068 are replaced by the neural network circuit 1076. In one example, the neural network circuit 1076 is an MLP.

Figure 19:
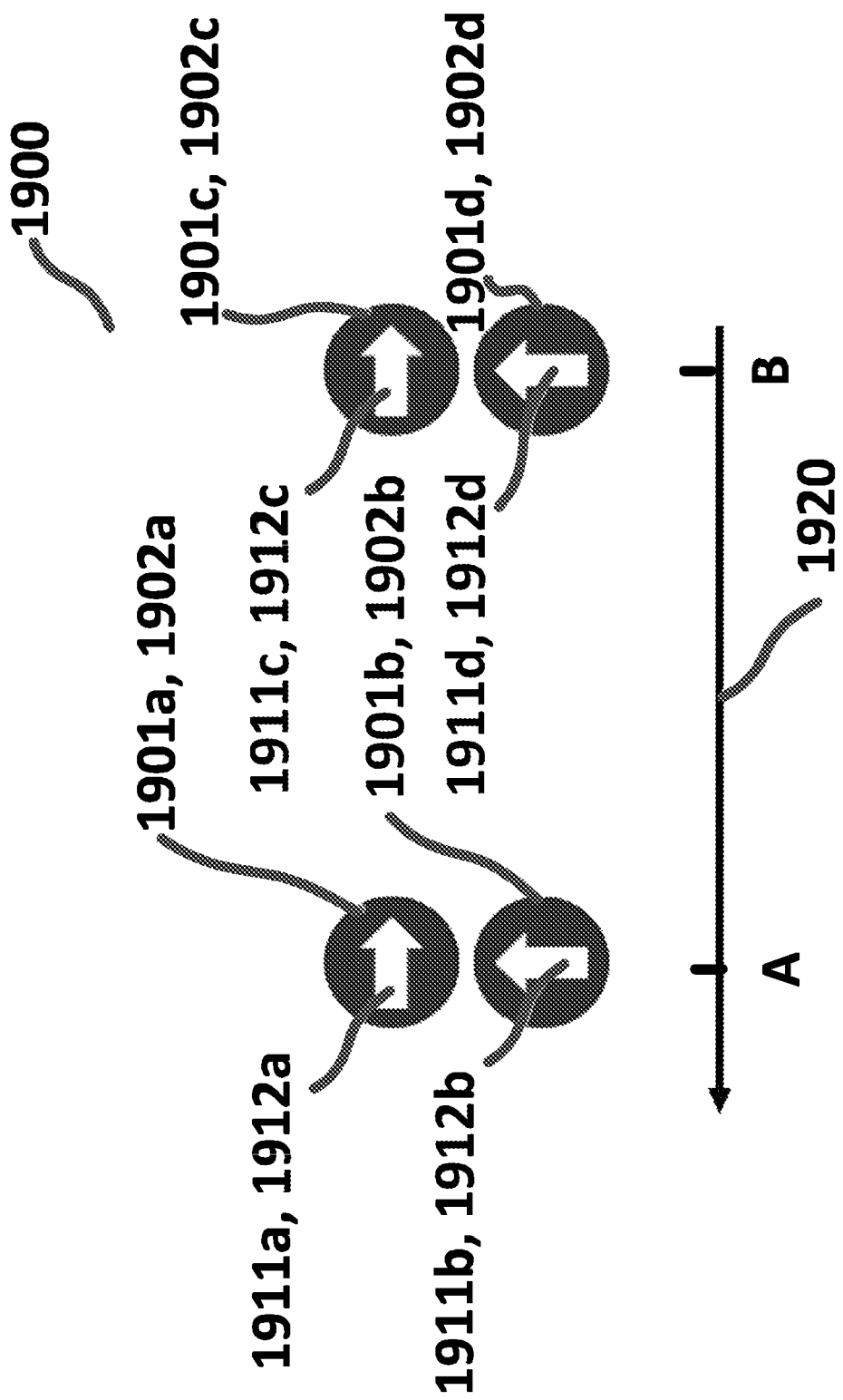
FIG. 19 is an example of a layout of magnetoresistance elements on a die.

Referring to FIG. 19, a layout 1900 includes at least eight magnetoresistance elements (e.g., a magnetoresistance element 1901a, a magnetoresistance element 1902a, a magnetoresistance element 1901b, a magnetoresistance element 1902b, a magnetoresistance element 1901c, a magnetoresistance element 1902c, a magnetoresistance element 1901d, a magnetoresistance element 1902d). The magnetoresistance elements 1901a, 1902a, 1901b, 1902b are located on a point A on an axis 1920 and the magnetoresistance elements 1901c, 1902c, 1901d, 1902d are located on a point B on the axis 1920. In one example, the point A is further from a target (not shown) than the point B.

The magnetoresistance element 1901a has a reference direction 1911a and the magnetoresistance element 1902a has a reference direction 1912a. The reference directions 1911a, 1912a are both in the same direction and parallel to the axis 1920.

The magnetoresistance element 1901b has a reference direction 1911b and the magnetoresistance element 1902b has a reference direction 1912b. The reference directions 1911b, 1912b are both in the same direction and perpendicular to the axis 1920.

The magnetoresistance element 1901c has a reference direction 1911c and the magnetoresistance element 1902c has a reference direction 1912c. The reference directions 1911c, 1912c are both in the same direction and parallel to the axis 1920.

The magnetoresistance element 1901d has a reference direction 1911d and the magnetoresistance element 1902d has a reference direction 1912d. The reference directions 1911d, 1912d are both in the same direction and perpendicular to the axis 1920.

Referring to FIG. 19A, in one example, the magnetoresistance elements 1901a-1901d, 1902a-1902d are each a TMR. Each TMR is formed as a pillar and includes a free layer. The free layer includes a vortex layer that includes a magnetic-field vortex. The magnetic-field vortex has a core 1970 (sometimes called a "magnetic vortex core"). The magnetization directions start to become more and more non-planar the closer to the center of the core 1970. That is, the angle of the magnetization direction with respect to the surface of the vortex layer 1960 increases the closer to the center of the core 1970 a magnetization direction is. For example, an angle of the magnetization direction 1964b with respect to the surface of the vortex layer 1960 is higher than the angle of the magnetization direction 1964a with respect to the surface of the vortex layer 1960, an angle of the magnetization direction 1964c with respect to the surface of the vortex layer 1960 is higher than the angle of the magnetization direction 1964b with respect to the surface of the vortex layer 1960, and an angle of the magnetization direction 1964d with respect to the surface of the vortex layer 1960 is higher than the angle of the magnetization direction 1964*c* with respect to the surface of the vortex layer 1960.

Figure 20A:
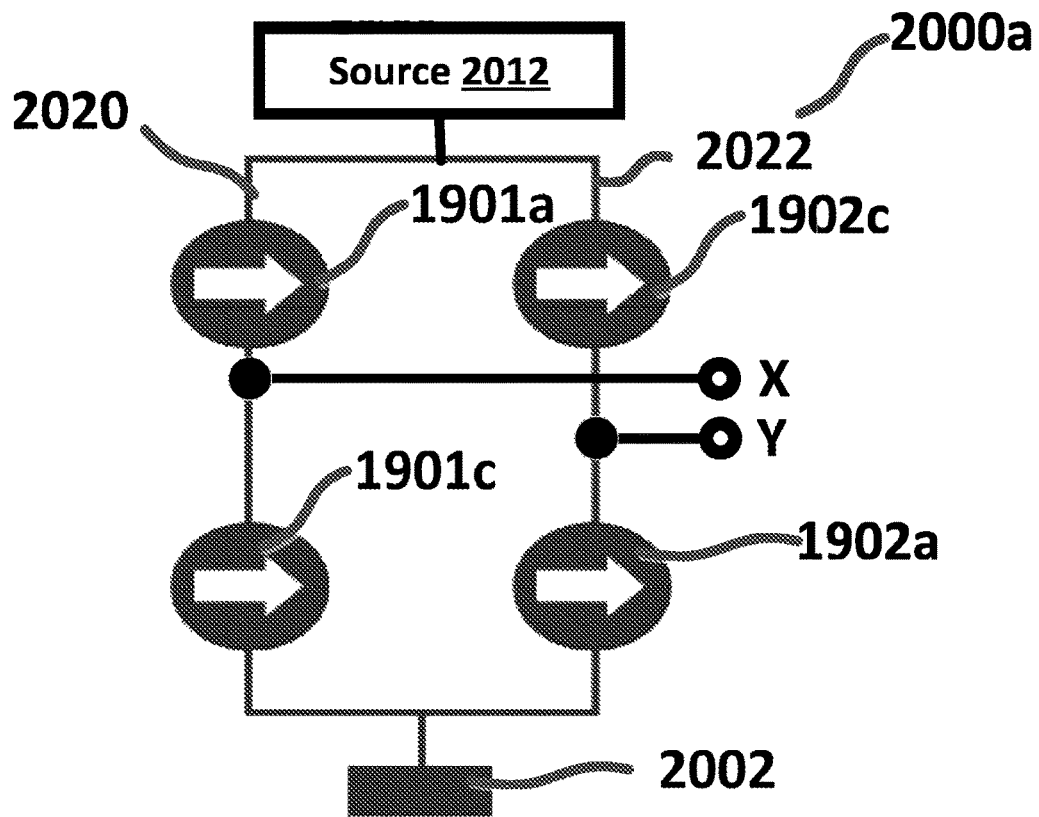
FIGS. 20A and 20B are examples of bridge configurations using the layout in FIG. 19.
Figure 20B:
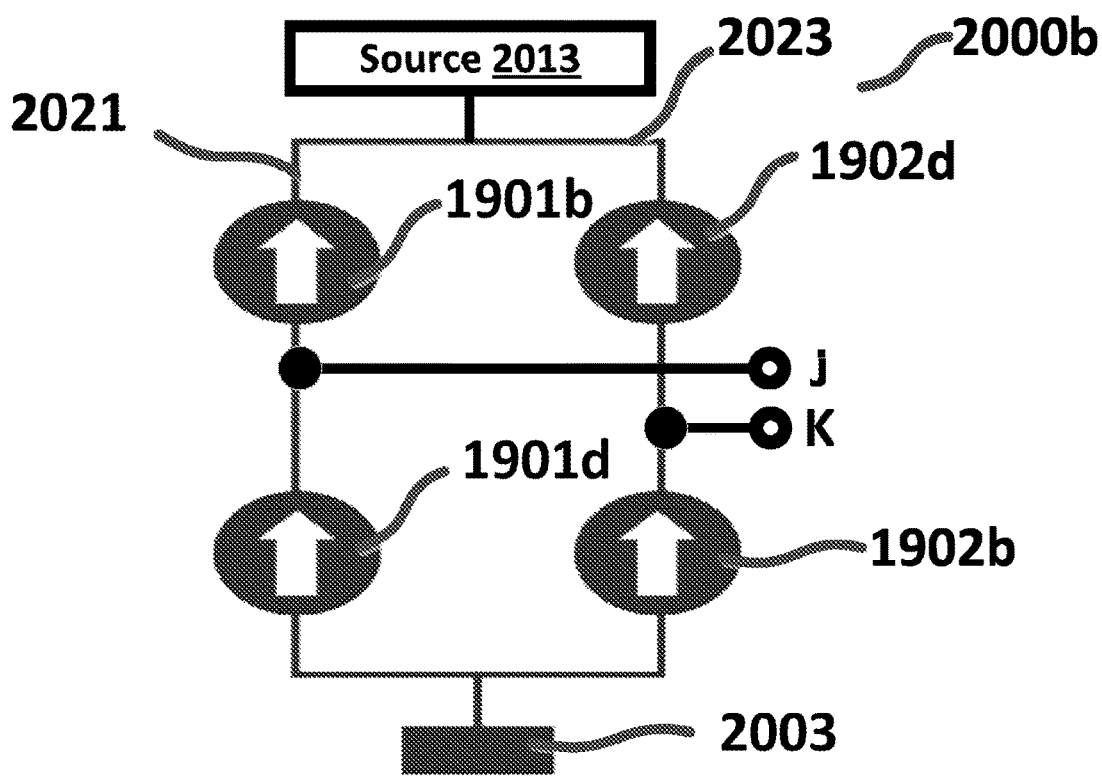

Referring to FIGS. 20A and 20B, the magnetoresistance elements 1901*a*-1901*d*, 1902*a*-1902*d* may be used to form a bridge 2000*a* and a bridge 2000*b*. The bridge 2000*a* has a differential output at a node X and a node Y. The bridge 2000*b* has a differential output at a node J and a node K.

The bridge 2000*a* senses a gradient of the senses magnetic field along the axis 1920. The bridge 2000*b* senses the second derivative of a magnetic field along the axis 1920.

The bridge 2000*a* includes a differential point 2002 (e.g., ground) and a source 2012 (e.g., a current source, a voltage source). A leg 2020 of the bridge 2000*a* includes the magnetoresistance element 1901*a* and a magnetoresistance element 1901*c*. The magnetoresistance element 1901*a* is electrically closer in series to the source 2012 than the magnetoresistance element 1901*c*.

A leg 2022 of the bridge 2000*a* includes the magnetoresistance element 1902*c* and a magnetoresistance element 1902*a*. The magnetoresistance element 1902*c* is electrically closer in series to the source 2012 than the magnetoresistance element 1902*a*.

The bridge 2000*b* includes a differential point 2003 (e.g., ground) and a source 2013 (e.g., a current source, a voltage source). A leg 2021 of the bridge 2000*b* includes the magnetoresistance element 1901*b* and a magnetoresistance element 1901*d*. The magnetoresistance element 1901*b* is electrically closer in series to the source 2013 than the magnetoresistance element 1901*d*.

A leg 2023 of the bridge 2000*b* includes the magnetoresistance element 1902*d* and a magnetoresistance element 1902*b*. The magnetoresistance element 1902*d* is electrically closer in series to the source 2013 than the magnetoresistance element 1902*b*.

While FIGS. 20A and 20B each depict full bridges 2000*a*, 2000*b*, in other embodiments, half-bridges may be used instead. For example, less magnetoresistance elements (e.g., at least four magnetoresistance elements) may be used than depicted in FIG. 19.

Figure 21A:
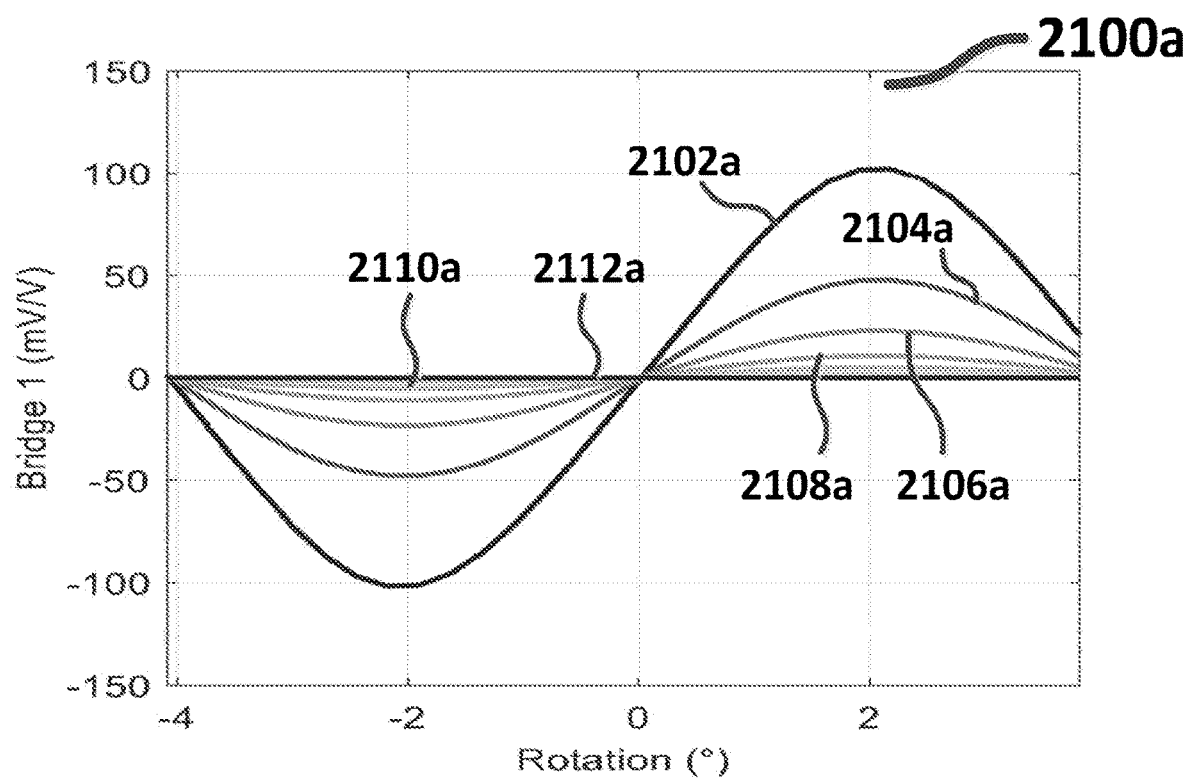
FIGS. 21A and 21B are graphs depicting raw outputs of the bridges in FIGS. 20A and 20B.
Figure 21B:
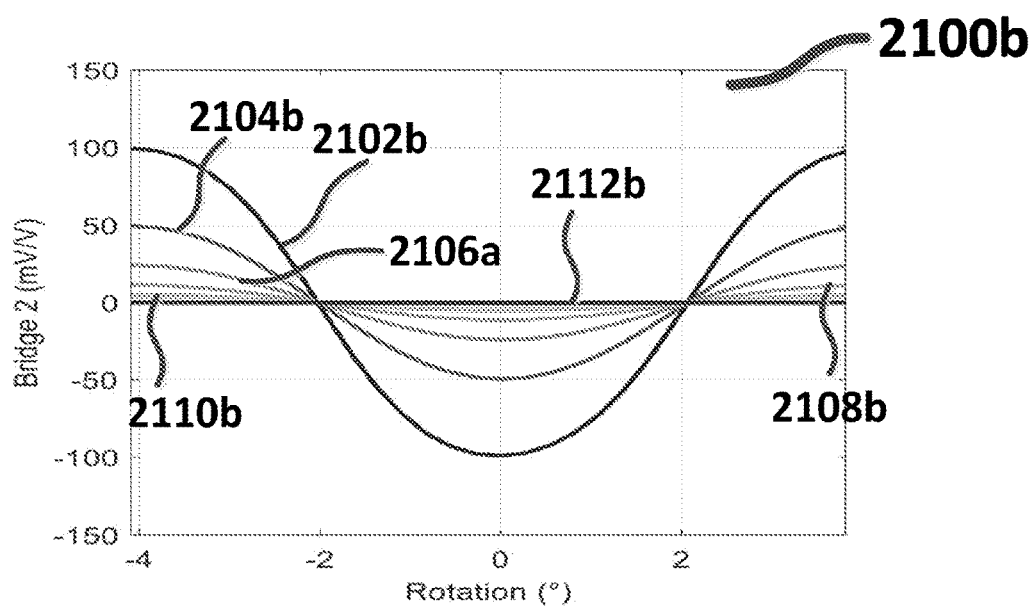

Referring to FIG. 21A and FIG. 21B, a graph 2100*a* depicts the output of the bridge 2000*a* versus target rotation of the bridge 2000*a* for different air gaps between the bridge 2000*a* and the target. A curve 2102*a* represents an air gap of 0.5 mm. A curve 2104*a* represents an air gap of 1 mm. A curve 2106*a* represents an air gap of 1.5 mm. A curve 2108*a* represents an air gap of 2.0 mm. A curve 2110*a* represents an air gap of 3.0 mm. A curve 2112*a* represents an air gap of 6 mm.

A graph 2100*b* depicts the output of the bridge 2000*b* for different air gaps between the bridge 2000*b* and the target. A curve 2102*b* represents an air gap of 0.5 mm. A curve 2104*b* represents an air gap of 1.0 mm. A curve 2106*b* represents an air gap of 1.5 mm. A curve 2108*b* represents an air gap of 2.0 mm. A curve 2110*b* is an air gap of 3.0 mm. A curve 2112*b* represents an air gap of 6 mm.

Figure 22A:
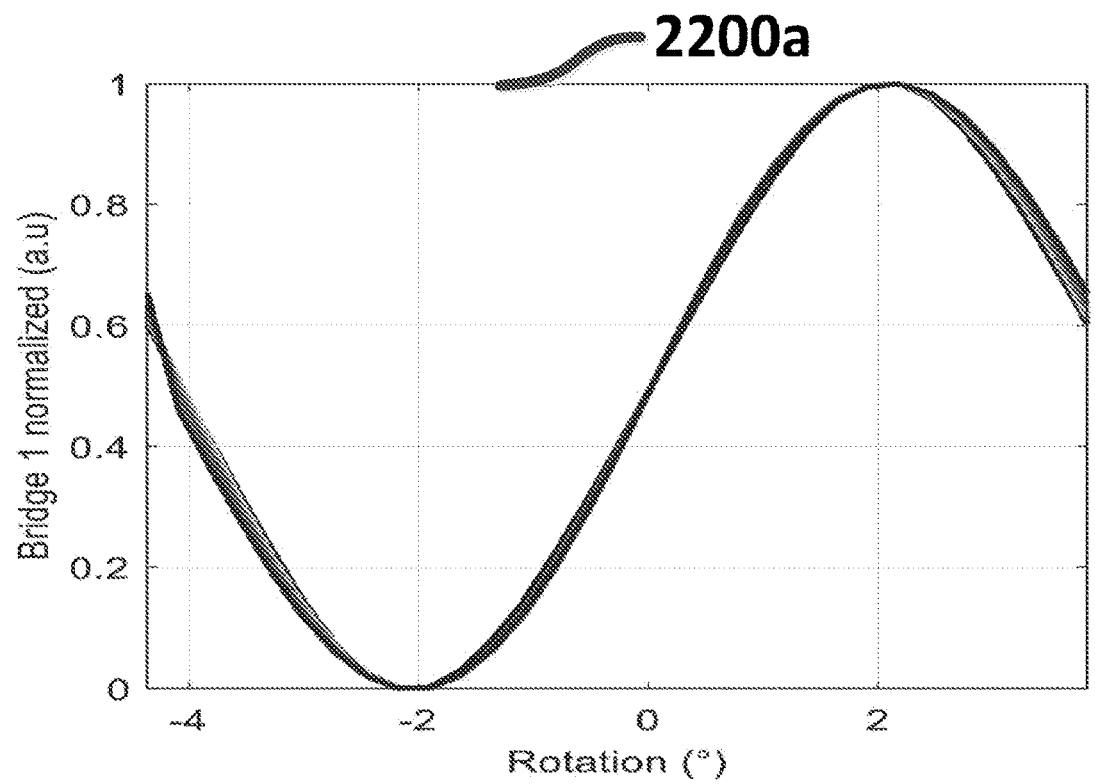
FIGS. 22A and 22B are graphs depicting normalized outputs of the bridges in FIGS. 20A and 20B.
Figure 22B:
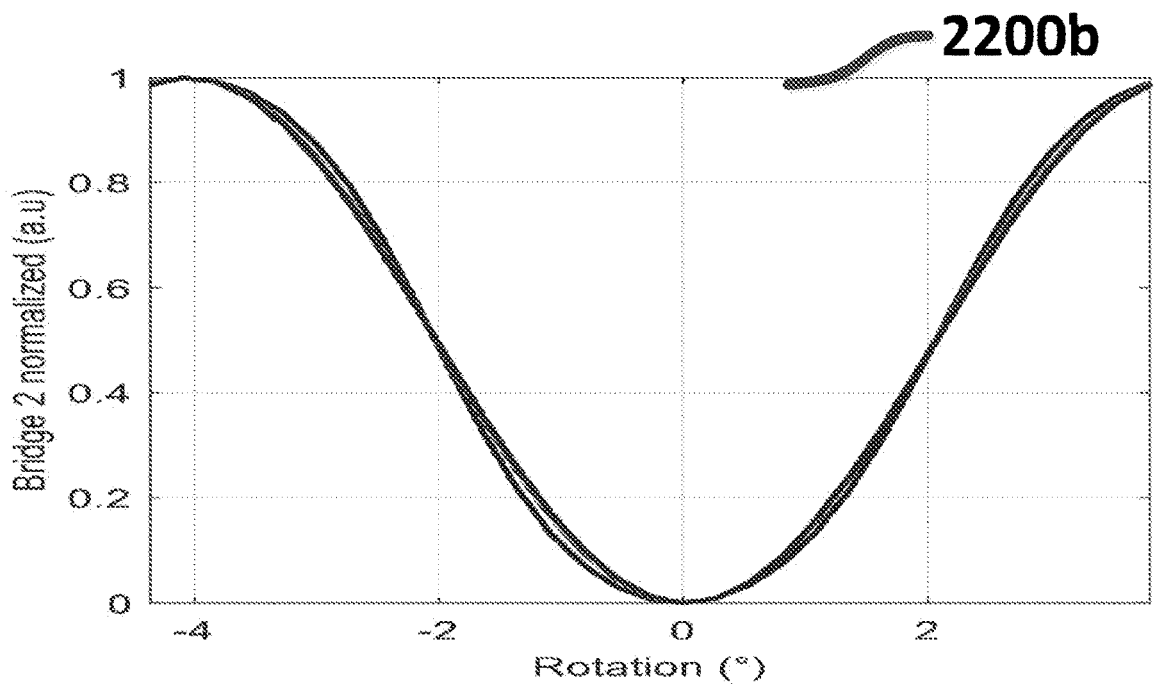

Referring to FIGS. 22A and 22B, a graph 2200*a* is a normalized output of the bridge 2000*a* versus target rotation of the bridge 2000*a* for the different air gaps shown in FIG. 21A. As one of ordinary skill in the art can observe from the graph 2200*a*, the normalized output of the bridge 2000*a* is about the same regardless of air gap.

A graph 2200*b* is a normalized output of the bridge 2000*b* versus target rotation of the bridge 2000*b* for the different air gaps shown in FIG. 21B. As one of ordinary skill in the art can observe from the graph 2200*b*, the normalized output of the bridge 2000*b* is about the same regardless of air gap.

Figure 23:
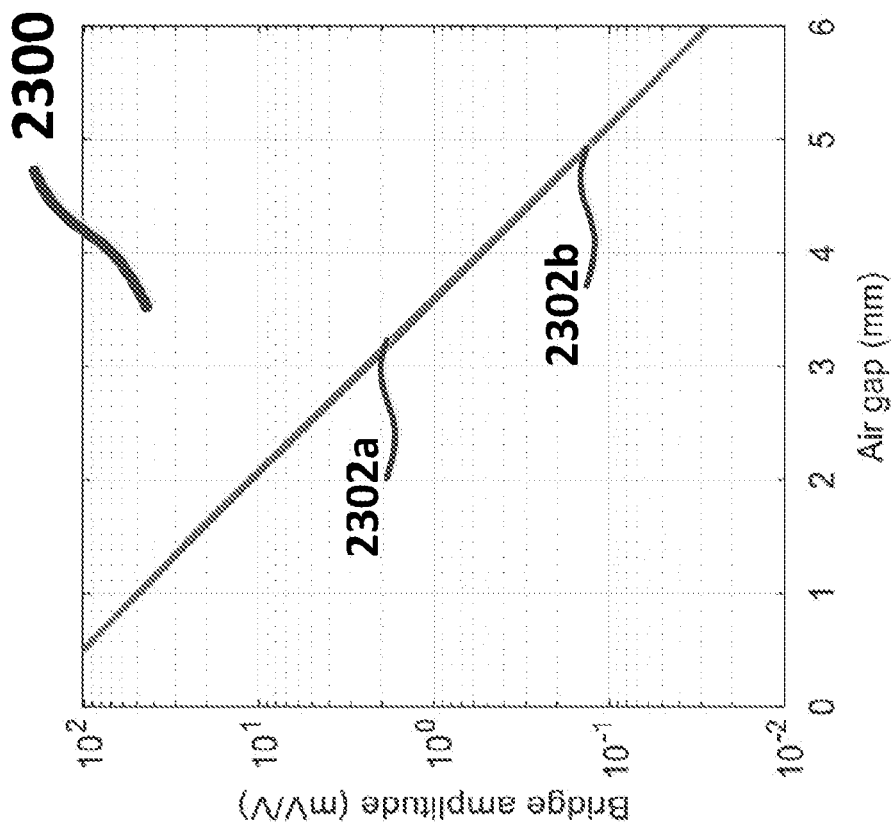
FIG. 23 is a graph depicting outputs of the bridges in FIGS. 20A and 20B versus air gap.

Referring to FIG. 23, a graph 2300 depicts a curve 2302*a* and a curve 2302*b*. The curve 2302*a* depicts an amplitude of the output of the bridge 2000*a* versus air gap between the bridge 2000*a* and a target. The curve 2302*b* depicts an amplitude of the output of the bridge 2000*b* versus air gap between the bridge 2000*a* and the target. As one of ordinary skill in the art can observe from the graph 2200*a*, the curves 2302*a*, 2302*b* are virtually the same.

Figure 24:
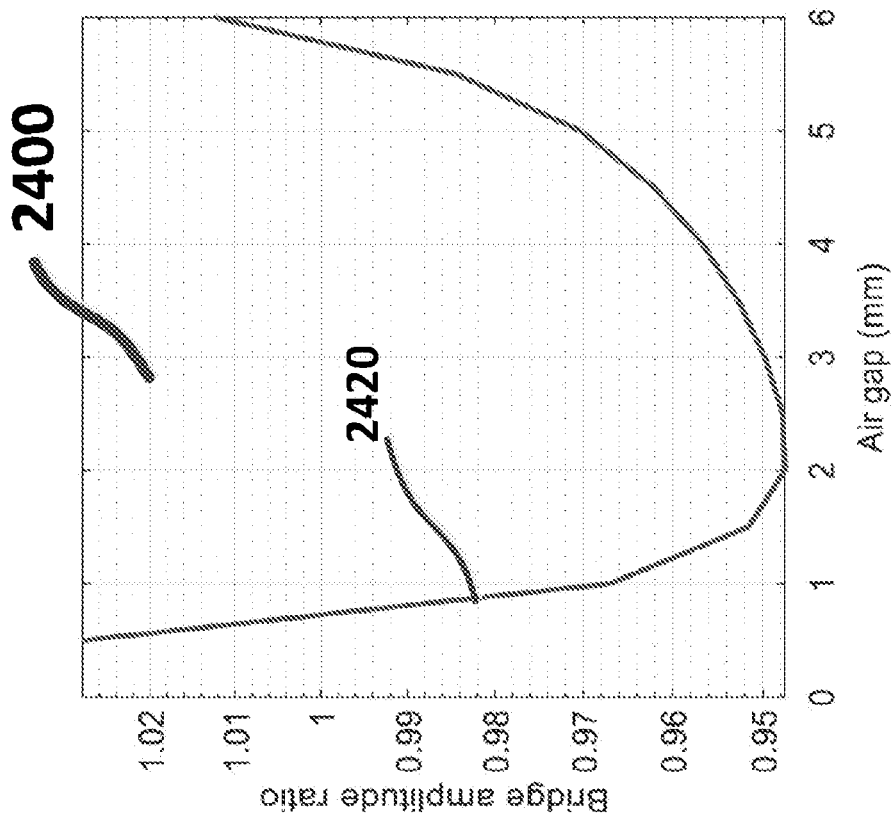
FIG. 24 is a graph depicting a ratio of the outputs of the bridges in FIGS. 20A and 20B versus air gap.

Referring to FIG. 24, a graph 2400 depicts a curve 2420. The curve 2420 depicts a ratio of the amplitude of the output of the bridge 2000*a* and the amplitude of the output of the bridge 2000*b* versus the air gap between the bridges 2000*a*, 2000*b* and the target.

Figure 25:
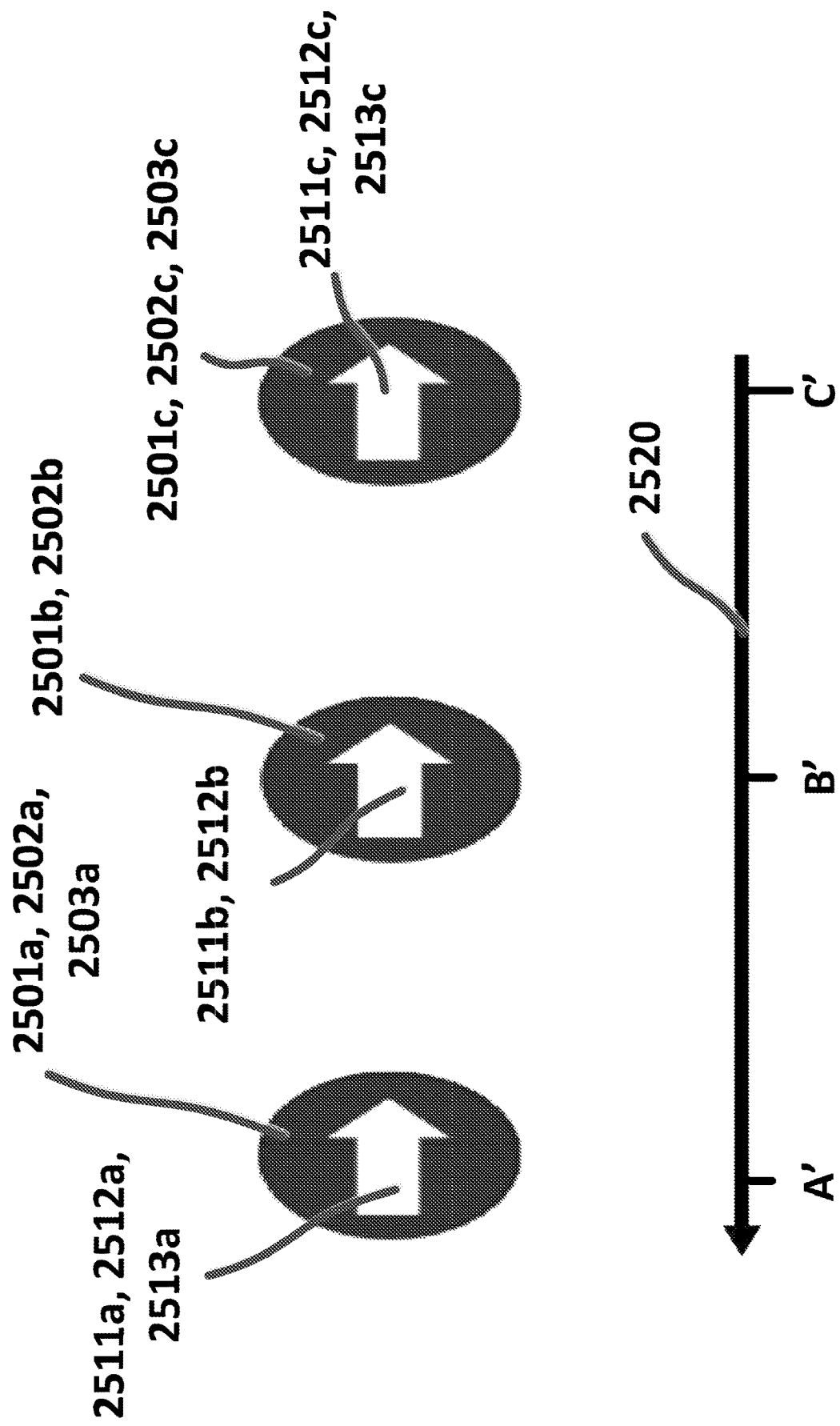
FIG. 25 is another example of a layout of magnetoresistance elements on a die.

Referring to FIG. 25, a layout 2500 includes at least eight magnetoresistance elements (e.g., a magnetoresistance element 2501*a*, a magnetoresistance element 2502*a*, a magnetoresistance element 2503*a*, a magnetoresistance element 2501*b*, a magnetoresistance element 2502*b*, a magnetoresistance element 2501*c*, a magnetoresistance element 2502*c*, a magnetoresistance element 2503*c*). The magnetoresistance elements 2501*a*, 2502*a*, 2503*a* are located on a point A' on an axis 2520. The magnetoresistance elements 2501*b*, 2502*b* are located on a point B' on the axis 2520. The magnetoresistance elements 2501*c*, 2502*c*, 2503*c* are located on a point C' on the axis 2520.

A distance from the point A' to the point B' is equal to a distance from the point B' to the point C'. In one example, the point A' is further from a target (not shown) than the point B' and the point B' is further from the target than the point C'.

The magnetoresistance element 2501*a* has a reference direction 2511*a*, the magnetoresistance element 2502*a* has a reference direction 2512*a*, and the magnetoresistance element 2503*a* has a reference direction 2513*a*. The reference directions 2511*a*, 2512*a*, 2513*a* are each in the same direction and parallel to the axis 2520.

The magnetoresistance element 2501*b* has a reference direction 2511*b* and the magnetoresistance element 2502*b* has a reference direction 2512*b*. The reference directions 2511*b*, 2512*b* are both in the same direction and in the same direction as reference directions 2511*a*, 2512*a*, 2513*a*, which are parallel to the axis 2520.

The magnetoresistance element 2501*c* has a reference direction 2511*c*, the magnetoresistance element 2502*c* has a reference direction 2512*c*, and the magnetoresistance element 2503*c* has a reference direction 2513*c*. The reference directions 2511*c*, 2512*c*, 2513*c* are both in the same direction and in the same direction as reference directions 2511*a*, 2512*a*, 2513*a*, which are parallel to the axis 2520.

In one example, the magnetoresistance elements 2501*a*-2501*c*, 2502*a*-2502*b*, 2503*a*-2503*c* are each a TMR. The magnetoresistance elements 2501*a*-2501*c*, 2502*a*-2502*b*, 2503*a*-2503*c* each include a free layer that includes a vortex layer with a magnetic-field vortex.

Figure 26A:
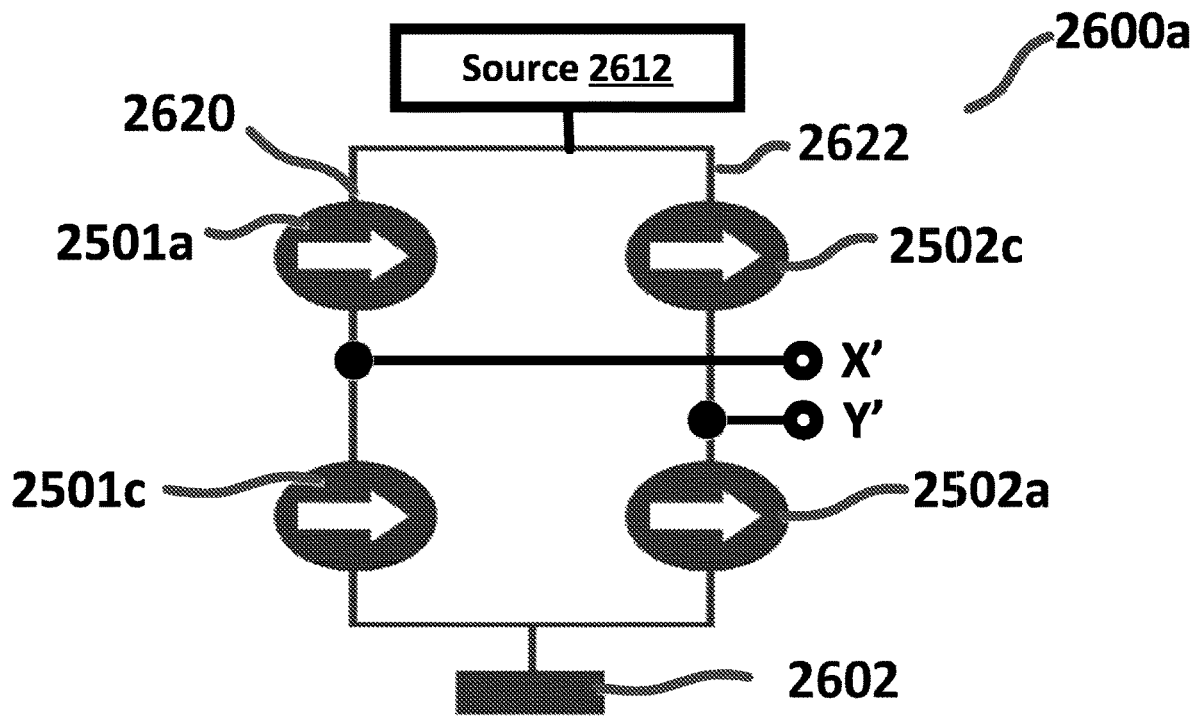
FIGS. 26A and 26B are examples of bridge configurations using the layout in FIG. 25.
Figure 26B:
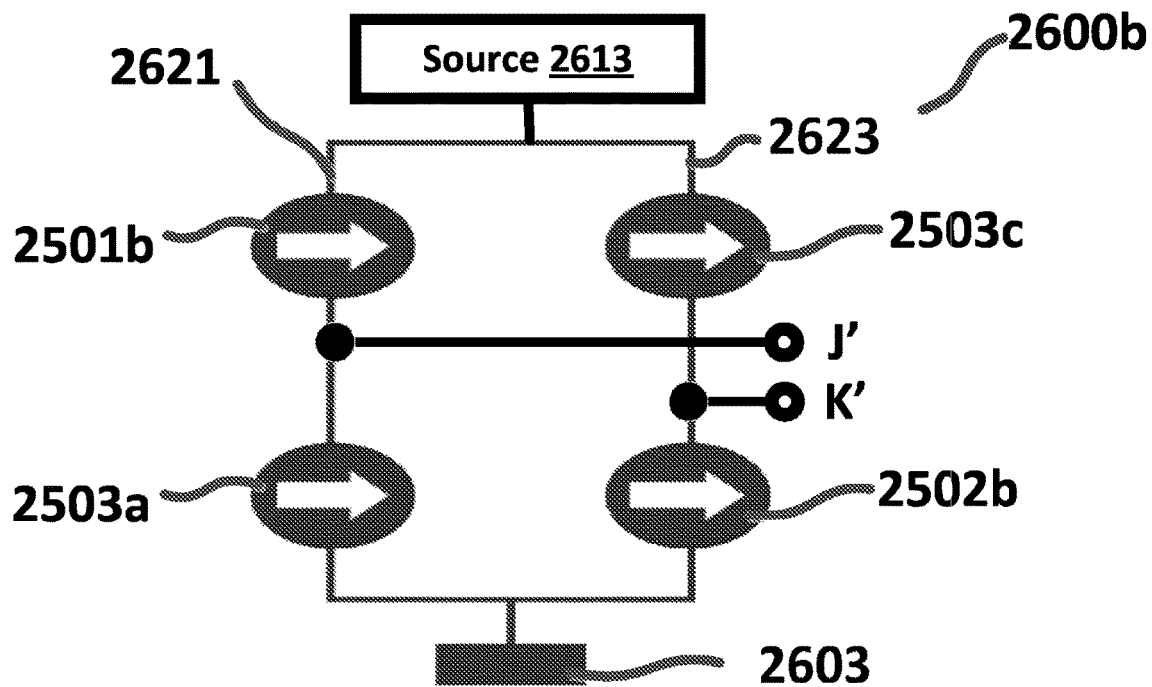

Referring to FIGS. 26A and 26B, the magnetoresistance elements 2501*a*-2501*c*, 2502*a*-2502*b*, 2503*a*-2503*c* may be used to form a bridge 2600*a* and a bridge 2600*b*. The bridge 2600*a* has a differential output at a node X' and a node Y'. The bridge 2600*b* has a differential output at a node J' and a node K'.

The bridge 2600*a* senses a gradient of the senses magnetic field along the axis 2520. The bridge 2600*b* senses the second derivative of a magnetic field along the axis 2520.

The bridge 2600*a* includes a differential point 2602 (e.g., ground) and a source 2612 (e.g., a current source, a voltage source). A leg 2620 of the bridge 2600*a* includes the magnetoresistance element 2501*a* and a magnetoresistance element 2501c. The magnetoresistance element 2501a is electrically closer in series to the source 2612 than the magnetoresistance element 2501c.

A leg 2622 of the bridge 2600a includes the magnetoresistance element 2502c and a magnetoresistance element 2502a. The magnetoresistance element 2502c is electrically closer in series to the source 2612 than the magnetoresistance element 2502a.

The bridge 2600b includes a differential point 2603 (e.g., ground) and a source 2613 (e.g., a current source, a voltage source). A leg 2621 of the bridge 2600b includes the magnetoresistance element 2501b and a magnetoresistance element 2503a. The magnetoresistance element 2501b is electrically closer in series to the source 2613 than the magnetoresistance element 2503a.

A leg 2623 of the bridge 2600b includes the magnetoresistance element 2503c and a magnetoresistance element 2502b. The magnetoresistance element 2503c is electrically closer in series to the source 2613 than the magnetoresistance element 2502b.

While FIGS. 26A and 26B each depict full bridges 2600a, 2600b, in other embodiments, half-bridges may be used instead. For example, less magnetoresistance elements (e.g., at least four magnetoresistance elements) may be used than depicted in FIG. 25.

Figure 27A:
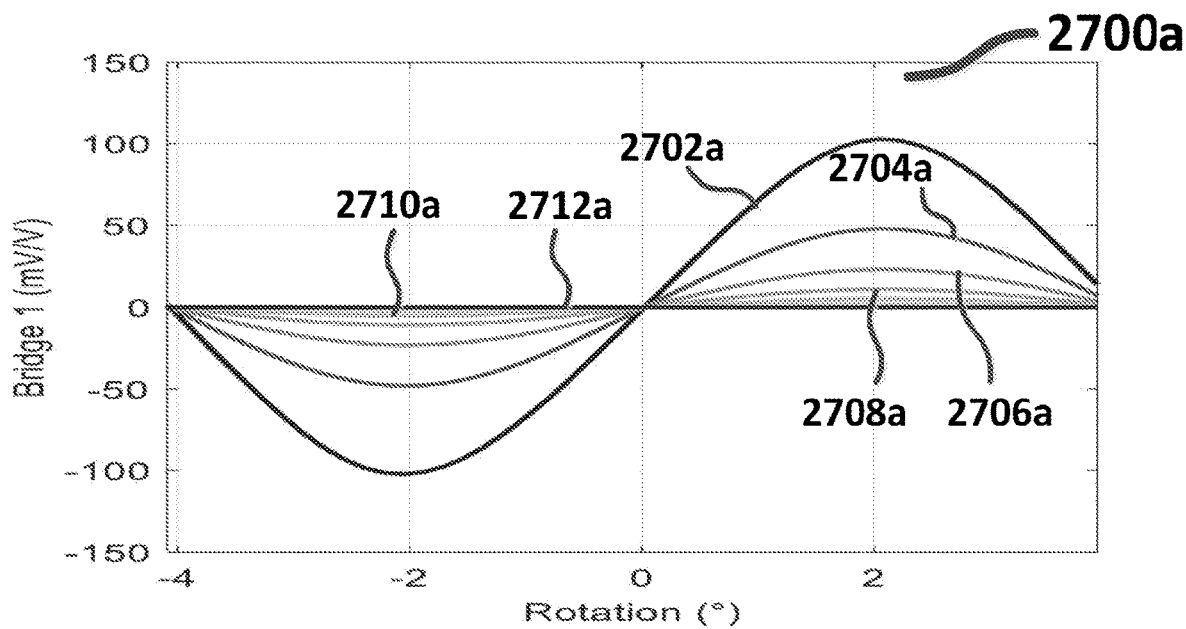
FIGS. 27A and 27B are graphs depicting raw outputs of the bridges in FIGS. 26A and 26B.
Figure 27B:
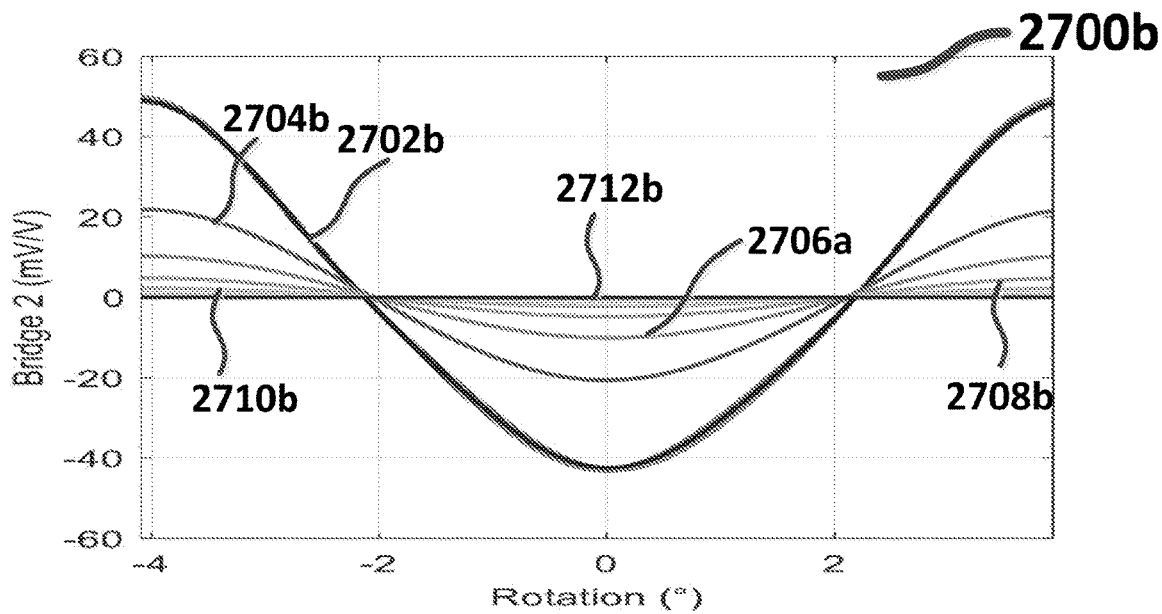

Referring to FIG. 27A and FIG. 27B, a graph 2700a depicts the output of the bridge 2000a versus target rotation of the bridge 2600a for different air gaps between the bridge 2600a and the target. A curve 2702a represents an air gap of 0.5 mm. A curve 2704a represents an air gap of 1 mm. A curve 2706a represents an air gap of 1.5 mm. A curve 2708a represents an air gap of 2.0 mm. A curve 2710a represents an air gap of 3 mm. A curve 2712a represents an air gap of 6 mm.

A graph 2700b depicts the output of the bridge 2600b for different air gaps between the bridge 2600b and the target. A curve 2702b represents an air gap of 0.5 mm. A curve 2704b represents an air gap of 1 mm. A curve 2706b represents an air gap of 1.5 mm. A curve 2708b is an air gap of 2 mm. A curve 2710b represents an air gap of 3 mm. A curve 2712b represents an air gap of 6 mm.

Figure 28A:
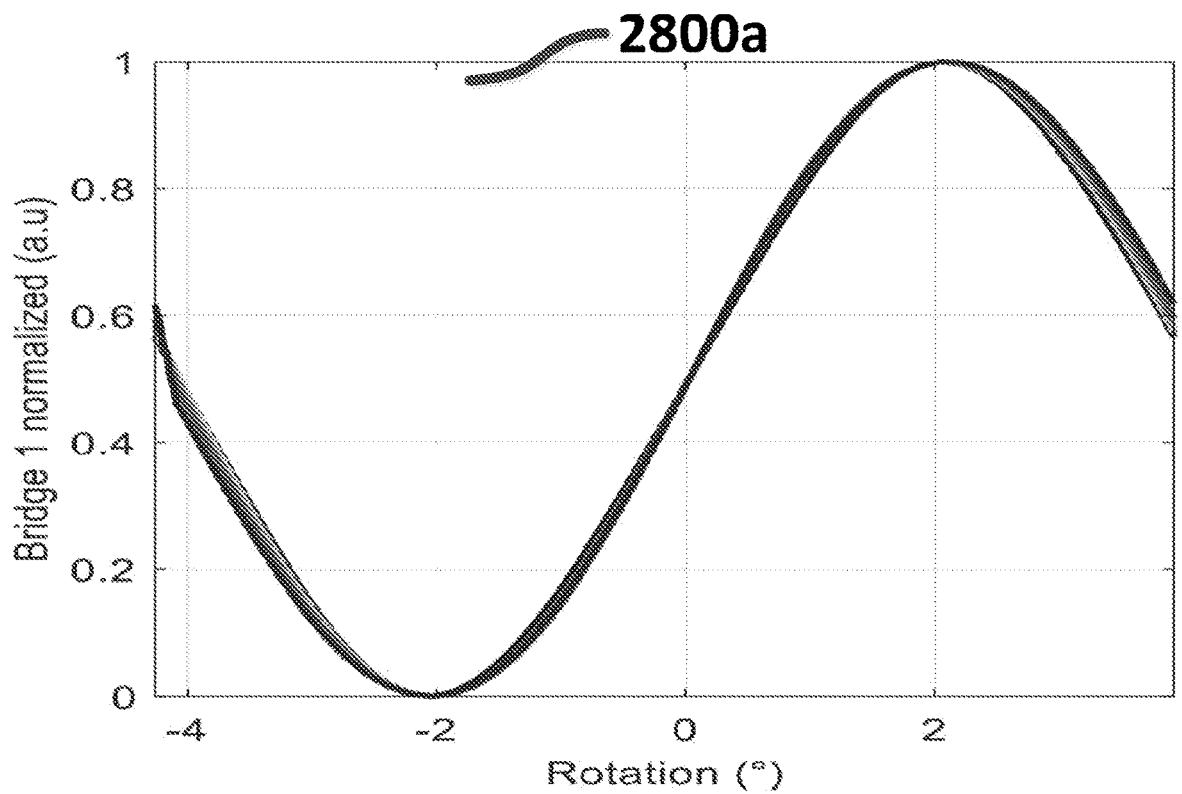
FIGS. 28A and 28B are graphs depicting normalized outputs of the bridges in FIGS. 26A and 266B.
Figure 28B:
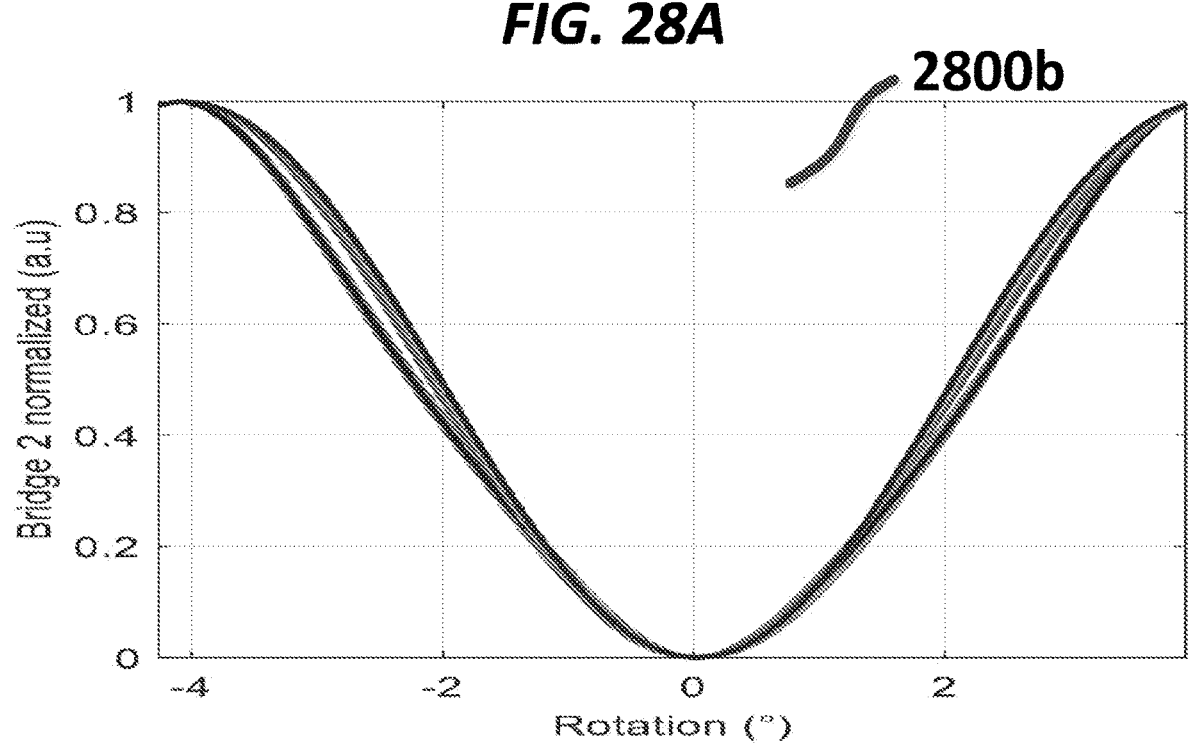

Referring to FIGS. 28A and 28B, a graph 2800a is a normalized output of the bridge 2600a versus target rotation of the bridge 2600a for the different air gaps shown in FIG. 27A. As one of ordinary skill in the art can observe from the graph 2800a, the normalized output of the bridge 2600a is about the same regardless of air gap.

A graph 2800b is a normalized output of the bridge 2600b versus target rotation of the bridge 2000b for the different air gaps shown in FIG. 27B. As one of ordinary skill in the art can observe from the graph 2800b, the normalized output of the bridge 2600b is about the same regardless of air gap.

Figure 29:
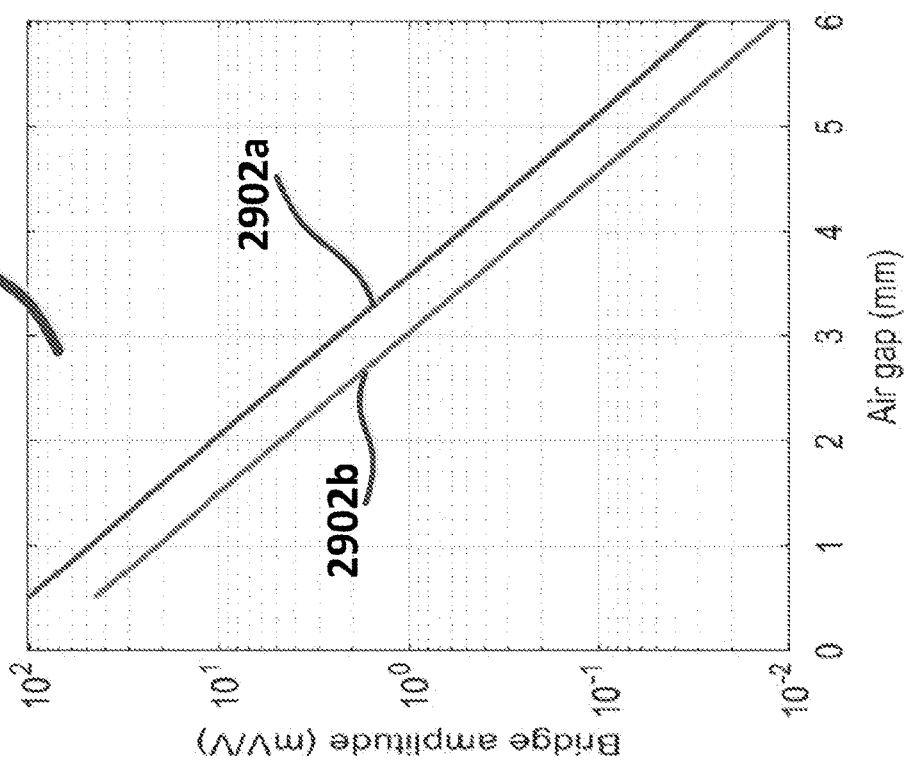
FIG. 29 is a graph depicting outputs of the bridges in FIGS. 26A and 26B versus air gap.

Referring to FIG. 29, a graph 2900 depicts a curve 2902a and a curve 2902b. The curve 2902a depicts an amplitude of the output of the bridge 2600a versus air gap between the bridge 2600a and a target. The curve 2902b depicts an amplitude of the output of the bridge 2600b versus air gap between the bridge 2600a and the target. As one of ordinary skill in the art can observe from the graph 2900a, the curves 2902a, 2902b are different.

Figure 30:
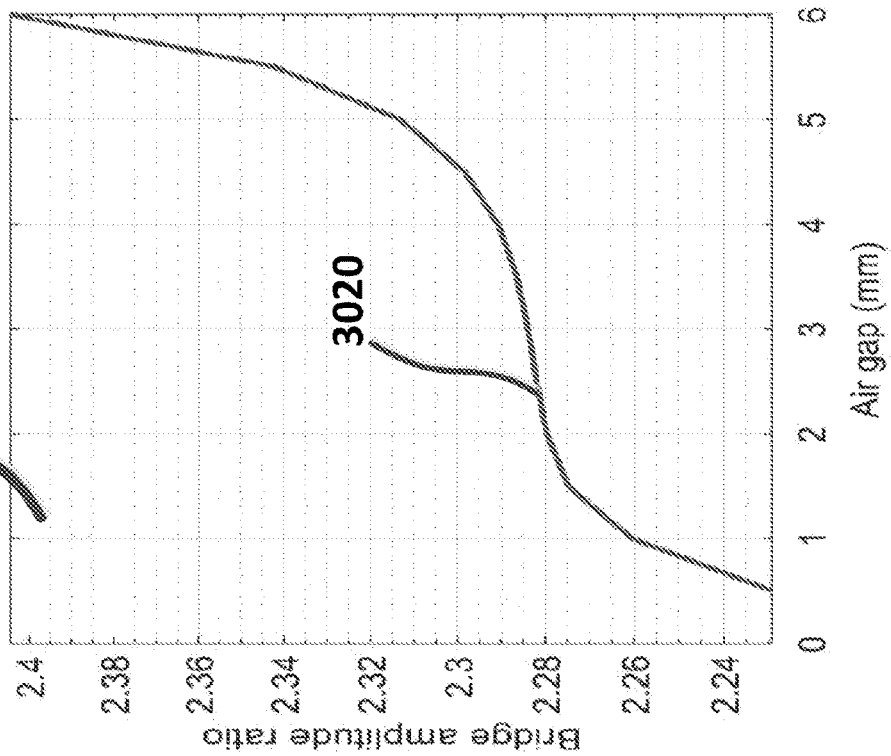
FIG. 30 is a graph depicting a ratio of the outputs of the bridges in FIGS. 26A and 26B versus air gap.

Referring to FIG. 30, a graph 3000b depicts a curve 3020. The curve 2920 depicts a ratio of the amplitude of the output of the bridge 2600a and the amplitude of the output of the bridge 2600b versus the air gap between the bridges 2600a, 2600b and the target.

Figure 31:
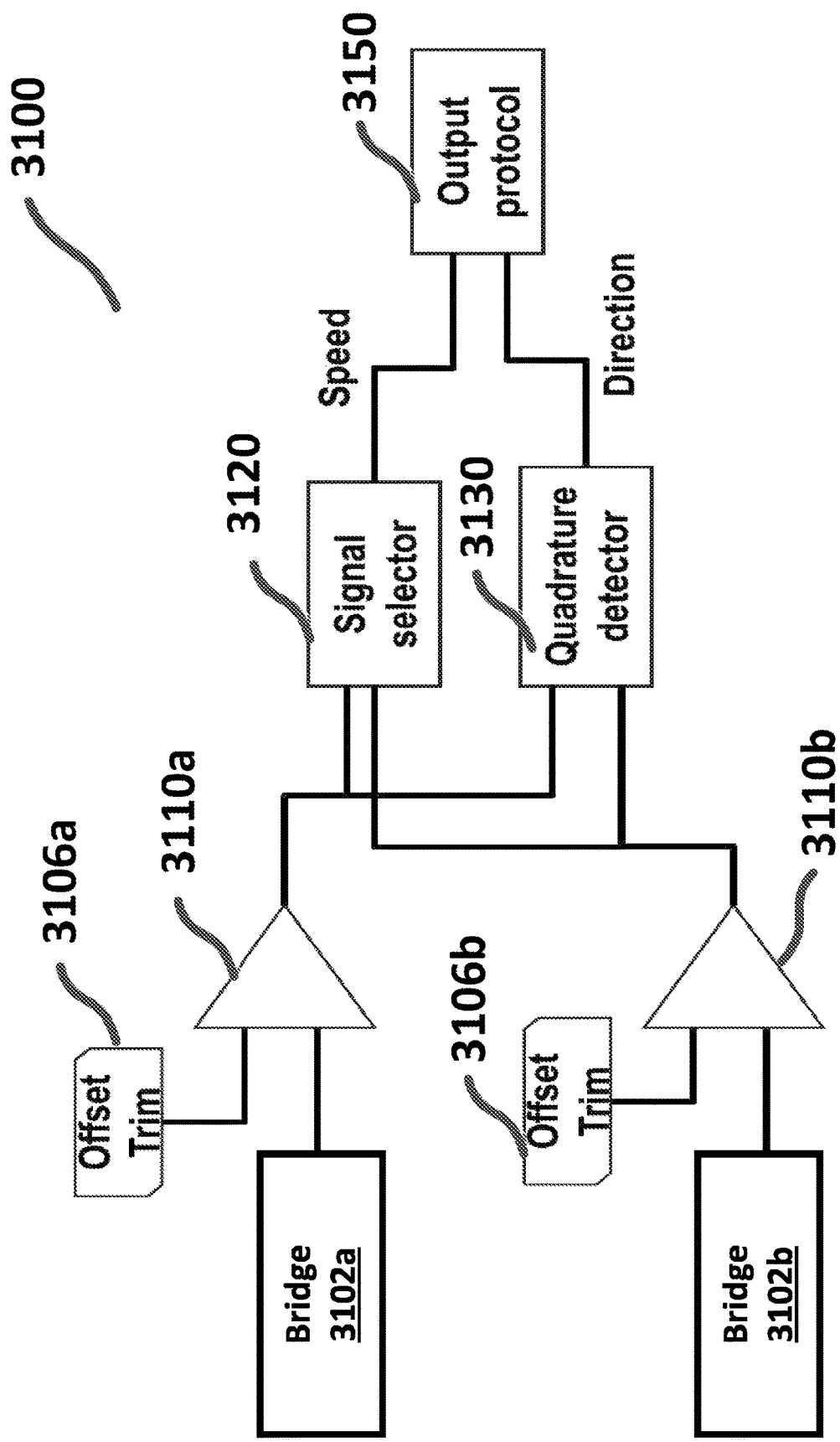
FIG. 31 is circuit block diagram of an example of a magnetic-field sensor.

Referring to FIG. 31, a magnetic-field sensor 3100 may use the bridges described herein in a magnetic-field sensor to provide speed and direction of a target (e.g., a ring magnet or a single pole magnet). The magnetic-field sensor layout includes a bridge 3102a and a bridge 3102b. The bridge 3102a may be the bridge 2000a (FIG. 20) or the bridge 2600a (FIG. 26). The bridge 3102b may be the bridge 2000b (FIG. 20) or the bridge 2600b (FIG. 26). The magnetic-field sensor 3100 also includes offset trims 3106a, 3106b, comparators 3110a, 3110b, a signal detector 3120, a quadrature detector 3130 and an output protocol 3150.

The bridges 3102a, 3102b each provide a respective signal that is amplified and compared with a respective offset trim 3106a, 3106b using a respective comparator 3110a, 3110b. Each comparator 3110a, 3110b provides a respective square wave signal that is passed to the signal selector 3120 and to the quadrature detection 3130.

The signal selector 3120 provides a speed signal. The signal selector 3120 chooses between which square wave signal to use for a trigger (e.g., to trigger either on a center of a magnetic pole or edges between magnetic poles of the target). The signal detector 3120 may also be used to select which square wave signal has the highest amplitude to reduce the jitter.

The quadrature detector 3130 provides the direction of the rotation of the target. Both the speed and direction information are passed to the output protocol 3150.

Whether bridges 2000a, 2000b or bridges 2600a, 2600b are used in the magnetic-field sensor 3100, both sets of bridges provide a duty cycle within 50°±0.35°. Thus, the magnetic-field sensor 3100 is about 10 to 20 times better than traditional magnetic field sensors.

Figures 31A, 31B:
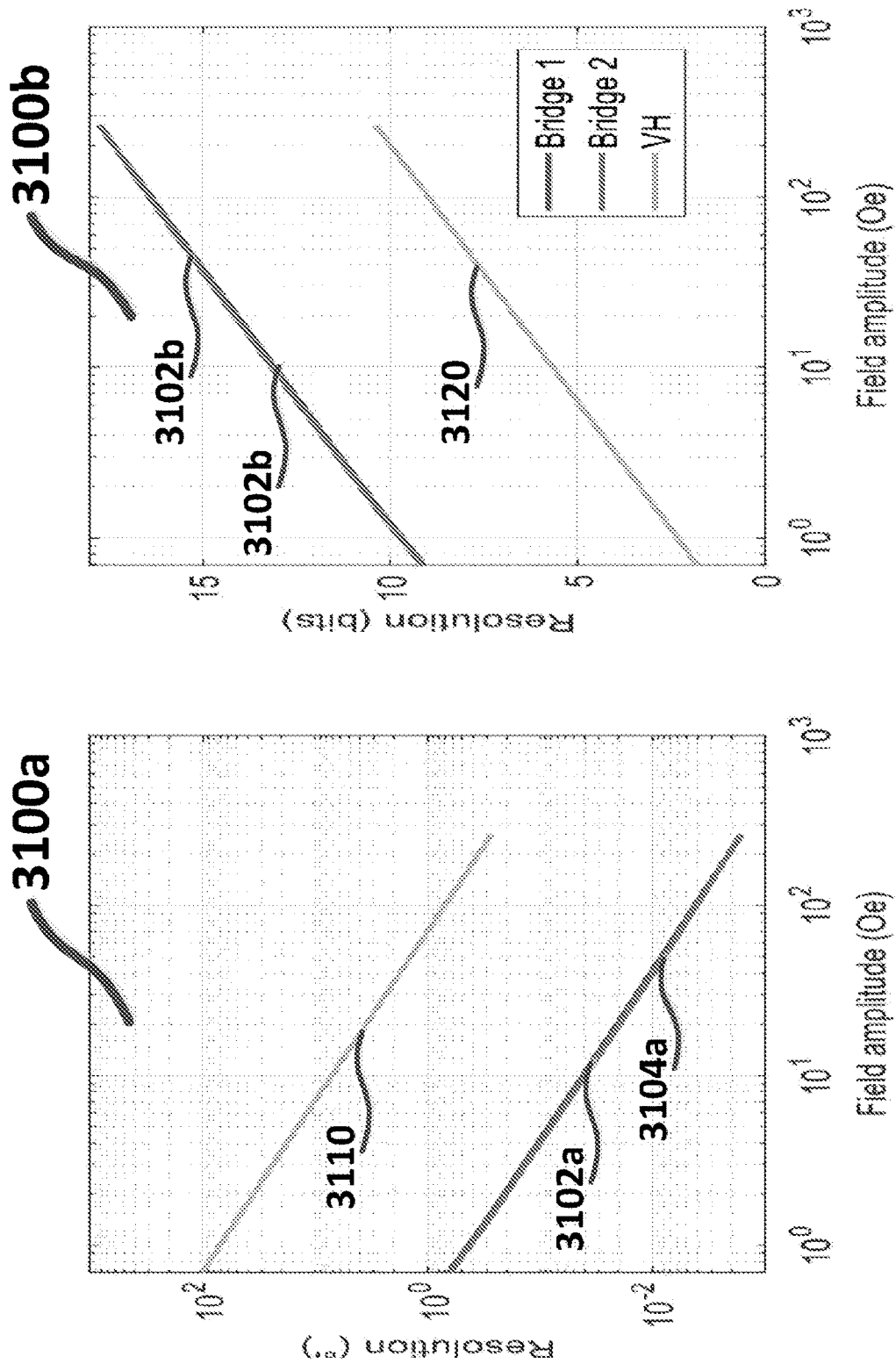
FIGS. 31A and 31B are graphs of examples of resolution for the magnetic-field sensor of FIG. 31 using the bridges in FIGS. 20A and 20B.

Referring to FIGS. 31A and 31B, a graph 3100a and a graph 3100b depict resolution versus magnetic field amplitude using the bridges 2000a, 2000b. The graph 3100a depicts resolution in degrees while the graph 3100b depicts resolution in bits.

A curve 3102a is resolution in degrees for the bridge 2000a and a curve 3104a is resolution in degrees for the bridge 2000b. A curve 3110 represents resolution in degrees for an equivalent vertical Hall element.

A curve 3102b is resolution in degrees for the bridge 2000a and a curve 3104b is resolution in degrees for the bridge 2000b. A curve 3120 represents resolution in degrees for the equivalent vertical Hall element.

Figure 31D:
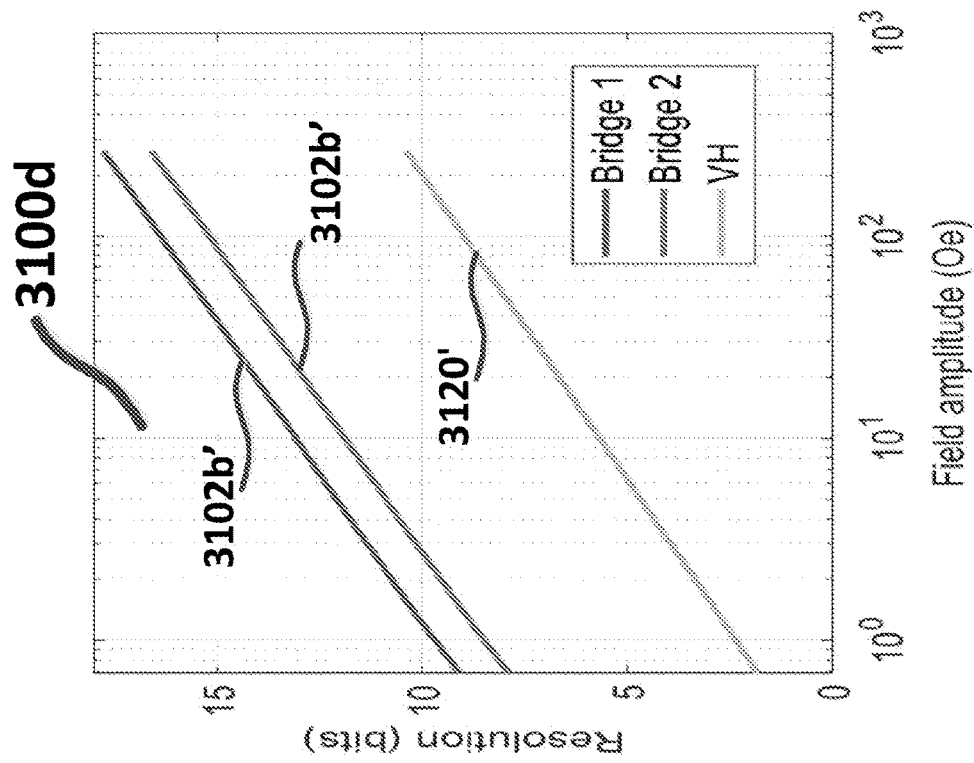
FIGS. 31C and 31D are graphs of examples of resolution for the magnetic-field sensor of FIG. 31 using the bridges in FIGS. 26A and 26B.
Figure 31C:
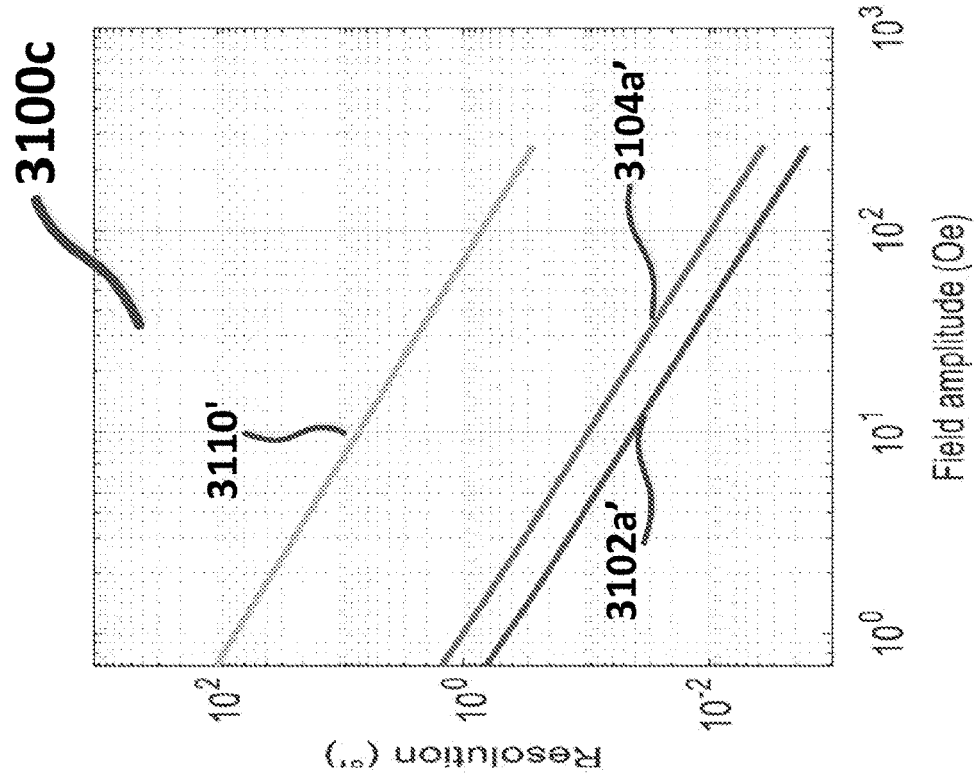

Referring to FIGS. 31C and 31D, a graph 3100c and a graph 3100d depict resolution versus magnetic field amplitude using the bridges 2600a, 2600b. The graph 3100c depicts resolution in degrees while the graph 3100d depicts resolution in bits.

A curve 3102a' is resolution in degrees for the bridge 2600a and a curve 3104a' is resolution in degrees for the bridge 2600b. A curve 3110' represents resolution in degrees for an equivalent vertical Hall element.

A curve 3102b' is resolution in degrees for the bridge 2600a and a curve 3104b' is resolution in degrees for the bridge 2600b. A curve 3120' represents resolution in degrees for the equivalent vertical Hall element.

Figure 32:
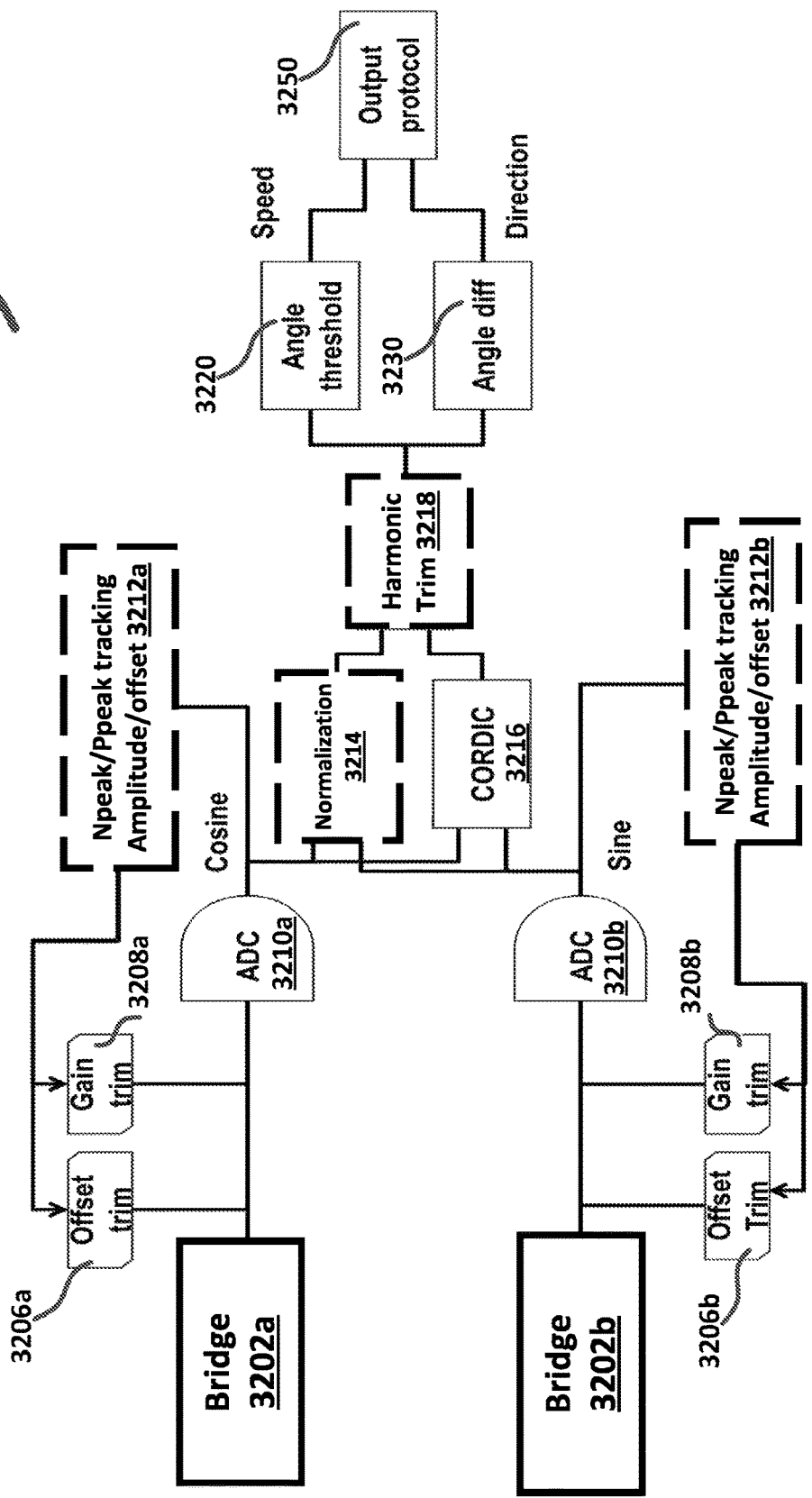
FIG. 32 is circuit block diagram of another example of a magnetic-field sensor.

Referring to FIG. 32, a magnetic-field sensor 3200 may use the bridges described herein in a magnetic-field sensor to provide speed and direction of a target (e.g., a ring magnet or a single pole magnet). The magnetic-field sensor layout generates a higher resolution output than the magnetic-field sensor 3100. As used here, resolution refers to the number of output pulses per period of magnetic-field sensor outputs.

The magnetic-field sensor 3200 includes a bridge 3202a and a bridge 3202a. The bridge 3202a may be the bridge 2000a (FIG. 20) or the bridge 2600a (FIG. 26). The bridge 3202b may be the bridge 2000b (FIG. 20) or the bridge 2600*b* (FIG. 26). The magnetic-field sensor 3200 also includes offset trims 3206*a*, 3206*b*, gain trims 3208*a*, 3208*b*, analog-to digital converters (ADCs) 3210*a*, 3210*b*, a CORDIC (coordinate rotation digital computer) circuit 3216, angle threshold circuit 3220, angle difference circuit 3230 and output protocol 3250. In one example, the magnetic-field sensor 3200 may optionally also include Npeak/Ppeak tracking amplitude offset trim 3212*a*, 3212*b*, normalization circuit 3214, a harmonic trim 3218. As used herein, the Npeak and Ppeak are minimum and maximum trackers that provide a constant tracking of the signal amplitude and offset.

Each of the bridges 3202*a*, 3202*b* generates a signal where offset is trimmed by a respective offset trim 3206*a*, 3206*b* and gain is trimmed by a respective gain trim 3208*a*, 3208*b* before being inputting into a respective ADC 3210*a*, 3210*b*. The output signals from each ADC 3210*a*, 3210*b* are inputted to the CORDIC circuit 3216 to compute the arctangent or computed angle. Optionally, output signals from each ADC 3210*a*, 3210*b* are sent to a respective a respective Npeak/Ppeak tracking Amplitude/offset 3212*a*, 3212*b* and to the respective offset trim 3206*a*, 3206*b* and to the respective gain trim 3208*a*, 3208*b* to fix offset and gain dynamically.

As another possible option, output signals from each ADC 3210*a*, 3210*b* may also be inputted to the normalization circuit 3214 to determine the norm of the signal. As used herein, a norm of the signal is the argument of the complex number cosine+i*sine.

The norm of the signal and the computed angle are harmonically trimmed using the harmonic trim 3218. The output of the harmonic trim 3218 is used to determine an angle threshold by the angle threshold circuit 3220 to generate a speed signal.

The output of the harmonic trim 3218 is also used to determine an angle difference using the angle difference circuit 3230 to generate a direction signal by adding an angle correction depending on signal amplitude. The direction and speed signals are sent to the output protocol 3250.

The output of the harmonic trim 3218 is an angle with harmonic corrections. At different angles, there is a threshold to trigger an output pulse (by angle threshold circuit 3220). The angle difference provides the sign of the angle variation. The sign provides the direction of rotation (that is usually provided to the output protocol 3250 so that the width of the output pulse is selected to indicate the direction of rotation).

In one example, the variation of the angle may be calculated between two trigger points to reduce consumption and noise impact. In one example, the angle signal may be differentiated using a low pass differentiator.

Figures 32A, 32B, 32C:
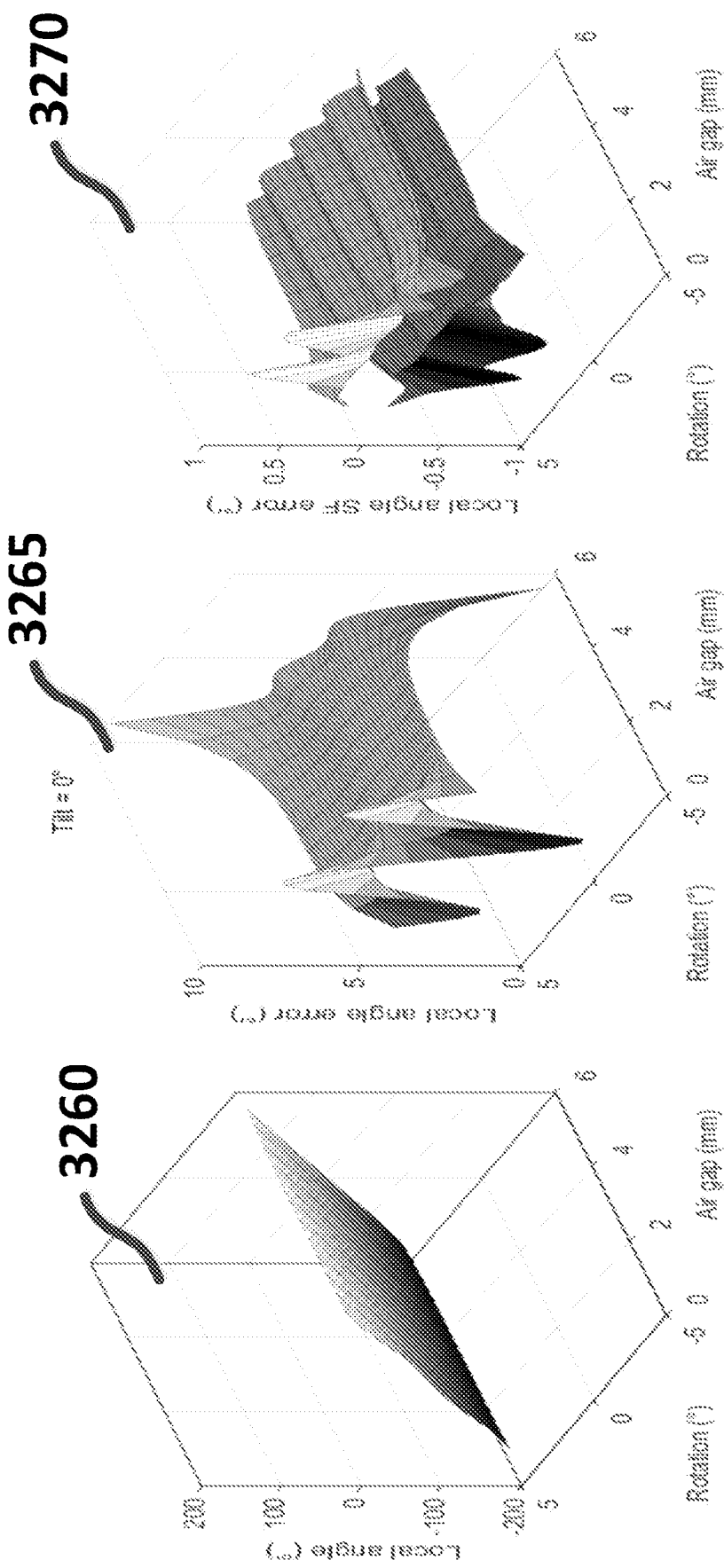
FIGS. 32A to 32C are three-dimensional (3D) graphs of examples of angle and angle error versus target rotation and air gap for the magnetic-field sensor of FIG. 32 using the bridges in FIGS. 20A and 20B.

FIG. 32A to FIG. 32C include graphs that depict using the bridges 2000*a* and 2000*b*. A graph 3260 depicts angle in degrees prime provided by the CORDIC circuit 3216 over target rotation and air gap. A graph 3265 depicts the associated angle error over target rotation and air gap. The error is below ±5° with the error mostly at the smallest and the highest air gap. A graph 3270 depicts additional angle error produced by a rotating 20 Oe stray field.

Figure 33:
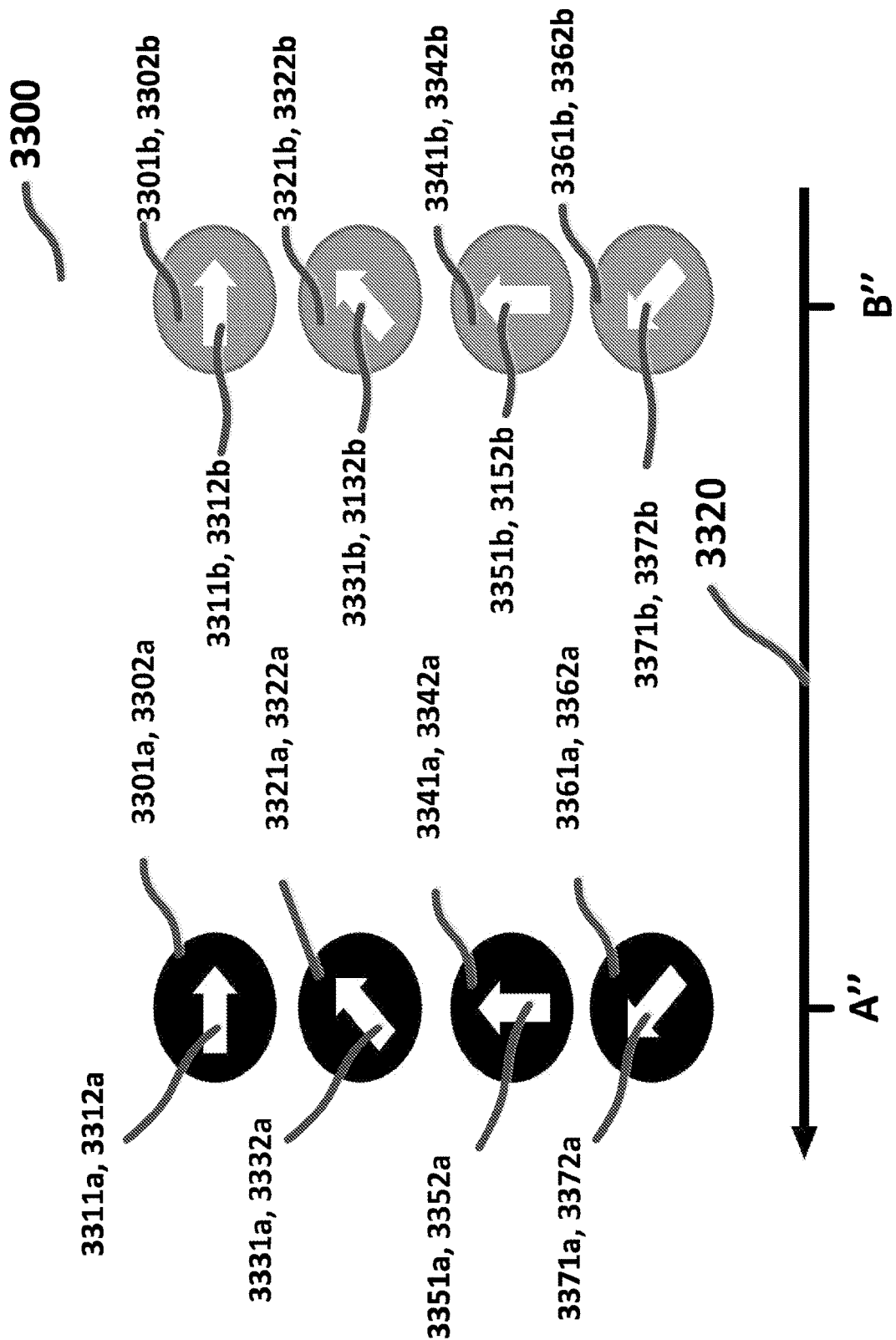
FIG. 33 is further example of a layout of magnetoresistance elements on a die.
Figure 34A:
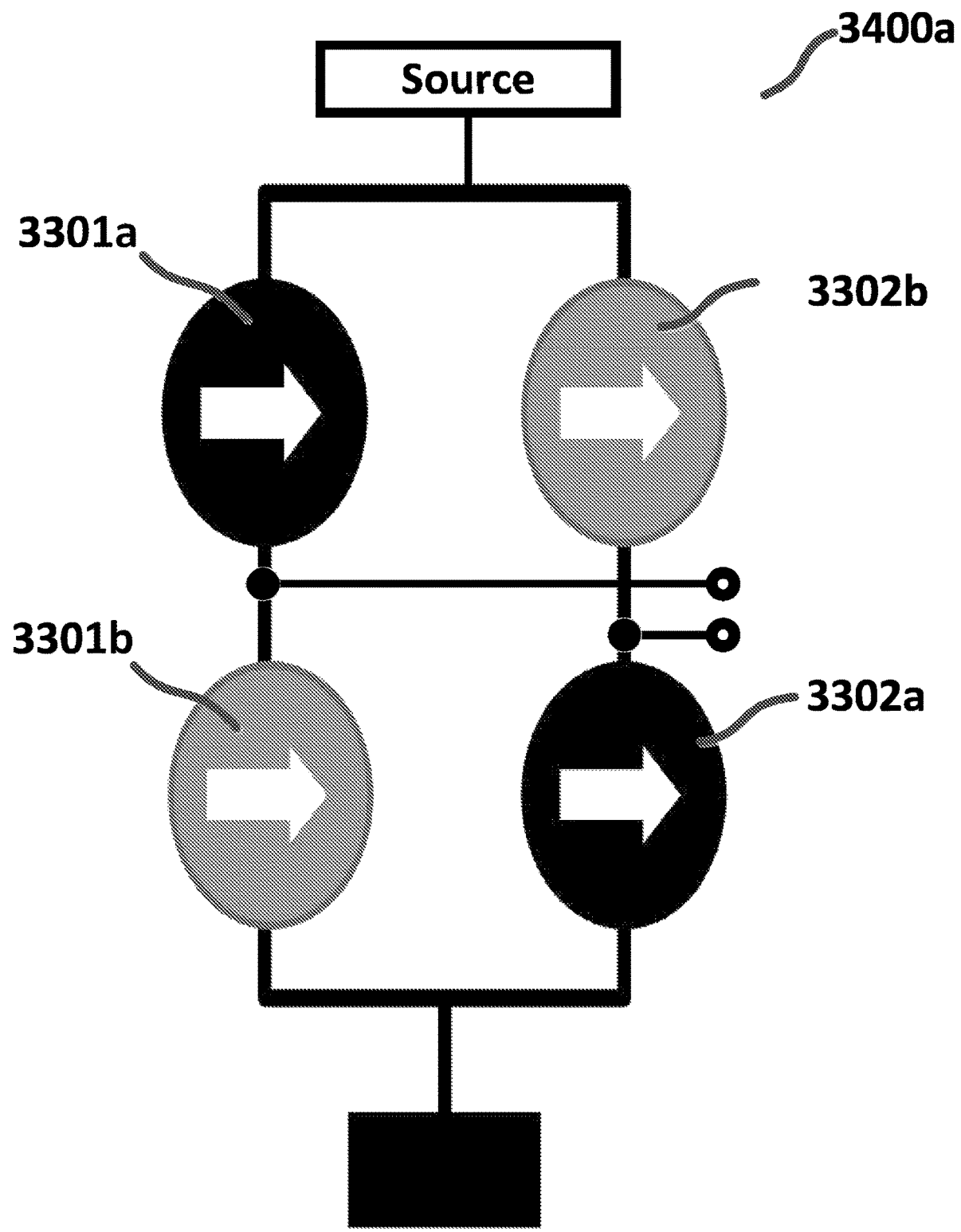
FIGS. 34A to 34D are examples of bridge configurations using the layout in FIG. 33.
Figure 34B:
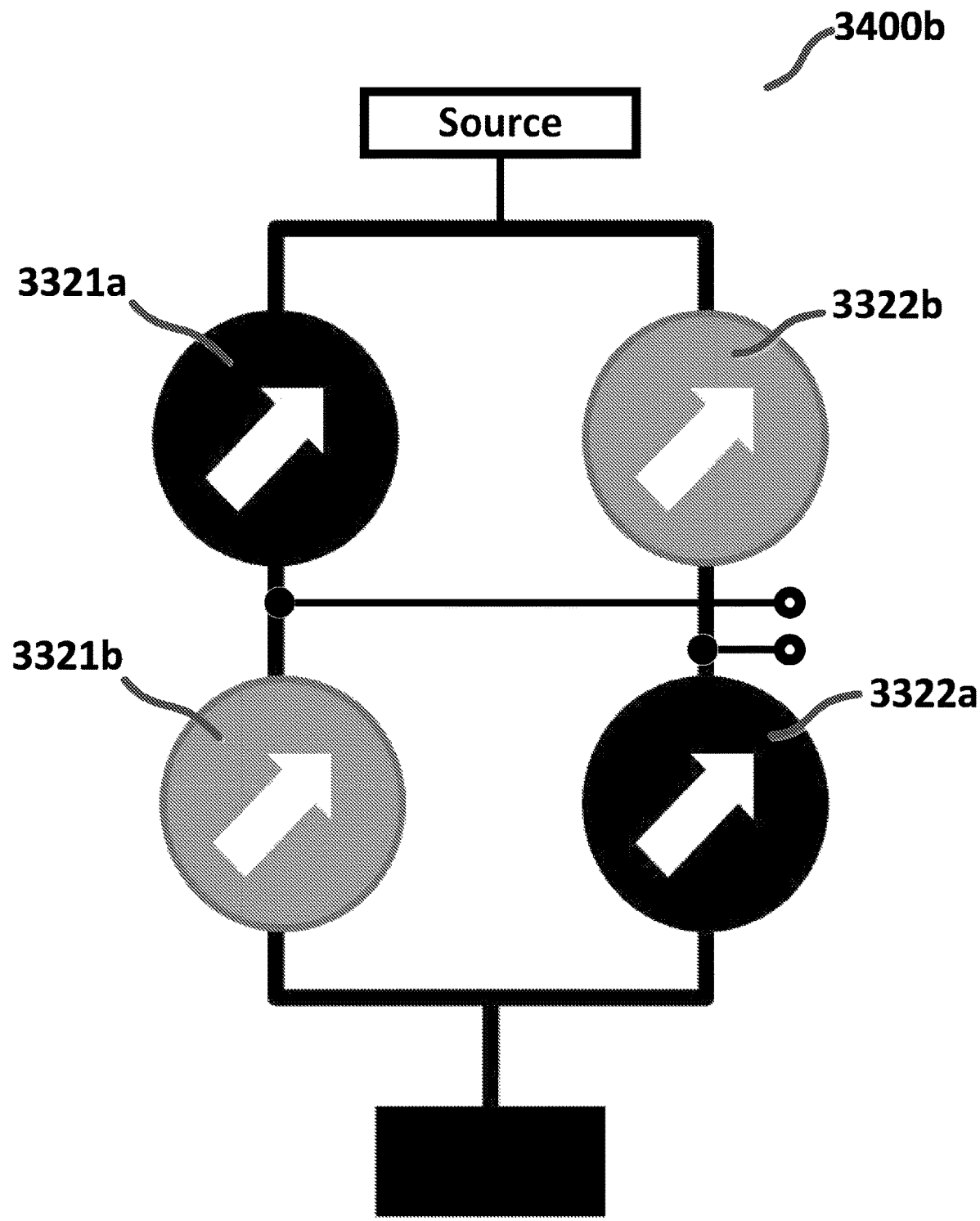
Figure 34C:
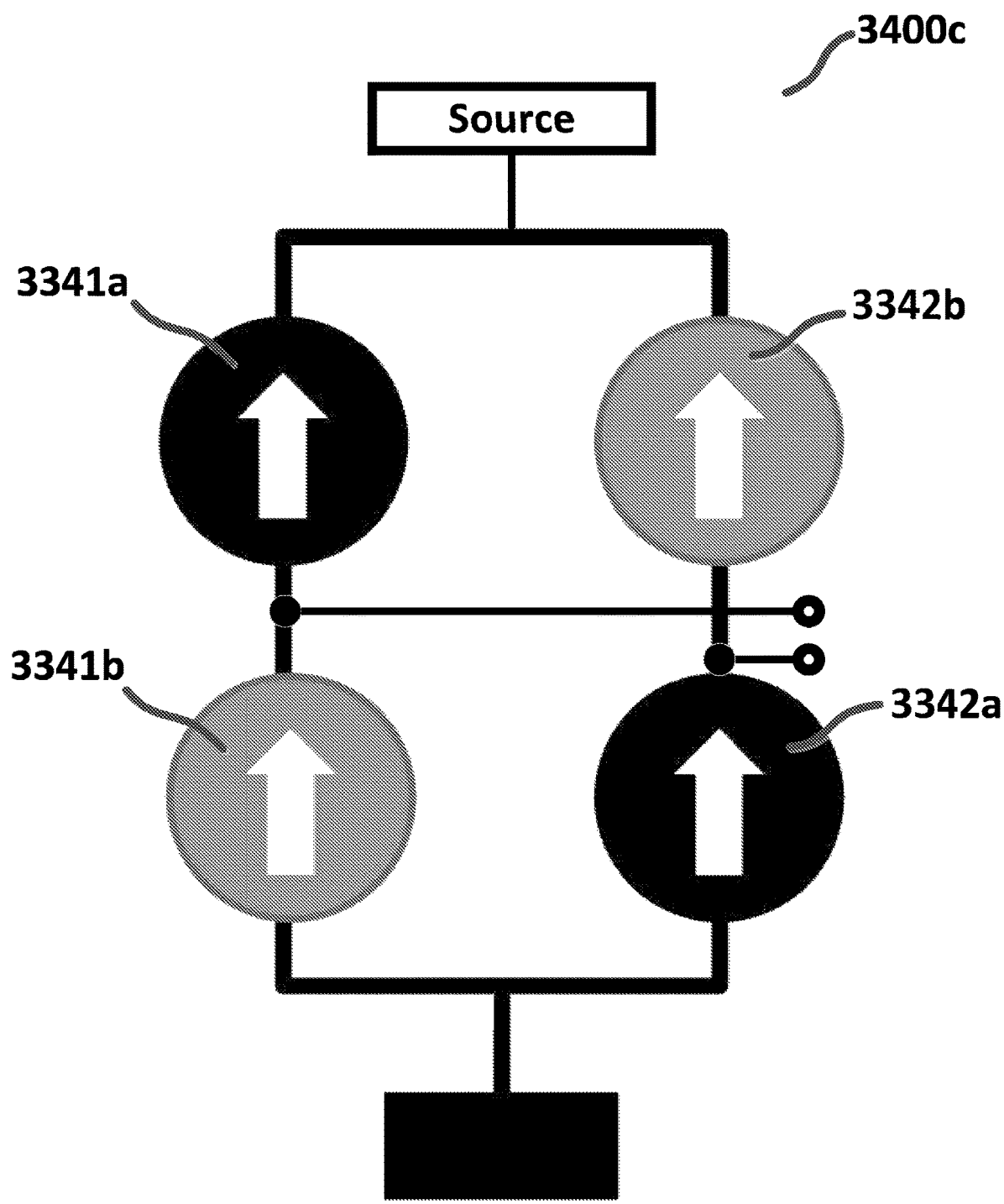
Figure 34D:
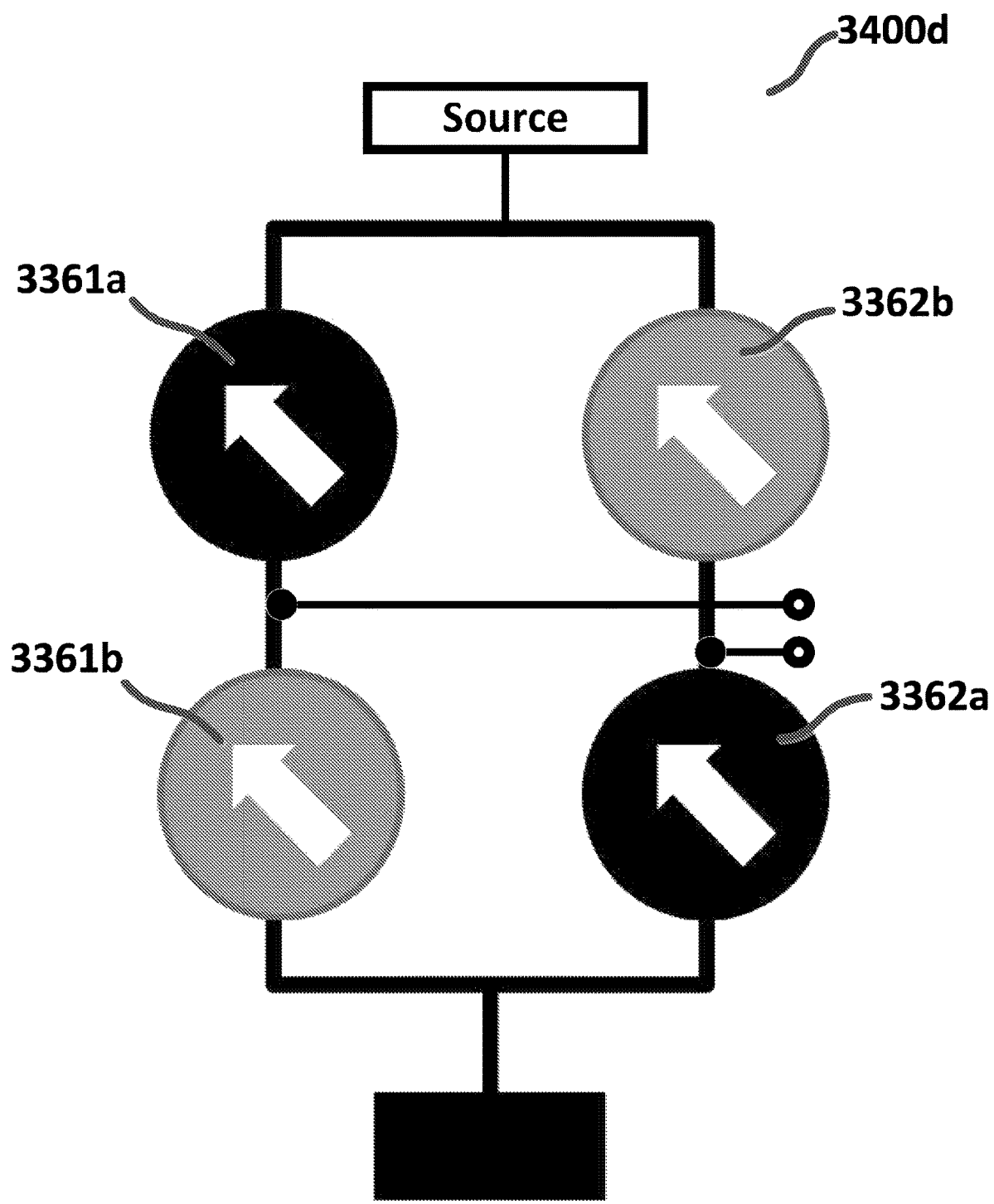

Referring to FIG. 33, a layout 3300 includes at least sixteen magnetoresistance elements (e.g., a magnetoresistance element 3301*a*, a magnetoresistance element 3302*a*, a magnetoresistance element 3301*b*, a magnetoresistance element 3302*b*, a magnetoresistance element 3321*a*, a magnetoresistance element 3322*a*, a magnetoresistance element 3321*b*, a magnetoresistance element 3322*b*, a magnetoresistance element 3341*a*, a magnetoresistance element 3342*a*, a magnetoresistance element 3341*b*, a magnetoresistance element 3342*b*, a magnetoresistance element 3361*a*, a magnetoresistance element 3362*a*, a magnetoresistance element 3361*b*, a magnetoresistance element 3362*b*). The magnetoresistance elements 3301*a*, 3302*a*, 3321*a*, 3322*a*, 3341*a*, 3342*a*, 3361*a*, 3362*a* are located on a point A" on an axis 3320 and the magnetoresistance elements 3301*b*, 3302*b*, 3321*b*, 3322*b*, 3341*b*, 3342*b*, 3361*b*, 3362*b* are located on a point B" on the axis 3320. In one example, the point A" is further from a target (not shown) than the point B".

In one example, the magnetoresistance elements 3301*a*, 3302*a*, 3321*a*, 3322*a*, 3341*a*, 3342*a*, 3361*a*, 3362*a*, 3301*b*, 3302*b*, 3321*b*, 3322*b*, 3341*b*, 3342*b*, 3361*b*, 3362*b* are each a TMR. The TMR includes a free layer that includes a vortex layer with a magnetic-field vortex.

The magnetoresistance element 3301*a* has a reference direction 3311*a* and the magnetoresistance element 3302*a* has a reference direction 3312*a*. The reference directions 3311*a*, 3312*a* are both in the same direction and parallel to the axis 3320.

The magnetoresistance element 3301*b* has a reference direction 3311*b* and the magnetoresistance element 3302*b* has a reference direction 3312*b*. The reference directions 3311*b*, 3312*b* are both in the same direction and 0° to the axis 3320.

The magnetoresistance element 3321*a* has a reference direction 3331*a* and the magnetoresistance element 3322*a* has a reference direction 3332*a*. The reference directions 3331*a*, 3332*a* are both in the same direction and at a 45° angle to the axis 3320.

The magnetoresistance element 3321*b* has a reference direction 3331*b* and the magnetoresistance element 3322*b* has a reference direction 3332*b*. The reference directions 3331*b*, 3332*b* are both in the same direction and at a 45° angle to the axis 3320.

The magnetoresistance element 3341*a* has a reference direction 3351*a* and the magnetoresistance element 3342*a* has a reference direction 3352*a*. The reference directions 3351*a*, 3352*a* are both in the same direction and at a 90° angle to the axis 3320.

The magnetoresistance element 3341*b* has a reference direction 3351*b* and the magnetoresistance element 3342*b* has a reference direction 3352*b*. The reference directions 3351*b*, 3352*b* are both in the same direction and at a 90° angle to the axis 3320.

The magnetoresistance element 3361*a* has a reference direction 3371*a* and the magnetoresistance element 3362*a* has a reference direction 3372*a*. The reference directions 3371*a*, 3372*a* are both in the same direction and at a 135° angle to the axis 3320.

The magnetoresistance element 3361*b* has a reference direction 3371*b* and the magnetoresistance element 3362*b* has a reference direction 3372*b*. The reference directions 3371*b*, 3372*b* are both in the same direction and at a 135° angle to the axis 3320.

Referring to FIGS. 34A to 34D, the magnetoresistance elements 3301*a*, 3302*a*, 3301*b*, 3302*b* may be used to form a bridge 3400*a*. The magnetoresistance elements 3321*a*, 3322*a*, 3321*b*, 3322*b* may be used to form a bridge 3400*b*. The magnetoresistance elements 3341*a*, 3342*a*, 3341*b*, 3342*b* may be used to form a bridge 3400*c*. The magnetoresistance elements 3361*a*, 3362*a*, 3361*b*, 3362*b* may be used to form a bridge 3400*d*.

Figure 35:
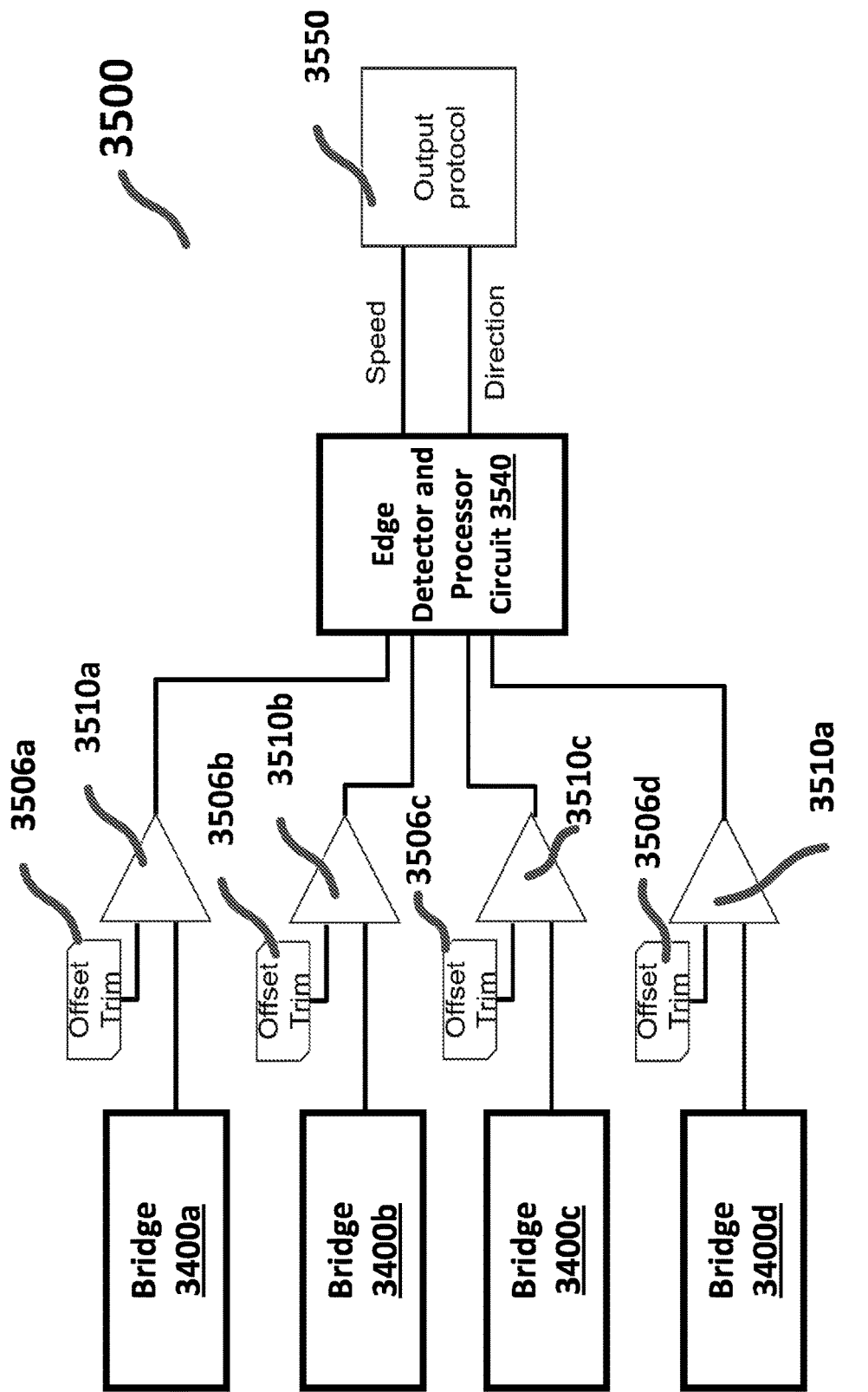
FIG. 35 is circuit block diagram of a further example of a magnetic-field sensor using the bridges in FIGS. 34A to 34D.

Referring to FIG. 35, a magnetic-field sensor 3500 is configured to provide speed and direction of a target (e.g., a ring magnet or a single pole magnet). The magnetic-field sensor 3500 includes bridges 3400*a*-3400*d*, offset trims 3506a-3506d, comparators 3510a-3510d, edge detector and processor circuit 3540, and an output protocol 3550.

The bridges 3400a-3400d each provide a respective signal that is amplified and compared with a respective offset trim 3506a-3506d using a respective comparator 3510a-3510d. Each comparator 3510a-3510d provides a respective square wave signal to the edge detector and processor circuit 3540 that provides a speed signal and direction signal to the output protocol 3550. The edge detector and processor circuit 3540 senses the edges on the signals and generates a pulse for each of the edges on the signals. There are two quadrature detectors (one per couple of orthogonal bridges) that are used to get the direction of rotation.

The number of bridges used in a magnetic-field sensor may be more or less than the four bridges used in the magnetic-field sensor 3500. The reference directions used in each bridge depends on the number bridges used with the exception that the first bridge (referred to later as bridge 1 is always the same) includes reference directions of each magnetoresistance being 0°. That is, bridge 3400a is the same regardless of the number bridges used. A reference direction used in each bridge is equal bridge (n-1) times 180°/N where N is the total number of bridges used and n is the bridge number, where n is greater than 2 and less than or equal to N.

For example, if N is 4 as in FIGS. 33 & 34, then:
for bridge 1, the reference direction is (1-1)*180°/4 or 0°;
for bridge 2, the reference direction is (2-1)*180°/4 or 45°;
for bridge 3, the reference direction is (3-1)*180°/4 or 90°; and
for bridge 4, the reference direction is (4-1)*180°/4 or 135°.

Figure 36:
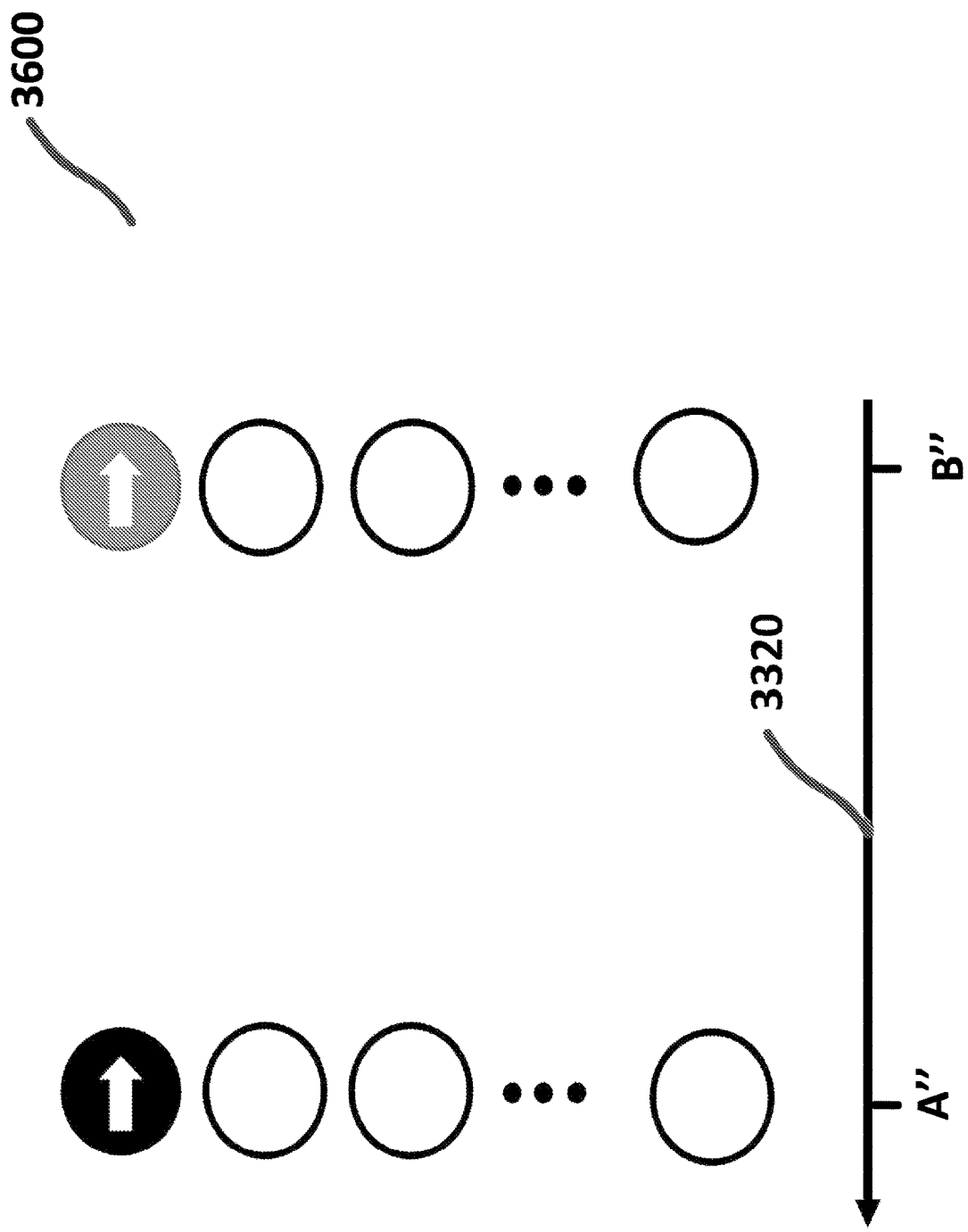
FIG. 36 is generalized example of the layout of magnetoresistance elements in FIG. 33.
Figure 37:
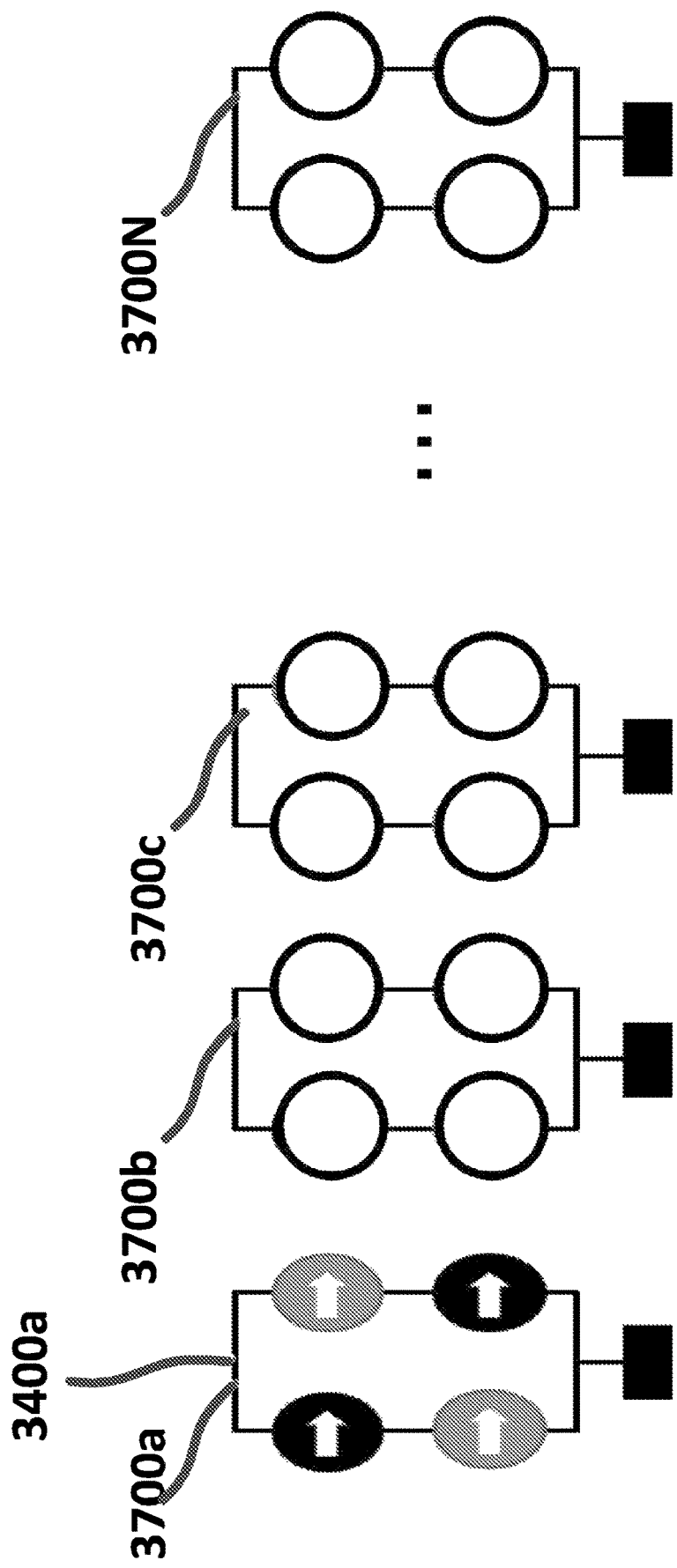
FIG. 37 is a generalized examples of bridges in FIGS. 34A to 34D.
Figure 38:
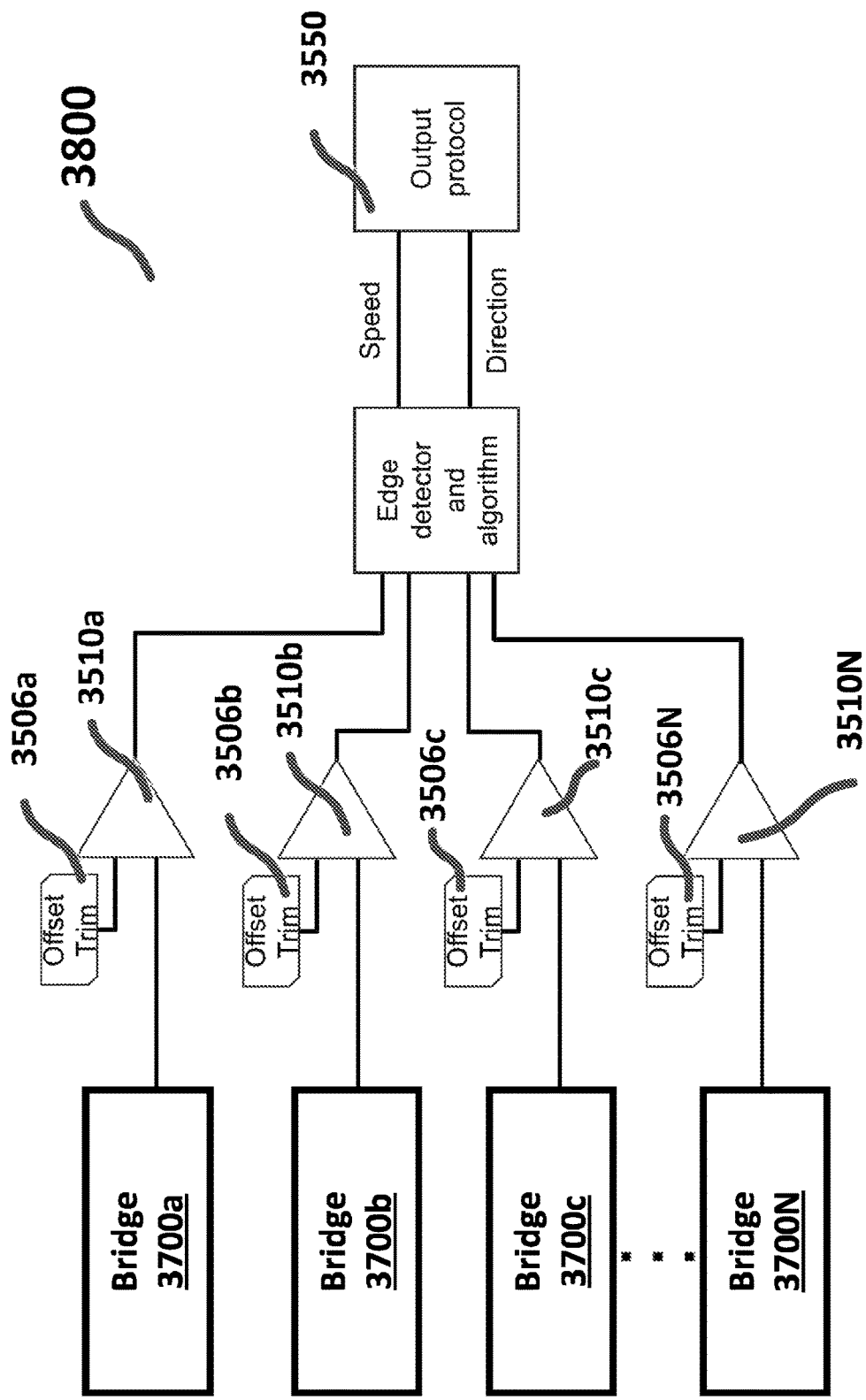
FIG. 38 is a generalized example of the circuit block diagram of FIG. 35.

Referring to FIGS. 36 to 38, a generalized layout of the layout 3300 is a layout 3600. The bridges include a bridge 3700a (which is the same as the bridge 3400a), a bridge 3700b, a bridge 3700c . . . , bridge 3700N. A magnetic-field sensor 3800 is a generalized layout for more or less bridges than in the layout 3300 (FIG. 33).

In another embodiment, a magnetic-field sensor may include multiple bridges where each bridge includes magnetoresistance elements having the same pillar diameter but different from the pillar diameters of the other bridges. Depending on a magnetic field strength and/or air-gap, a bridge is selected based on a linear range. As used herein, the linear range refers to a range where the changes in the resistance of a magnetoresistance element are linear with the changes in a detected magnetic field.

In a further embodiment, a magnetic-field sensor may include multiple bridges where at least a subset of the bridges each have magnetoresistance elements having the same reference direction. A bridge of the subset includes magnetoresistance elements having the same pillar diameter but different from the pillar diameters of the other bridges in the subset. For example, depending on a magnetic field strength and/or air-gap, a bridge of the subset is selected based on a linear range.

Figure 39D:
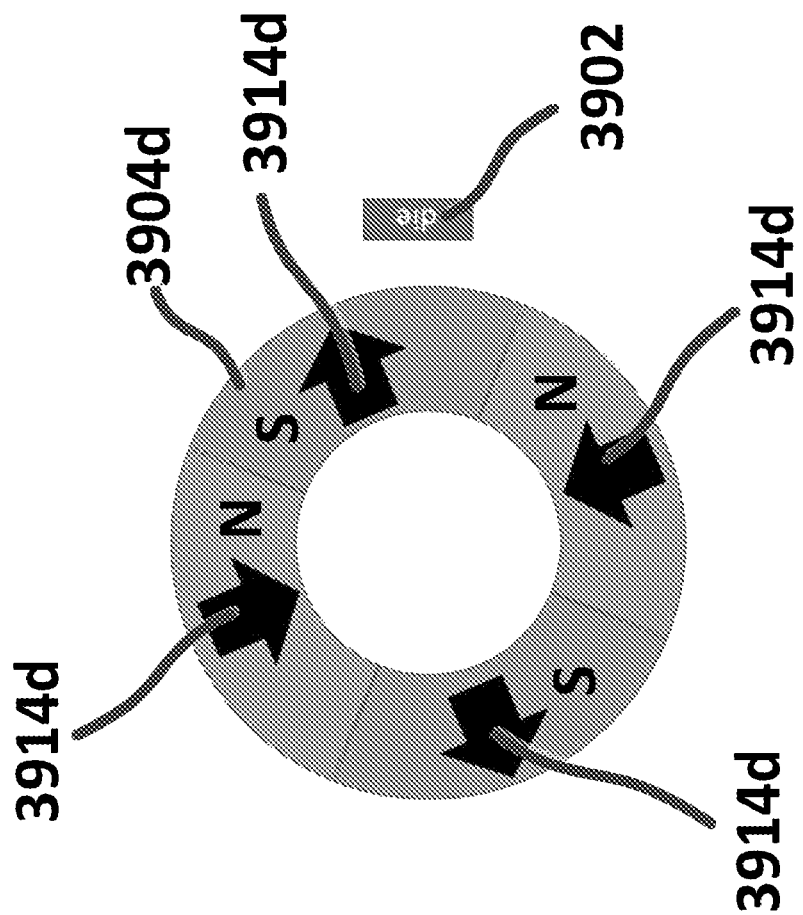
Figure 39C:
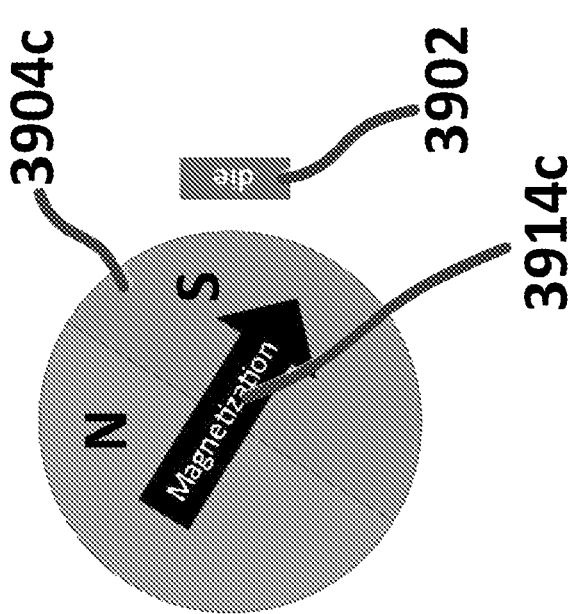

Referring to FIGS. 39A to 39D, other targets may be used for the embodiments described herein than the ring magnet 102' (FIG. 2A). For example, a die 3902 that includes a magnetic-field sensor (e.g., the magnetic-field sensor 3100 (FIG. 31), the magnetic-field sensor 3200 (FIG. 32), the magnetic-field sensor 3500 (FIG. 35), the magnetic-field sensor 3800 (FIG. 38)) may be positioned as shown in FIG. 39A next to a single pole target 3904a with a magnetization direction 3914a. The die 3902 may also be positioned as shown in FIG. 39B next to a ring magnet 3904b with magnetization directions 3914b. The die 3902 may further be positioned as shown in FIG. 39C next to a single pole target 3904c with a magnetization direction 3914c. The die 3902 may also be positioned as shown in FIG. 39D next to a ring magnet 3904d with magnetization directions 3914d.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. An angle sensor comprising:
a first plurality of magnetoresistance elements located at a first location on an axis, the first plurality of magnetoresistance elements comprises:
a first one or more magnetoresistance elements each having a reference direction in a first direction; and
a second one or more magnetoresistance elements each having a reference direction in a second direction; and
a second plurality of magnetoresistance elements located at a second location on the axis, the second plurality of magnetoresistance elements comprises:
a third one or more magnetoresistance elements each having a reference direction in the first direction; and
a fourth one or more magnetoresistance elements each having a reference direction in the second direction,
wherein the angle sensor senses movement of a magnetic target, and
wherein the magnetic target is a ring magnet or a single pole magnet; and
a first bridge comprising a first leg comprising one of the magnetoresistance elements of the first one or more magnetoresistance elements and one of the magnetoresistance elements of the third one or more magnetoresistance elements.

2. The angle sensor of claim 1, wherein at least one of the magnetoresistance elements of the first plurality of magnetoresistance elements or the second plurality of magnetoresistance elements is a tunnel magnetoresistance (TMR) element comprising a free layer,
wherein the free layer comprises a vortex layer having a magnetic-field vortex.

3. The angle sensor of claim 1, further comprising a second bridge comprising a first leg comprising one of the magnetoresistance elements of the second one or more magnetoresistance elements and one of the magnetoresistance elements of the fourth one or more magnetoresistance elements.

4. The angle sensor of claim 3, wherein the first bridge further comprises a second leg comprising another one magnetoresistance element of the first one or more magnetoresistance elements and another one magnetoresistance element of the third one or more magnetoresistance elements,
wherein the second bridge further comprises a second leg comprising another one magnetoresistance element of the second one or more magnetoresistance elements and another one magnetoresistance element of the fourth one or more of magnetoresistance elements.

5. The angle sensor of claim 3, further comprising:
a first comparator configured to compare an output of the first bridge with a first offset trim;
a second comparator configured to compare an output of the second bridge with a second offset trim;

a signal selector configured to receive an output of the first comparator and an output of the second comparator and to provide a speed signal; and a quadrature detector configured to receive the output of the first comparator and the output of the second comparator and to provide a direction signal.

6. The angle sensor of claim 3, further comprising:

a first analog-to-digital converter (ADC) configured to receive an output of the first bridge that is offset trimmed and gain trimmed and to provide a cosine signal to a CORDIC (coordinate rotation digital computer) circuit;

a second ADC configured to receive an output of the second bridge that is offset trimmed and gain trimmed and to provide a sine signal to the CORDIC circuit;

the CORDIC circuit configured to provide an angle by using an arctangent of the sine signal and the cosine signal;

an angle threshold circuit configured to provide a speed signal in response to the angle provided by the CORDIC circuit; and an angle difference circuit configured to provide a direction signal in response to the angle provided by the CORDIC circuit.

7. The angle sensor of claim 1, wherein the first plurality of magnetoresistance elements has an equal number of magnetoresistance elements as the second plurality of magnetoresistance elements.

8. An angle sensor comprising:

a first plurality of magnetoresistance elements located at a first location on an axis, the first plurality of magnetoresistance elements comprises:

a first one or more magnetoresistance elements each having a reference direction in a first direction; and a second one or more magnetoresistance elements each having a reference direction in a second direction; and a second plurality of magnetoresistance elements located at a second location on the axis, the second plurality of magnetoresistance elements comprises:

a third one or more magnetoresistance elements each having a reference direction in the first direction; and a fourth one or more magnetoresistance elements each having a reference direction in the second direction, wherein the angle sensor senses movement of a magnetic target, wherein the magnetic target is a ring magnet or a single pole magnet, wherein the first direction is parallel to the axis, and wherein the second direction is perpendicular to the axis.

9. An angle sensor comprising:

a first plurality of magnetoresistance elements located at a first location on an axis, the first plurality of magnetoresistance elements comprises:

a first one or more magnetoresistance elements each having a reference direction in a first direction; and a second one or more magnetoresistance elements each having a reference direction in a second direction; and a second plurality of magnetoresistance elements located at a second location on the axis, the second plurality of magnetoresistance elements comprises:

a third one or more magnetoresistance elements each having a reference direction in the first direction; and a fourth one or more magnetoresistance elements each having a reference direction in the second direction, wherein the angle sensor senses movement of a magnetic target, and wherein the magnetic target is a ring magnet or a single pole magnet; and N bridges, wherein an nth bridge comprises magnetoresistance elements each having a reference direction equal to (n-1) times 180/N degrees, where n is greater than 2 and less than or equal to N, wherein a first bridge of the N bridges comprises the first one or more magnetoresistance elements.

10. The angle sensor of claim 9, further comprising:

N offset trims;

N comparators configured to receive an input from a corresponding one offset trim of the N offset trims and to receive an input from a corresponding one bridge of the N bridges; and an edge detector and processor circuit configured to receive an output from each of the N comparators and to provide a speed signal and a direction signal.

11. An angle sensor comprising:

a first plurality of magnetoresistance elements located at a first location on an axis, the first plurality of magnetoresistance elements comprises:

a first one or more magnetoresistance elements each having a reference direction in a first direction; and a second one or more magnetoresistance elements each having a reference direction in a second direction; and a second plurality of magnetoresistance elements located at a second location on the axis, the second plurality of magnetoresistance elements comprises:

a third one or more magnetoresistance elements each having a reference direction in the first direction; and a fourth one or more magnetoresistance elements each having a reference direction in the second direction, wherein the angle sensor senses movement of a magnetic target, and wherein the magnetic target is a ring magnet or a single pole magnet; and a first bridge comprising magnetoresistance elements each comprising a pillar having a first diameter; and a second bridge comprising magnetoresistance elements each comprising a pillar having a second diameter, wherein the first diameter is different from the second diameter.

12. An angle sensor comprising:

a first plurality of magnetoresistance elements located at a first location on an axis, the first plurality of magnetoresistance elements comprises:

a first magnetoresistance element having a reference direction in a first direction;

a second magnetoresistance element having a reference direction in the first direction; and a third magnetoresistance element having a reference direction in the first direction;

a second plurality of magnetoresistance elements located at a second location on the axis, the second plurality of magnetoresistance elements comprises:

a fourth magnetoresistance element having a reference direction in the first direction; and a fifth magnetoresistance element having a reference direction in the first direction; and a third plurality of magnetoresistance elements located at a third location on the axis, the third plurality of magnetoresistance elements comprises:

a sixth magnetoresistance element having a reference direction in the first direction;
a seventh magnetoresistance element having a reference direction in the first direction; and
an eighth magnetoresistance element having a reference direction in the first direction;
wherein the angle sensor senses movement of a magnetic target, and
wherein the magnetic target is a ring magnet or a single pole magnet.

13. The angle sensor of claim 12, wherein at least one of the magnetoresistance elements of the first plurality of magnetoresistance elements or the second plurality of magnetoresistance elements is a tunnel magnetoresistance (TMR) element comprising a free layer,
wherein the free layer comprises a vortex layer having a magnetic-field vortex.

14. The angle sensor of claim 12, wherein a distance from the first location to the second location is equidistant to a distance from the second location to a third location.

15. The angle sensor of claim 12, further comprising a first bridge comprising:
a first leg comprising the first magnetoresistance element and the sixth magnetoresistance element; and
a second leg comprising the seventh magnetoresistance and the second magnetoresistance element.

16. The angle sensor of claim 15, further comprising a second bridge comprising:
a first leg comprising the fourth magnetoresistance element and the third magnetoresistance element; and
a second leg comprising the eighth magnetoresistance element and the fifth magnetoresistance element.

17. The angle sensor of claim 16, further comprising:
a first comparator configured to compare an output of the first bridge with a first offset trim;
a second comparator configured to compare an output of the second bridge with a second offset trim;
a signal selector configured to receive an output of the first comparator and an output of the second comparator and to provide a speed signal; and
a quadrature detector configured to receive the output of the first comparator and the output of the second comparator and to provide a direction signal.

18. The angle sensor of claim 16, further comprising:
a first analog-to-digital converter (ADC) configured to receive an output of the first bridge that is offset trimmed and gain trimmed and to provide a cosine signal to a CORDIC (coordinate rotation digital computer) circuit;
a second ADC configured to receive an output of the second bridge that is offset trimmed and gain trimmed and to provide a sine signal to the CORDIC circuit;
the CORDIC circuit configured to provide an angle by using an arctangent of the sine signal and the cosine signals;
an angle threshold circuit configured to provide a speed signal in response to the angle provided by the CORDIC circuit; and
an angle difference circuit configured to provide a direction signal in response to the angle provided by the CORDIC circuit.

19. The angle sensor of claim 12, wherein the first direction is parallel to the axis.

20. An angle sensor comprising:
a first plurality of magnetoresistance elements located at a first location on an axis, the first plurality of magnetoresistance elements comprises:
a first pair of magnetoresistance elements each having a reference direction in a first direction; and
a second pair of magnetoresistance elements each having a reference direction in a second direction; and
a second plurality of magnetoresistance elements located at a second location on the axis, the second plurality of magnetoresistance elements comprises:
a third pair of magnetoresistance elements each having a reference direction in the first direction; and
a fourth pair of magnetoresistance elements each having a reference direction in the second direction,
wherein the angle sensor senses movement of a magnetic target, and
wherein the magnetic target is a ring magnet or a single pole magnet; and
further comprising a first bridge comprising:
a first leg comprising one of the magnetoresistance elements of the first pair of magnetoresistance elements and one of the magnetoresistance elements of the third pair of magnetoresistance elements; and
a second leg comprising the other one magnetoresistance element of the first pair of magnetoresistance elements and the other one magnetoresistance element of the third pair of magnetoresistance elements.

21. The angle sensor of claim 20, wherein at least one of the magnetoresistance elements of the first plurality of magnetoresistance elements or the second plurality of magnetoresistance elements is a tunnel magnetoresistance (TMR) element comprising a free layer,
wherein the free layer comprises a vortex layer having a magnetic-field vortex.

22. The angle sensor of claim 20, wherein the first direction is parallel to the axis, and
wherein the second direction is perpendicular to the axis.

23. The angle sensor of claim 20, further comprising a second bridge comprising:
a first leg comprising one of the magnetoresistance elements of the second pair of magnetoresistance elements and one of the magnetoresistance elements of the fourth pair of magnetoresistance elements; and
a second leg comprising the other one magnetoresistance element of the second pair of magnetoresistance elements and the other one magnetoresistance element of the fourth pair of magnetoresistance elements.

24. The angle sensor of claim 23, further comprising:
a first comparator configured to compare an output of the first bridge with a first offset trim;
a second comparator configured to compare an output of the second bridge with a second offset trim;
a signal selector configured to receive an output of the first comparator and an output of the second comparator and to provide a speed signal; and
a quadrature detector configured to receive the output of the first comparator and the output of the second comparator and to provide a direction signal.

25. The angle sensor of claim 23, further comprising:
a first analog-to-digital converter (ADC) configured to receive an output of the first bridge that is offset trimmed and gain trimmed and to provide a cosine signal to a CORDIC (coordinate rotation digital computer) circuit;
a second ADC configured to receive an output of the second bridge that is offset trimmed and gain trimmed and to provide a sine signal to the CORDIC circuit;
the CORDIC circuit configured to provide an angle by using an arctangent of the sine signal and the cosine signal;

an angle threshold circuit configured to provide a speed signal in response to the angle provided by the CORDIC circuit; and an angle difference circuit configured to provide a direction signal in response to the angle provided by the CORDIC circuit.

26. The angle sensor of claim 20, wherein the first plurality of magnetoresistance elements has an equal number of magnetoresistance elements as the second plurality of magnetoresistance elements.

27. An angle sensor comprising:
a first plurality of magnetoresistance elements located at a first location on an axis, the first plurality of magnetoresistance elements comprises:
a first pair of magnetoresistance elements each having a reference direction in a first direction; and
a second pair of magnetoresistance elements each having a reference direction in a second direction; and
a second plurality of magnetoresistance elements located at a second location on the axis, the second plurality of magnetoresistance elements comprises:
a third pair of magnetoresistance elements each having a reference direction in the first direction; and
a fourth pair of magnetoresistance elements each having a reference direction in the second direction,
wherein the angle sensor senses movement of a magnetic target, and
wherein the magnetic target is a ring magnet or a single pole magnet; and
further comprising N bridges,
wherein an nth bridge comprises magnetoresistance elements each having a reference direction equal to (n-1) times 180/N degrees, where n is greater than 2 and less than or equal to N,
wherein a first bridge of the N bridges comprises the first pair and the second pair of magnetoresistance elements.

28. The angle sensor of claim 27, further comprising:
N offset trims;
N comparators configured to receive an input from a corresponding one offset trim of the N offset trims and to receive an input from a corresponding one bridge of the N bridges; and
an edge detector and processor circuit configured to receive an output from each of the N comparators and to provide a speed signal and a direction signal.

29. An angle sensor comprising:
a first plurality of magnetoresistance elements located at a first location on an axis, the first plurality of magnetoresistance elements comprises:
a first pair of magnetoresistance elements each having a reference direction in a first direction; and
a second pair of magnetoresistance elements each having a reference direction in a second direction; and
a second plurality of magnetoresistance elements located at a second location on the axis, the second plurality of magnetoresistance elements comprises:
a third pair of magnetoresistance elements each having a reference direction in the first direction; and
a fourth pair of magnetoresistance elements each having a reference direction in the second direction,
wherein the angle sensor senses movement of a magnetic target, and
wherein the magnetic target is a ring magnet or a single pole magnet; and
further comprising:
a first bridge comprising magnetoresistance elements each comprising a pillar having a first diameter; and
a second bridge comprising magnetoresistance elements each comprising a pillar having a second diameter,
wherein the first diameter is different from the second diameter.

* * * * *